(12) United States Patent
Kofford et al.

(10) Patent No.: US 11,957,538 B2
(45) Date of Patent: Apr. 16, 2024

(54) SCREW-ATTACHED PICK-UP DENTAL COPING SYSTEM, METHODS AND ACCESSORIES

(71) Applicants: Brandon Dale Kofford, Apex, NC (US); Charles Albert Rudisill, Apex, NC (US)

(72) Inventors: Brandon Dale Kofford, Apex, NC (US); Charles Albert Rudisill, Apex, NC (US)

(73) Assignee: Smart Denture Conversions, LLC, Apex, NC (US)

( * ) Notice: Subject to any disclaimer, the term of this patent is extended or adjusted under 35 U.S.C. 154(b) by 40 days.

(21) Appl. No.: 17/561,705

(22) Filed: Dec. 23, 2021

(65) Prior Publication Data

US 2023/0200950 A1  Jun. 29, 2023

(51) Int. Cl.
*A61C 8/00* (2006.01)

(52) U.S. Cl.
CPC .......... *A61C 8/0001* (2013.01); *A61C 8/0068* (2013.01)

(58) Field of Classification Search
CPC ..... A61C 8/0001; A61C 8/0068; A61C 8/005; A61C 8/0048
USPC ...................................... 433/173–176, 201.1
See application file for complete search history.

(56) References Cited

U.S. PATENT DOCUMENTS

| | | |
|---|---|---|
| 3,115,804 A | 12/1963 | Johnson |
| 4,850,870 A | 7/1989 | Lazzara |
| 5,135,395 A | 8/1992 | Marlin |
| 5,145,372 A | 9/1992 | Daftary |
| 5,213,502 A | 5/1993 | Daftary |

(Continued)

FOREIGN PATENT DOCUMENTS

| | | |
|---|---|---|
| EP | 0104284 A1 | 4/1984 |
| EP | 0727193 A1 | 8/1996 |

(Continued)

OTHER PUBLICATIONS

Mcglumphy et al., "The combination Implant Crown: A Cement- and Screw-Retained Restoration", Compend Contin Educ Dent, Feb. 1992, pp. 34, 36,38, 40-42, vol. XIII, No. 1.

(Continued)

*Primary Examiner* — Ralph A Lewis
*Assistant Examiner* — Mirayda A Aponte
(74) *Attorney, Agent, or Firm* — Patent Leverage LLC

(57) ABSTRACT

A temporary alignment system, methods, and accessories for holding a dental coping to an implant abutment using a separable fastener using the same threads in the implant abutment used for definitive attachment are disclosed. The disclosed temporary fasteners initially orient and hold a coping against an implant abutment with a force along the same axis as the semi-definitive screw. The aligned coping can be picked-up in a closed-tray impression process without unscrewing the temporary fastener. Embodiments include threaded posts that release copings from the implant abutment through axial forces. Some embodiments include a threaded post with separable cap that is picked-up with the coping. Methods and accessories for using the separable fastener assembly or portions of it during conversion of an existing prosthesis for screw attachment or fabrication and fitting of a new prosthesis are described.

3 Claims, 35 Drawing Sheets

(56) References Cited

U.S. PATENT DOCUMENTS

| | | |
|---|---|---|
| 5,238,405 A | 8/1993 | Marlin |
| 5,350,297 A | 9/1994 | Cohen |
| 5,350,302 A | 9/1994 | Marlin |
| 5,538,426 A | 7/1996 | Harding et al. |
| 5,538,428 A | 7/1996 | Staubli |
| 5,622,500 A | 4/1997 | Niznick |
| 5,681,167 A | 10/1997 | Lazarof |
| 5,733,124 A | 3/1998 | Kwan |
| 5,782,918 A | 7/1998 | Klardie et al. |
| 5,829,977 A | 11/1998 | Rogers et al. |
| 5,904,483 A | 5/1999 | Wade |
| 5,938,443 A | 8/1999 | Lazzara et al. |
| 6,030,219 A | 2/2000 | Zuest et al. |
| 6,068,478 A | 5/2000 | Grande et al. |
| 6,142,782 A | 11/2000 | Lazarof |
| 6,168,436 B1 | 1/2001 | O'Brien |
| 6,283,753 B1 | 9/2001 | Willoughby |
| 6,299,447 B1 | 10/2001 | Zuest et al. |
| 6,312,260 B1 | 11/2001 | Kumar et al. |
| 6,315,562 B1 | 11/2001 | Kumar |
| 6,325,628 B1 | 12/2001 | Morgan |
| 6,332,777 B1 | 12/2001 | Sutter |
| 6,382,977 B1 | 5/2002 | Kumar |
| 6,416,324 B1 | 7/2002 | Day |
| 6,488,501 B1 | 12/2002 | Harding |
| 6,540,516 B1 | 4/2003 | Ziegler |
| 6,592,370 B2 | 7/2003 | Morgan |
| 6,619,958 B2 | 9/2003 | Beaty et al. |
| 6,626,911 B1 | 9/2003 | Engman et al. |
| 6,663,388 B1 | 12/2003 | Schar et al. |
| 6,666,684 B1 | 12/2003 | Names |
| 6,733,291 B1 | 5/2004 | Hurson |
| 6,769,913 B2 | 8/2004 | Hurson |
| 6,824,386 B2 | 11/2004 | Halldin et al. |
| 6,981,871 B2 | 1/2006 | Mullaly et al. |
| 7,234,940 B2 | 6/2007 | Weissman |
| 7,314,374 B2 | 1/2008 | Augthun et al. |
| 7,338,286 B2 | 3/2008 | Porter et al. |
| 7,632,095 B2 | 12/2009 | Östman et al. |
| 7,785,107 B2 | 8/2010 | Niznick |
| 8,002,547 B2 | 8/2011 | Porter et al. |
| 8,033,826 B2 | 10/2011 | Towse et al. |
| 8,075,313 B2 | 12/2011 | Ranck et al. |
| 8,187,000 B2 | 5/2012 | Schaub |
| 8,465,281 B2 | 6/2013 | Haselhuhn et al. |
| 8,469,710 B2 | 6/2013 | Bondar |
| 8,608,473 B2 | 12/2013 | Kennard |
| 8,628,327 B1 | 1/2014 | Blaisdell et al. |
| 8,827,702 B2 | 9/2014 | Mamraev |
| 8,864,494 B2 | 10/2014 | Guenter et al. |
| 8,888,486 B2 | 11/2014 | Goodman et al. |
| 8,920,170 B2 | 12/2014 | Krivoruk |
| 8,944,816 B2 | 2/2015 | Robb et al. |
| 8,944,817 B2 | 2/2015 | Fischler et al. |
| 9,033,709 B1 | 5/2015 | Allen et al. |
| 9,161,825 B2 | 10/2015 | Nardi |
| 9,314,318 B2 | 4/2016 | Mullaly et al. |
| 9,364,299 B2 | 6/2016 | Marlin |
| 9,408,677 B2 | 8/2016 | Kalman et al. |
| 9,737,380 B2 | 8/2017 | Hogan et al. |
| 9,844,425 B2 | 12/2017 | Thomke et al. |
| 10,368,964 B2 | 8/2019 | Robb et al. |
| 2002/0039718 A1 | 4/2002 | Kwan |
| 2004/0121287 A1 | 6/2004 | Morgan |
| 2004/0180308 A1 | 9/2004 | Ebi et al. |
| 2006/0141418 A1 | 6/2006 | Heo |
| 2008/0014555 A1 | 1/2008 | Cippiciani |
| 2008/0114403 A1 | 5/2008 | Kuester et al. |
| 2008/0233538 A1 | 9/2008 | Hug et al. |
| 2009/0123891 A1 | 5/2009 | Rosenberg |
| 2010/0143870 A1 | 6/2010 | Kahdemann |
| 2010/0159417 A1 | 6/2010 | Whipple |
| 2010/0209877 A1 | 8/2010 | Hogan et al. |
| 2011/0086327 A1 | 4/2011 | Lerner et al. |
| 2011/0306014 A1 | 12/2011 | Conte et al. |
| 2012/0122057 A1 | 5/2012 | Adams |
| 2013/0304136 A1 | 11/2013 | Gourlaouen-Preissler et al. |
| 2015/0147721 A1 | 5/2015 | Codina |
| 2016/0045290 A1 | 2/2016 | Poovey |
| 2017/0151038 A1 | 6/2017 | Fan et al. |
| 2017/0202649 A1 | 7/2017 | Bernhard et al. |
| 2017/0340417 A1 | 11/2017 | Hogan et al. |
| 2018/0185123 A1 | 7/2018 | Kaup et al. |
| 2018/0200030 A1 | 7/2018 | Fan et al. |
| 2018/0344434 A1 | 12/2018 | Poovey |
| 2019/0223986 A1 | 7/2019 | Buurlage et al. |
| 2019/0298497 A1 | 10/2019 | Robb et al. |
| 2020/0107914 A1* | 4/2020 | Kofford ............... A61C 8/0066 |

FOREIGN PATENT DOCUMENTS

| | | |
|---|---|---|
| KR | 20140080313 | 6/2014 |
| KR | 101745575 B1 | 6/2017 |
| WO | 1996029019 A1 | 9/1996 |
| WO | 2009024838 A2 | 2/2009 |
| WO | 2014153487 A2 | 9/2014 |
| WO | 2014195955 A1 | 12/2014 |
| WO | 2016012581 A1 | 1/2016 |
| WO | 2018029650 A1 | 2/2018 |
| WO | 2019007852 A1 | 1/2019 |

OTHER PUBLICATIONS

Chee et al., "Impression techniques for implant dentistry", British Dental Journal, Oct. 7, 2006, pp. 429-432, vol. 201.

Nissan et al., "The Press-fit Implant Impression Coping Technique", J. Prosthet Dent, 2009, pp. 413-414, vol. 101.

Imen et al., "Open Tray Impression Technique Using the Direct Pick-up Coping: A Case Report", Advances in Dentistry & Oral Health, Sep. 2018, pp. 1-4, vol. 9(5).

* cited by examiner

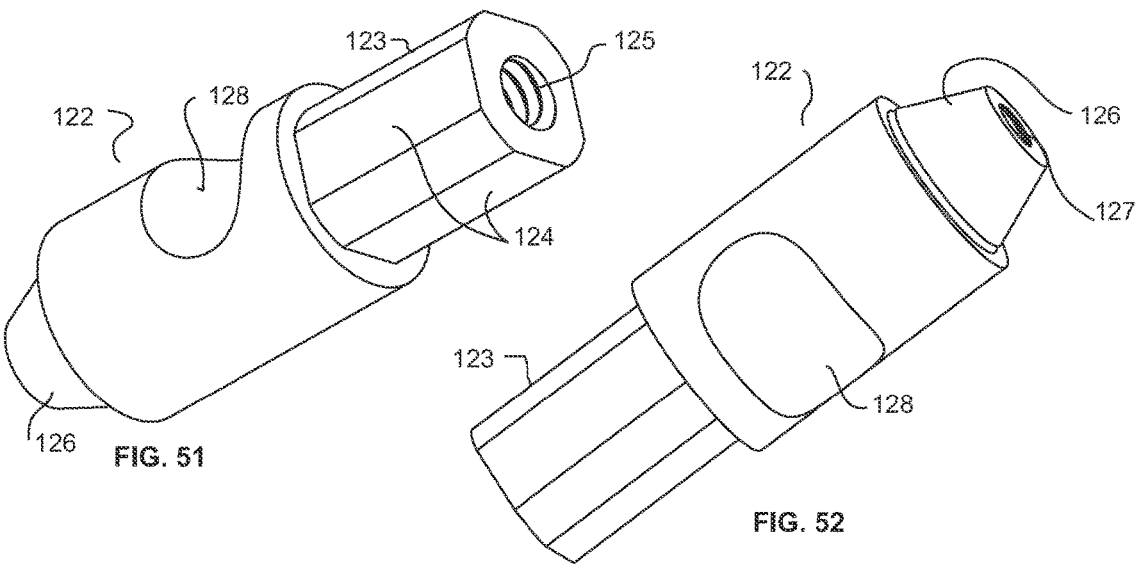
FIG. 51
FIG. 52
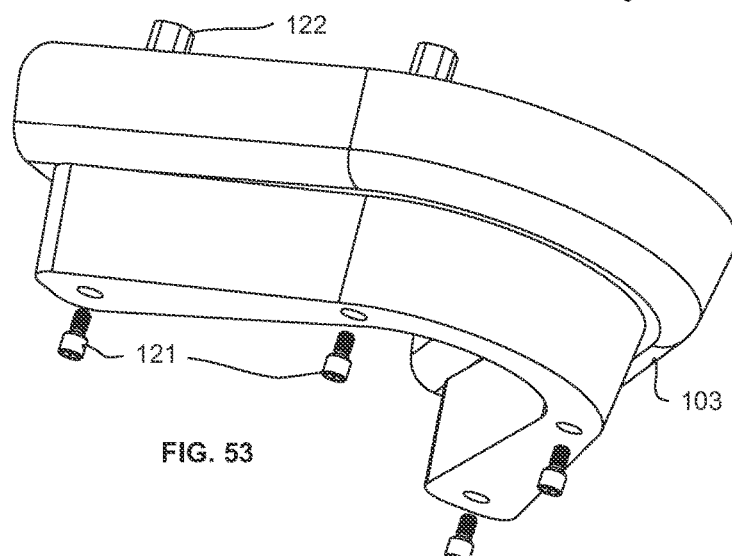
FIG. 53
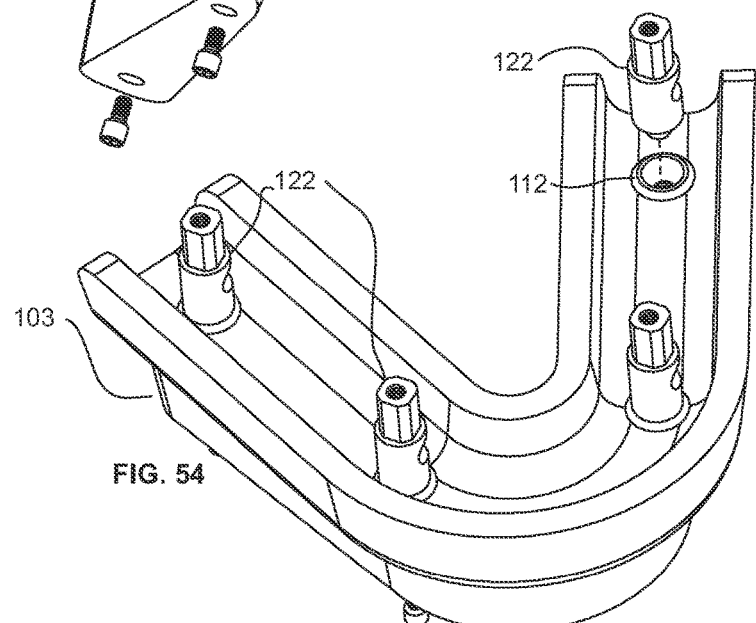
FIG. 54

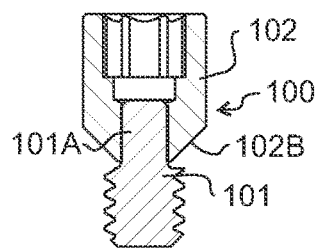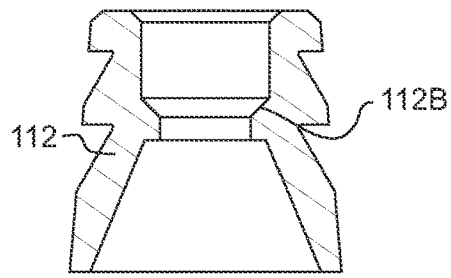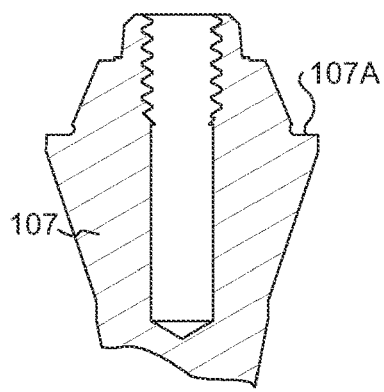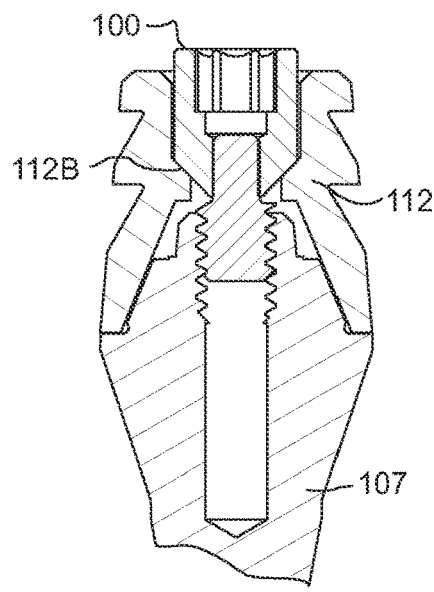
FIG. 91  FIG. 92
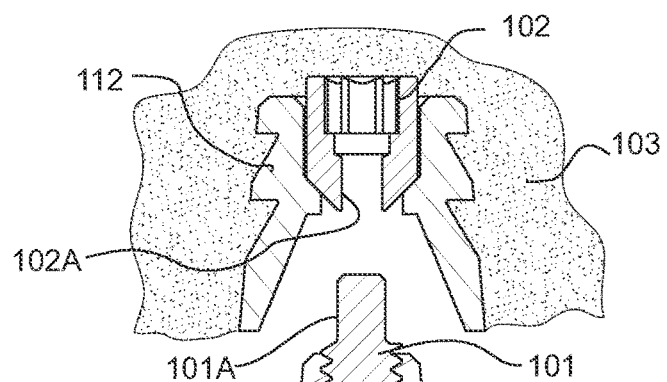
FIG. 93

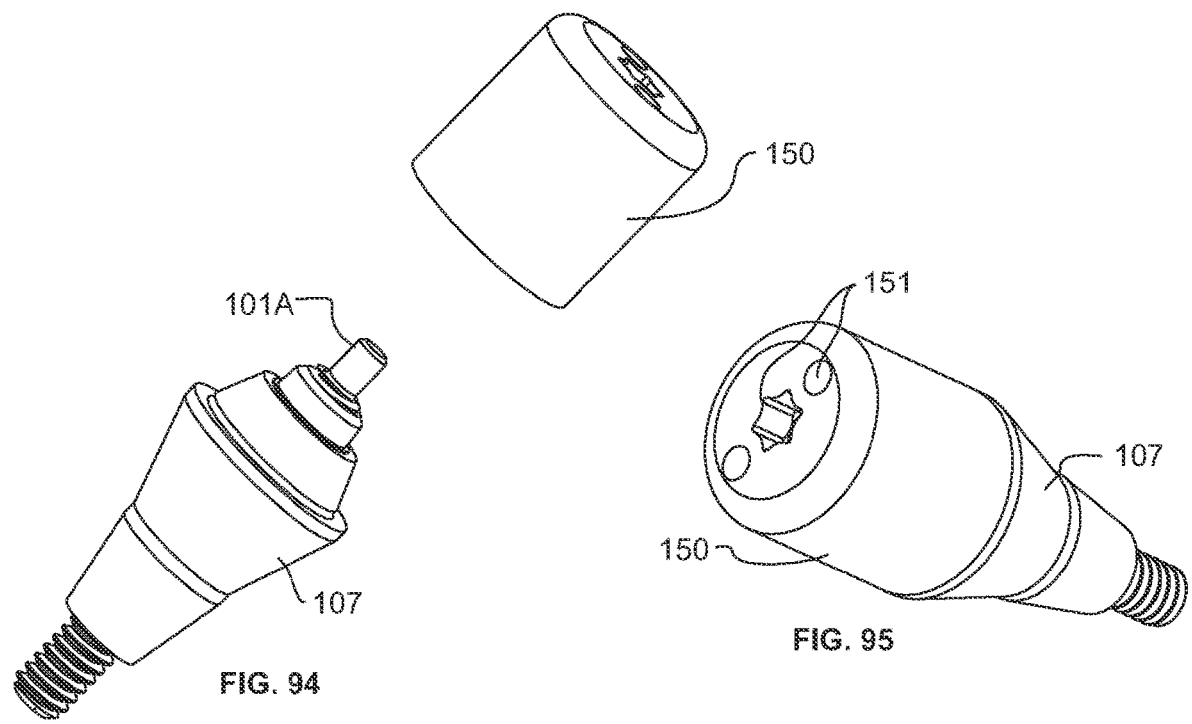
FIG. 94
FIG. 95
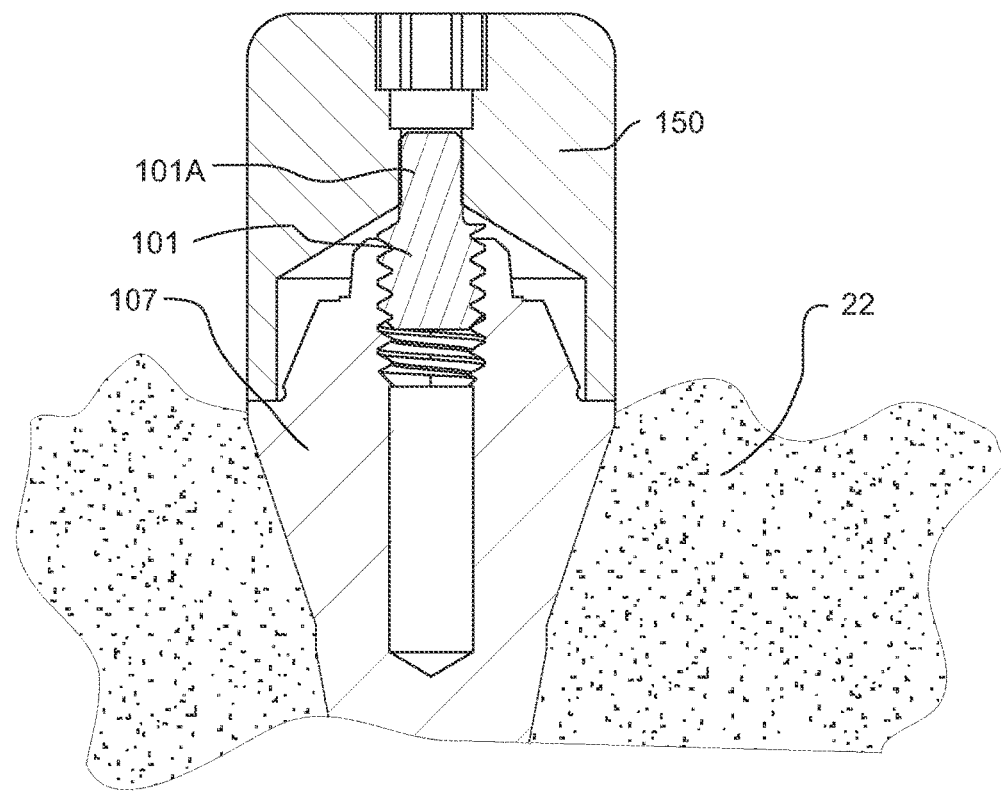
FIG. 96

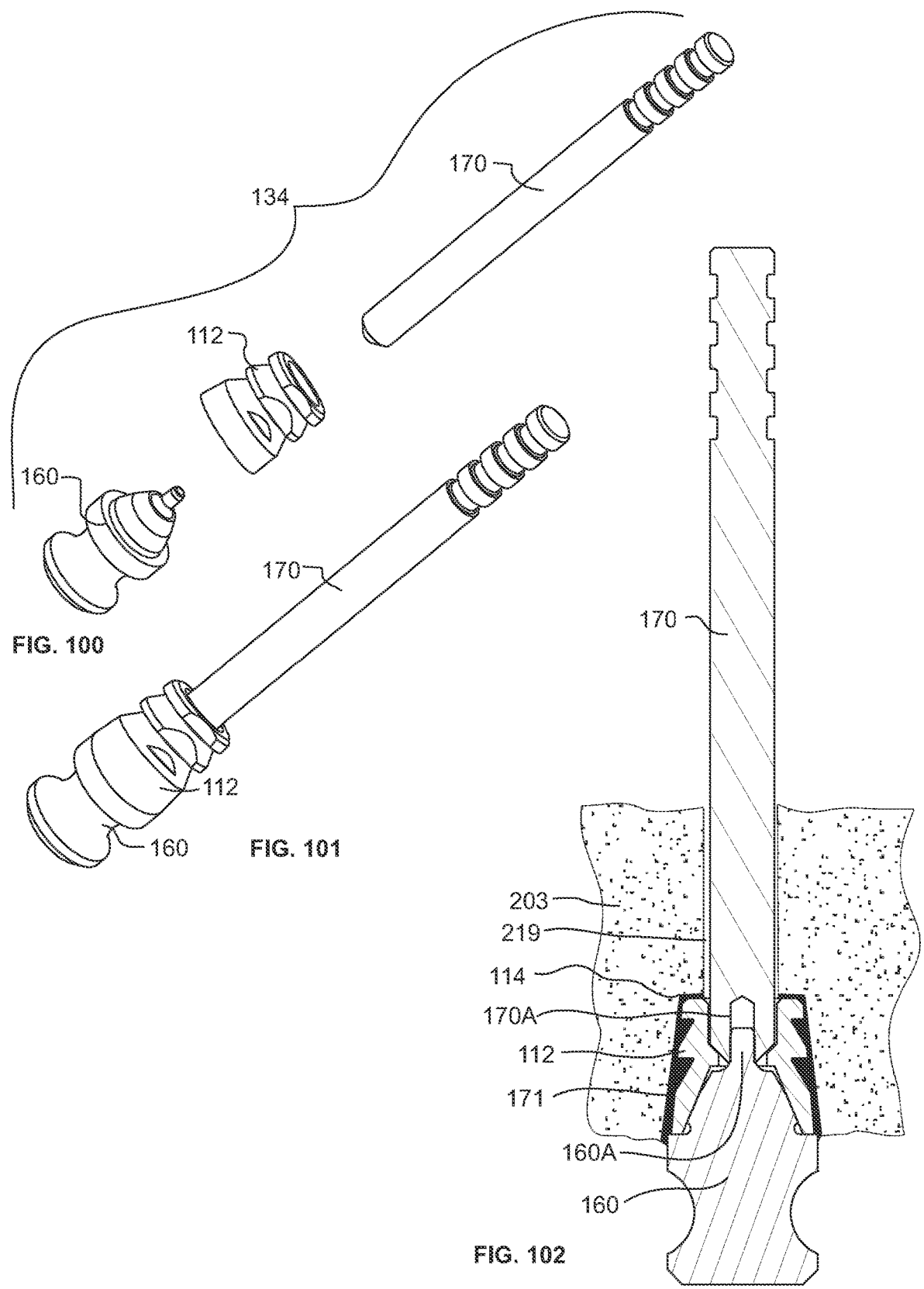

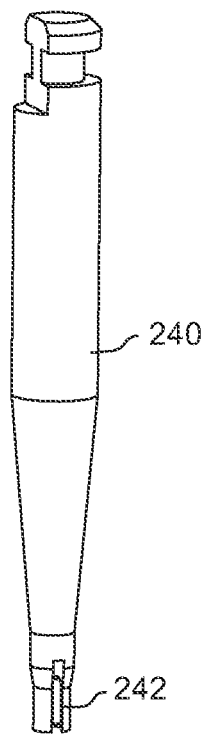
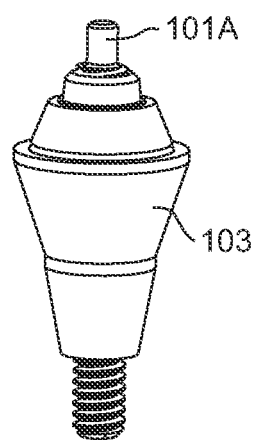
FIG. 112

SCREW-ATTACHED PICK-UP DENTAL COPING SYSTEM, METHODS AND ACCESSORIES

CROSS-REFERENCE TO RELATED APPLICATIONS

This disclosure incorporates concepts disclosed in U.S. non-provisional patent application No. 16/596,361, filed on Oct. 8, 2019, which claims priority of U.S. provisional patent application No. 62/742,942, filed on Oct. 9, 2018, and U.S. provisional patent application No. 62/774,402, filed on Dec. 3, 2018, and U.S. provisional patent application No. 62/818,082, filed on Mar. 13, 2019. All of the above applications are incorporated herein by reference in their entirety.

COPYRIGHT NOTICE

A portion of the disclosure of this patent application contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Different systems have been introduced for attaching dental prostheses to dental implants to replace one or more natural teeth. In order to simplify future modification or replacement needs, it is desirable to have reversible attachment between the implants and prostheses using mechanical systems as opposed to directly bonding these components together. These systems require features to provide both proper alignment and retention for acceptable use by the patient. Intermediate components such as copings, titanium bases (also called Ti bases) and separable implant abutments having different lengths or orientations are often employed to provide proper registration between a dental prosthesis, one or more implants embedded in the patient's jawbone, and the soft-tissue and any remaining natural teeth. These intermediate elements may be mutually attached with screws or with ball-and-socket or other forms of snap-on mounts. In the case of a single-tooth crown attachment, the coping and implant abutment surfaces preferably include features to remove rotational symmetry in the mating of the implant abutment and coping surfaces. Rotational locking features may also be included in these single mount systems. When the prosthesis contains multiple copings for attachment to multiple implant abutments, this rotational fixation is not generally required. For example, 30 degree tapered mating surfaces for multiple interface locations are sufficient to provide complete registration.

It is common to attach a complete upper or lower denture to four or more implants. The multi-unit implant abutment system interfaces with mating surfaces of the final prosthetic. In some cases, these dentures may be designed or fabricated from scratch following the pulling of undesirable teeth and mounting of implants. In other cases, no teeth are pulled, but it is desirable to convert an existing removable denture to definitive mounting to new implants. In some cases, it is preferable to convert these existing dentures shortly after the implants are placed. This chair-side processing decreases patient discomfort by providing at least temporary dentures more quickly.

Dental impressions are often used to provide information on the location of implants, soft tissue, and existing teeth for designing new prostheses or mounting copings in existing dentures for implant attachment conversion. Generally the copings are mounted to implant abutments and an impression is made to provide location information for the prosthesis through the copings. Impression material is introduced and cured around the copings to define their position. In the case of transfer copings, less rigid impression material is used to form a cavity for each coping; the coping remains attached to the implant abutment and the cured impression is removed. Subsequently, copings are inserted into the impression. In the case of pick-up copings, the coping is directly retained in the impression material after curing. That is, the copings are picked-up when the impression is removed from the mouth. The resulting alignment of pick-up copings is generally superior to transfer copings as a result of the direct transfer of coping location information. Transfer copings introduce an indirect secondary alignment reference since the insertion of the coping into the impression may not accurately duplicate the original position, particularly in insertion depth.

Pick-up copings can be used with either an open tray or a closed tray protocol. For snap-on systems, a closed impression tray pick-up technique may be done. The tray can be closed because there is no need to access the copings in order to disconnect them after the impression material sets. However, it is desirable to ensure that the assembly of snap-on copings can be removed without patient discomfort. The amount of force required to remove the tray or converted prosthesis depends upon the total number of implant abutment/coping sets and their position and mutual alignment. Some snap-on systems provide features to provide different retention levels, but this complicates the installation process. Special tools have been introduced to help separate impression trays or prostheses with snap-on systems, but may still result in patient discomfort. Since snap-on systems are generally physically larger than dental screws, converting an existing denture may require large clearance cavities to be bored into the existing denture before it can be used as an impression tray in a pick-up coping process. These large holes may significantly reduce the mechanical stability of the existing denture. The mechanical precision required of snap-on system elements generally makes them more expensive than screw-attached systems.

The simplicity of screw-attached systems provides some benefits over snap-on systems beyond fabrication cost. The mounting pressure between the coping and implant abutment is readily controlled through the torque applied to the screw to tighten it. This axial tension control and the self-aligning characteristics of engaged screw threads provides more certainty in the engagement force and relative orientation of the components. Even if a screw breaks, techniques are known for removing the pieces without damage to surrounding components. Screws also have a benefit of independence for removal since each coping can be loosened individually. Tilting the prosthesis after screw removal to disengage one coping cannot cause reengagement of another coping. Even with the simplicity of screw-retained systems, there is still widespread variation in the dimensions and shapes of the mechanical interfaces with other parts and driving tools for proper functioning of the commercially-available mechanical assemblies. As a result, different screws and tools often must be designed, manufactured, tested and stocked for different coping and implant abutment systems.

A disadvantage with prior commercially-available screw-attachment systems for pick-up copings is the requirement for using an open-tray impression in order to release the coping from the implant abutment after the impression material sets. By having an opening in the tray or existing denture, impression screws may be used. These impression screws extend through the tray beyond the impression material and can be unscrewed after the material sets. The impression screws use the same implant abutment threads as the semi-permanent screws used to attach the prosthesis later. As a result, the introduction of alignment uncertainty through a secondary reference may be avoided or minimized. The copings used with the impression screws are often relatively long and require modification for denture conversion. This customization may result in larger clearance holes in dentures and require additional process time by the dental practitioner. The length of the impression screws sticking through the tray can cause patient discomfort and a gag reflex. In the case of denture conversion, clearance for a set of impression screws at different angles may require additional material removal leading to a weakened denture. A schematic representation of the larger through-holes 136 required using conventional denture conversion processes for screw attachment are illustrated in FIGS. 115-116. The impression screws can also prevent the patient from applying bite pressure during the pick-up process to ensure proper registration of the modified denture and opposing teeth.

The time required for fine tuning in the fitting of a converted or a new denture is lengthened by the difficulty in adding and removing material where required. Multiple cycles of test fitting and further processing is an annoyance for the patient and a costly inefficiency for the dental professional. Poor alignment of copings with the prosthesis may result in excessive cycles in removing interfering material, while adding excess material in the wrong spot such as inside the coping also adds inefficiencies. Both problems may increase patient discomfort and may result in degraded aesthetics.

Prosthetic dentistry has rapidly moved into the realm of digital design and manufacturing. Typically, this requires that a digital model is created from a physical model or impression to allow digital design and manufacturing techniques to produce a physical prosthetic that can be delivered to a patient for restoration of dental and oral structures. When making a dental restoration with implants in this manner, an implant impression coping is often used in the mouth to reference the position of the implant geometry relative to surrounding structures such as gingiva, adjacent teeth, opposing teeth, etc. Once removed from the mouth, an implant analog is attached to the impression coping that was picked-up or transferred. With the lab implant analog attached to the impression coping in the elastomeric impression, dental stone is flowed into the impression and allowed to harden before separation from the impression with a resultant dental cast. A scan flag is attached to the lab analog on the dental stone model and is scanned in by laser or optical scanning technology. The scan flag is used for design software to reference and replicate the accurate positioning of the virtual implant relative to the adjacent teeth, gingiva and opposing teeth, as well as the timing of the implant and other pertinent implant geometries. Once the virtual implant is accurately brought into the design software, a prosthetic can be designed by following the workflow in the design software. A completed design is post-processed, and a CAD file is used in CAM software to direct either the 3-D printing or milling of the designed prosthesis. The manufactured prosthesis is verified on the physical model in a remote prosthetic manufacturing lab prior to delivery to the dentist or is verified directly on the dental patient if the prosthesis was manufactured in the local dental clinic. It is currently the standard of care to verify the fit, form, and function on a physical model.

Recently, an impression scan flag was introduced to the market for a few major implant systems and the most common multi-unit geometry. This scan flag allows for an impression to be digitized without the creation of a stone model. A digital model is created directly from the elastomeric impression, a prosthesis is designed digitally and processed with CAM software and both a 3-D printed model and 3-D printed or milled prosthesis is finished and tested on the 3-D printed model. The disadvantage of the 3-D printed model for full arch implant prosthetics is the positioning of the implant lab analog within the 3-D printed model introduces a degree of inaccuracy. Additionally, an impression only captures the implant or multi-unit implant abutment relative to the tissues and requires cumbersome steps to incorporate a provisional prosthesis or wax-up into the design software relative to the scan of the impression.

A properly converted denture provides a valuable source of information of the relative location of the implant and its implant abutment surfaces, copings and soft tissue and any remaining teeth of the patient. It can be used as a model for digital scanning to produce a duplicate denture if needed in the future or as a starting digital model for manipulation to improve aesthetics or other characteristics. However, if the mechanical integrity of the converted denture is compromised, the scanned information may not faithfully represent the relative geometry of these elements and result in a poor fit.

Other alignment systems have been proposed which use silicone or melting screw threads to allow closed tray transfer for definitive screw attachment, but the practicality of providing adequate alignment and seating forces with a screw diameter in the range of existing systems or overcoming the lack of disengagement independence required in melting all threads simultaneously without patient discomfort has not been documented. Details on removing any residual material in the implant abutment threads or in the prosthesis after the pick-up process have not been disclosed. Other hybrid systems that use a snap-on engagement for the pick-up coping during transfer and subsequent screw-attachment have also been proposed, but detailed information on the tradeoffs in precision and associated complexity or size required for equivalent performance to open-tray impression screw techniques have not been disclosed. A general need exists for systems that improve clinical efficiency, implant to prosthesis alignment accuracy, application to a wide range of coping designs and sources and patient comfort over existing systems.

The present disclosure includes system and methods that address one or more of these issues in the prior art.

BRIEF SUMMARY OF THE INVENTION

Some embodiments of the invention include a screw-in fastener system used to temporarily retain a coping on an implant abutment during bonding of the coping into a blind hole located in the tissue-side of a removable dental element such as a removable complete denture as described in the co-owned patent applications incorporated by reference in their entirety above. The temporary fastener system disclosed has features to allow easy removal of the dental prosthesis from the fastener post after pick-up of the coping into the dental prosthesis is complete, without the need for special tools or access to the fastener system to unscrew it.

Some embodiments include a temporary fastener with a male-threaded bottom portion that is installed into the screw threads of an implant abutment, and an axially separable top portion, or cap, which retains the coping onto the implant abutment. The separable portion allows removal of the coping picked-up in the dental prosthesis without requiring mechanical access to the fastener. The inventive concepts disclosed facilitate easier installation and removal on multiple implant abutments that may be oriented at different compound angles when compared to the conventional open-tray processes and long impression screws. The temporary fastener may engage the same screw threads of the implant abutment that are used to definitively attach the prosthesis. In this manner, the coping is held against the implant abutment for the pick-up process with a force oriented identically to that of the final screw mounting. The retention of the cap on the screw post can be designed to provide a desired force holding the coping to the implant abutment through the applied torque on the temporary fastener. The cap can be attached to the post through a combination of known mechanical attachment means including but not limited to interference fits, adhesives, snap fits, or other elastic and inelastically deforming retention elements. The cap may also be formed as an integral part of the screw post that has portions that fracture as a result of an applied axial force. In addition to applied axial forces, the cap may separate from the post as a result of retention changes resulting from chemical or thermal processes and or the application of electromagnetic energy during or subsequent to the pick-up process.

Other embodiments include a threaded post that has a temporary retention feature that engages the coping without a separable cap. These embodiments engage the implant abutment threads in mounting the coping, but release the coping after bonding to the prosthesis. The disclosed systems and methods can be applied to single tooth prostheses with copings and implant abutments with orientational features or for multiple tooth prostheses using copings and implant abutments with symmetrical mating surfaces such as 30 degree tapers.

In some embodiments, the temporary fastener is driven into the implant abutment threads by a tool that engages the post. In other embodiments, the temporary fastener is driven into the implant abutment threads by a tool that engages the cap. The drive torque can be designed to be sufficient for holding the coping to the implant abutment accurately, but less than the torque that would result in movement of the cap relative to the post.

In some embodiments, the threaded end of the post portion of the temporary fastener has a deflecting feature that allows the post to engage or disengage the implant abutment threads through axial motion instead of a rotary screw motion.

One embodiment describes a system for aligning a dental implant abutment, coping and separable dental element for definitive screw-attachment comprising:
  a temporary alignment fastener comprising:
  a post having an axis, a first post end and second post end, wherein the first post end is threaded for screw attachment to the implant abutment;
  a cap, wherein the cap is attached to the second post end; and wherein the temporary alignment screw is configured to hold the coping against the implant abutment when the first post end is screwed into the implant abutment and wherein the cap is separable from the post through a release force directed away from the first post end.

In some embodiments, this axial separation results in the post portion being retained in the implant abutment and the cap portion being retained with the coping in a prosthesis. In some embodiments, the post is retained in the implant abutment in the patient and can be used to affix a temporary cap to keep contaminants or gum tissue away from the surface of the implant abutment. The temporary cap may also help protect and constrain tissue in position and promote healing. This temporary cap may be installed by an axial force. The interface between the temporary cap and the post may be configured to allow the temporary cap to unscrew the post from the implant abutment by rotating the temporary cap. Alternatively, the post in the implant may be unscrewed and the healing cap applied to a post outside of the patient's mouth before the healing cap is screwed into the implant abutment. The interface of the healing cap may be designed to have more or less resistance to axial movement than the cap used previously. For subsequent attachment with semi-definitive prosthetic screws, the post portions are removed from the implant abutments and semi-definitive screw clearance holes are generally drilled through the cap.

An embodiment discloses a system for incorporating copings into a prosthesis for definitive screw attachment to threaded implant abutments designed to perform the process of:
  mounting at least one coping to an implant abutment containing a threaded portion with a temporary fastener wherein the temporary fastener has a threaded portion that engages the threaded portion of the implant abutment,
  securing the coping with adhesive to a cavity formed in the prosthesis,
  pulling the prosthesis with the secured coping away from the implant abutment,
  attaching an accessory to an interface portion of the temporary fastener,
  forming a definitive screw clearance hole in the prosthesis,
  mounting the prosthesis to the implant abutment with a screw that engages the threaded portion of the implant abutment.

An embodiment describes a system for aligning a separable dental element for installation to a threaded implant abutment with a definitive screw having a head and threaded shaft portion comprising:
  a coping having a distal end shaped to engage with the implant abutment and a proximal end with an aperture sized to allow the shaft portion of the definitive screw to pass through;
  a temporary screw having a distal end portion adapted to engage the threads of the implant abutment and a proximal end portion having temporary engagement means for attachment adjacent to the proximal end of the coping wherein the temporary screw holds the distal end of the coping in alignment against the implant abutment when the distal end portion of the temporary screw engages the implant abutment threads and wherein the temporary engagement means releases the coping without disengaging the post portion of the temporary screw upon the application of a predetermined axial force in the proximal direction.

In some embodiments, an existing removable denture is converted to a screw attached denture by milling pockets to allow copings to be bonded in a pick-up process. In this process, the denture acts in an equivalent manner to a closed impression tray. Proper registration can be confirmed by having the patient bite down on the denture during the pick-up process. After coping pick-up, clearance for the definitive screws can be drilled using the coping as a guide. The converted denture can be used with scan flags to provide a 3-dimensional digital capture. Thus a digital model can be used to make a duplicate prosthesis or as the starting point for a new custom prosthesis.

In an embodiment, a method is disclosed for aligning a coping in a prosthesis for definitive screw attachment to threaded implant abutment comprising:

mounting at least one coping to an implant abutment containing a threaded portion with a temporary fastener wherein the temporary fastener engages the threaded portion of the implant abutment, adhering the coping to a cavity formed in the prosthesis, pulling the prosthesis with the secured coping away from the implant abutment, mounting an accessory to a portion of the temporary fastener, and mounting the prosthesis to the implant abutment with a screw that engages the threaded portion of the implant abutment.

In some embodiments, the post interface portion of the temporary cap that is retained in the denture or other prosthesis may be used to hold a masking plug. This masking plug may be used to prevent damage to or contamination of the implant abutment interface surfaces of the coping during processing. The temporary plug prevents cement or tools from touching the coping during secondary processing of the denture. The plug interface may be designed to work with the retained cap before or after it is bored to accommodate the semi-definitive screw. In some embodiments, a temporary plug may also be used with a separable fastener extension to provide temporary coarse alignment of copings during fabrication and fitting of a new prosthesis.

The disclosed systems and methods can be applied to single tooth prostheses with copings and implant abutments with orientational features or for multiple tooth prostheses using copings and implant abutments with symmetrical mating surfaces such as 30 degree tapers.

One embodiment describes an alignment system for converting an existing denture for screw attachment to threaded implant abutments designed to perform the process of:

mounting pick-up copings to the implant abutments with temporary fasteners, adhering the copings to cavities formed in the existing denture, pulling the denture with secured pick-up copings away from the implant abutments, mounting an accessory to a portion of the temporary fastener, unscrewing the threaded portions of the temporary fasteners from the implant abutments, forming definitive screw clearance holes in the denture, mounting the denture to the implant abutments with definitive screws that engage the same implant abutment threads as the temporary fasteners, wherein the unscrewing the threaded portions of the temporary fasteners and the forming definitive screw clearance holes in the denture may occur in either order.

Embodiments of tools for attaching, aligning, and removing the separable fasteners and to convert an existing denture or fabricate a new prosthesis using any of the inventive concepts above are also described.

For the purposes of this disclosure, a separable dental element is defined to be anything that incorporates one or more dental copings that can be mounted and removed from one or more implant abutments. Different coping designs are known in the dental industry, and the systems and methods disclosed here can be adapted to work with many commercially-available types of copings including pick-up copings, temporary cylinders, inserts and impression copings. Implant abutments are known in the dental industry having compatible interfaces to these copings. Since the mechanical interface is the same, for the purposes of this disclosure, implant abutment is considered a generic term that includes implant abutment analogs. Description of alignment systems and process methods with copings and implant abutments that are installed in a patient's jaw should be considered to also describe equivalent inventive concepts that may be used with copings and implant abutment analogs in a dental lab. The inventive concepts disclosed herein can be used with different types of separable dental elements. The separable dental element can be any form of impression used in a dental lab to assist in creating and testing dental prostheses. A separable dental element can also be a dental prosthesis fabricated in the dental lab using a physical model made from the impression, a dental prosthesis newly fabricated, or an existing prosthesis being converted for screw attachment. A dental prosthesis is defined to include a single-tooth appliance such as a crown, or any multiple-tooth bridge or denture. These prostheses may incorporate copings to provide a separable interface to provide orientation with an appropriate implant abutment attached to a patient's jaw or gingiva. The implant abutments for use with the inventive concepts disclosed herein include screw threads to mount the prosthesis with copings onto the implant abutments. While the concepts describe female threads in the implant abutment mating with male threads on a mounting screw, this is for convenience in disclosure. The inventive concepts could be applied with systems having male threads in the implant abutment engaging a screw with female threads for mounting the prosthesis. These are considered to be straightforward variations of the inventive concepts.

For the purposes of this disclosure, the general term "coping" should be interpreted broadly to include to an intermediate element such as a Ti base that is used for mechanical alignment and attachment of a single tooth or multiple tooth prosthesis to one or more implant abutments. The inventive concepts disclosed for alignment and fixing may have application for short or longer-term use both in the lab or in the mouth of a patient. For the purposes of this disclosure, the implant abutments may be integral to the implants embedded into the patients jaw or gingiva, or they may be separate units that are attached to the implants. The inventive concepts disclosed apply to both configurations.

For the purposes of this disclosure, an existing denture should be interpreted broadly to include any prosthesis that has been created prior to the use of the innovative systems and methods disclosed. An existing denture may be a loose denture that was worn by the patient prior to the installation of implants, or it may be a new denture that is in the process of first fitting in the patient's mouth or a replica of the patient's mouth.

The systems and methods disclosed herein can be used with prostheses for attachment to both the upper and lower jaw. As a result, portions of the system that are oriented downward for the lower jaw will be oriented upward for the upper jaw and vice versa. For convenience, a disclosure of an embodiment of inventive concepts that is limited to a single jaw orientation, is considered to disclose an embodiment for the opposite jaw orientation. When referring to the perspective of a clinician, proximal portions are nearer to the clinician than distal portions. While a term such as top is the opposite of the term bottom, and proximal is the opposite of distal, their actual relative orientation will be determined by the context of their use. The term tissue-side is used interchangeably with intaglio to indicate the side of a prosthesis that is opposite the occlusal or cameo surface.

The inventive systems disclosed are beneficially applicable to screw-attached prostheses. Key benefits of screw-attachment are variable tightening torques and reversibility. The terms permanent, semi-permanent, definitive, semi-definitive and final when referring to screw-attachment are used interchangeably in this disclosure. A conventional screw that is definitively attached can still be removed by accessing the screw and rotating it in the opposite direction that was used for attachment. For the purposes of screw-attached prostheses for this disclosure, the attachment is semi-permanent, permanent, semi-definitive or definitive in the sense that frequent attachment and removal is not anticipated for normal use. In contrast, the temporary screw attachment is applied for a planned process duration or other anticipated interval. Removal of a semi-permanent or definitive screw is generally motivated by a problem or an opportunity for an improvement. Access to the screw to apply a tool for removal may require removal of material covering the screw for aesthetic reasons.

Other terms in the specification and claims of this application should be interpreted using generally accepted, common meanings qualified by any contextual language where they are used. The terms "a" or "an," as used herein, are defined as one or as more than one. The term "plurality," as used herein, is defined as two or as more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "about" and "essentially" mean ±10 percent. Reference throughout this document to "one embodiment," "certain embodiments," and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation. The term "or" as used herein is to be interpreted as an inclusive or meaning any one or any combination. Therefore, "A, B or C" means any of the following: "A; B; C; A and B; A and C; B and C; A, B and C." An exception to this definition will occur only when a combination of elements, functions, steps, or acts are in some way inherently mutually exclusive.

The drawings featured in the figures are for the purpose of illustrating certain convenient embodiments of the present invention and are not to be considered as a limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting. Other objects, features, embodiments and/or advantages of the invention will be apparent from the following specification taken in conjunction with the following drawings.

BRIEF DESCRIPTION OF THE DRAWINGS

FIG. 51 is a top isometric view of an embodiment of a component suitable for use as a scan flag for digital capture and a laboratory analog for physical model creation.

FIG. 52 is a bottom isometric view of the component from FIG. 51.

FIG. 53 is a bottom isometric view showing the component of FIG. 51 positioned for screw attachment to the converted prosthesis of FIG. 49.

FIG. 54 is a top isometric view of FIG. 53.

FIG. 91 is an exploded cross-sectional view of an embodiment comprising a temporary screw, coping, and implant abutment.

FIG. 92 is an assembled cross-sectional view of the embodiment of FIG. 91.

FIG. 93 is an exploded cross-sectional view of the embodiment of FIG. 92 after the temporary screw has been separated.

FIG. 94 is an exploded perspective view of an implant abutment with a separable screw post and an exclusion cap.

FIG. 95 is an assembled perspective view of the embodiment of FIG. 94.

FIG. 96 is a cross-sectional view of the embodiment of FIG. 94 showing the exclusion cap mounted onto the implant abutment.

FIG. 100 is an exploded perspective view of an embodiment of a separable fastener extension, coping and mask plug for temporarily alignment of the coping into a prosthesis.

FIG. 101 is an assembled perspective view of the embodiment of FIG. 100.

FIG. 102 is an assembled cross-sectional view of the embodiment of FIG. 100 with uncured adhesive in a cavity of a prosthesis.

FIG. 112 is a perspective view of an embodiment of a shank having a post extractor end portion for use with a torque driver to remove a separable fastener post from an implant abutment.

DETAILED DESCRIPTION OF THE INVENTION

Figure 1:
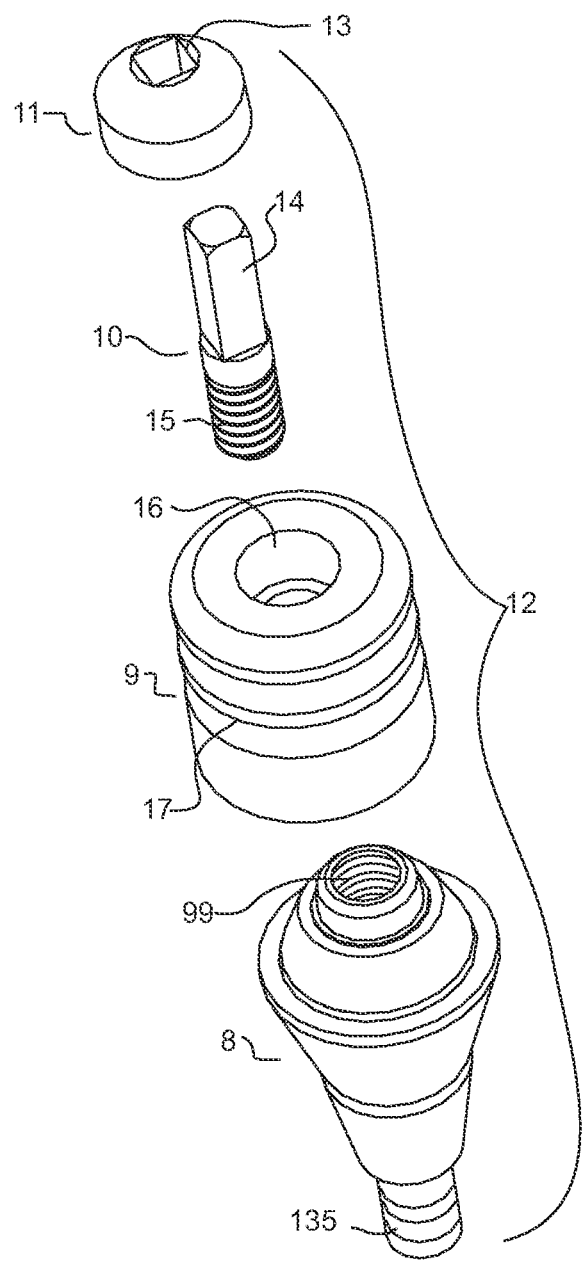
FIG. 1 is a top exploded isometric view of a first embodiment of a system for aligning a dental implant abutment, coping and prosthesis for definitive screw-attachment.

FIG. 1 shows an exploded view of one embodiment of a temporary alignment system 12 for use in a direct coping pick-up process for screw attachment of a prosthesis. Implant abutment 8 has a distal end which may include attachment feature portion 135 illustrated as a screw thread for direct attachment to the patient's jaw and a proximal end with an abutment shaped to accommodate a coping 9. The implant abutment includes threaded section 99. The coping has a central bore 16 to accommodate screw fastening and may include ridges 17 or other structures or surface treatments to increase retention to the prosthesis with adhesive. The coping and implant abutment mating surfaces as shown in FIG. 1 are symmetrical. The inventive concepts of this disclosure may also be applied to implant abutment and coping systems that are keyed to restrict mating orientation. The coping may be mounted onto the implant abutment through rotation of a temporary adjustment screw comprising a threaded post 10 and cap 11. The cap 11 is mechanically attached to post 10 in a manner that allows relative axial motion with the application of a predetermined force. As illustrated in FIG. 1, cap 11 has a square central bore 13 that is press-fit onto a square portion 14 of post 10. The cap 11 temporarily retains coping 9 onto implant abutment 8 during the pick-up process of the coping into the prosthesis with a force aligned directly along the same axis as the semi-permanent screw that will be used for definitive prosthesis mounting. The portion of the post engaging the implant abutment threads also prevents any pick-up material from contacting the implant abutment screw threads. After the coping is bonded into the prosthesis, the cap and coping may be released from the implant abutment by applying an axial force. In the embodiment shown, the post threads 15 remain engaged with implant abutment threads 99 after the pick-up process. The post can then be removed from the implant abutment by unscrewing it. The prosthesis with embedded coping can be subsequently processed to accommodate semi-permanent screw attachment as will be described later.

Figure 3:
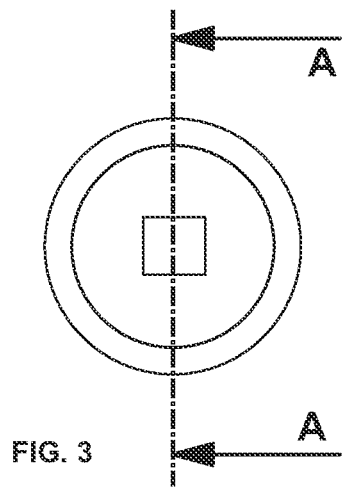
FIG. 3 is a top plan view of a first embodiment of a system for aligning a dental implant abutment, coping and prosthesis for definitive screw-attachment.
Figure 2:
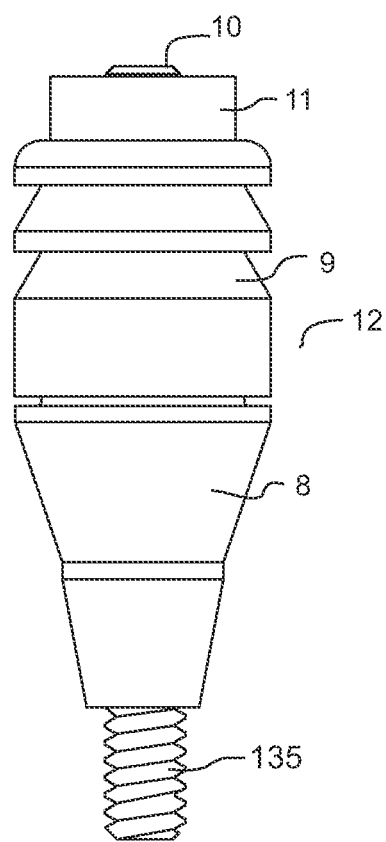
FIG. 2 is a side plan view of a first embodiment of a system for aligning a dental implant abutment, coping and prothesis for definitive screw-attachment.
Figure 4:
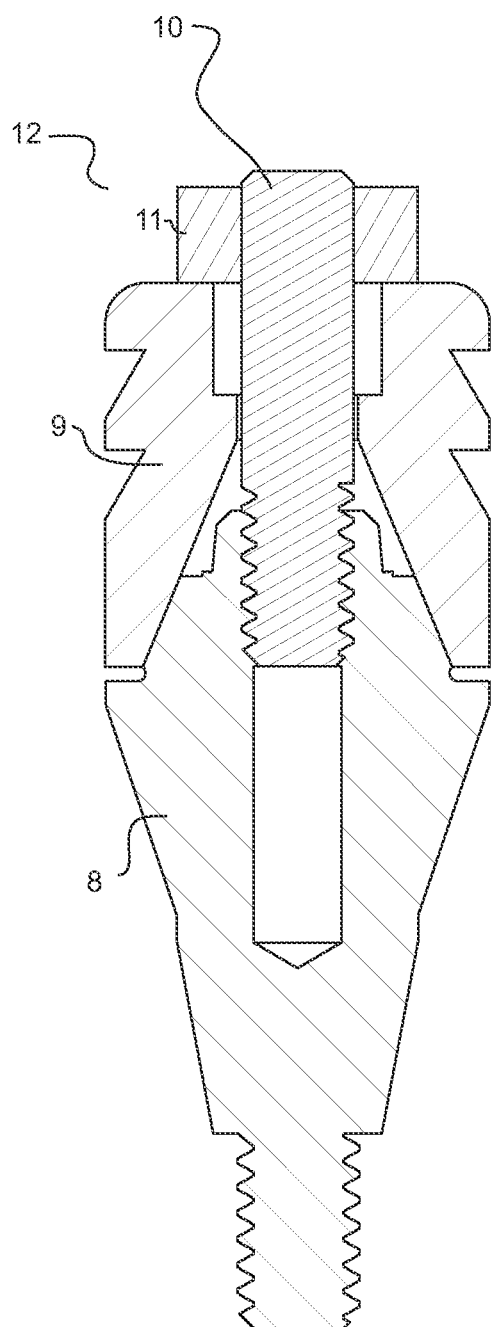
FIG. 4 is a side cross-sectional view of the system for aligning a dental implant abutment, coping and prosthesis for definitive screw-attachment along the line indicated in FIG. 3.

FIGS. 2 and 3 show a side and top view of the assembled system of FIG. 1; FIG. 4 shows a cross-sectional view along the axis as indicated. As shown in FIG. 4, matching conical surfaces on the exterior of the implant abutment 8 and the interior of the coping 9 are engaged. The coping is pulled into alignment by an axial force from the lower surface of the cap 11 pushing against the upper surface of the coping from screwing the threads of post 10 into the implant abutment. The distal end of the implant abutment may be directly attached to the patient's jaw or attached to a separate implant attached to the jaw. The inventive concepts are not dependent upon the nature of the implant, so the distal end attachment feature 135 is represented schematically.

The capability for relative axial movement between the cap 11 and temporary attachment post 10 allows separation of the temporary attachment post from the cap without tools after retaining the coping onto the implant abutment during fitting and bonding of the coping into the prosthesis. These parts are accurately aligned during the bonding process since the temporary post engages the implant abutment threads to provide an axial force holding the coping to the implant abutment just like the screw used for final attachment.

The cap may be sized to have an amount of press-fit mechanical interference to the temporary attachment post to provide an axial retention force of approximately 20 to 900 grams, this force being sufficient to retain coping 9 during assembly while allowing relatively easy pickup removal of the coping and prosthesis from the temporary attachment post after assembly. The temporary attachment post 10 may include indicators (not shown) in the end by the cap 11 to provide intermediate visual and/or tactile feedback on the depth of threaded engagement of the post during screw attachment of the coping to the implant abutment.

In this embodiment, screw driving torque is provided by the square cross-section of the cap aperture and temporary attachment post. In the cross-sectional view of FIG. 4, the post 10 has been screwed in so that only a small, beveled surface of the post extends above the top of the cap when the post threads bottom out in the implant abutment. During installation, this optional configuration provides feedback to the dental practitioner when the torque increases as the threads bottom. The square drive tool engagement can also be designed to disengage at a pre-designed minimum extension of the square post above the top of the cap. Alternatively, a tool with a specified maximum torque may be used to ensure engagement of the coping and implant abutment surfaces.

The screw driving torque function may be accomplished by engaging other features on the temporary attachment post such as hex or spline or asymmetric features. Alternately, the cap may be used to engage a screwdriver or other tool for torquing. For example, in the case of a cylindrical temporary attachment post top portion, driving torque can be provided by the friction of the press-fit between the cap and temporary attachment post. For example, a medium press-fit of a 3 mm diameter 1 mm thick nylon cap onto a 1.3 mm diameter stainless steel cylindrical rod may produce approximately 500 grams of axial retention force and 17 gram-cm driving torque. A typical screw thread size for appliances is m1.4× 0.3. The retention/axial force of the cap to the temporary attachment post may be determined by the degree of press-fit and frictional properties between the cap and temporary attachment post, and/or spring features incorporated into the temporary attachment post and/or cap.

In actual trial installations, polymer caps of approximately 1.2 mm thickness press fit onto posts of approximately 1.4 mm diameter with cylindrical axial bores have been sufficient for installation and pick-up removal of a single prosthesis from multiple implant abutments in which the axes of the screw threads in the implant abutments are not mutually parallel.

The separable mechanical attachment means may include any combination of techniques, including frictional forces from interference, adhesives, waxes, chemical bonding, solders, elastically or inelastically deformable spring, snap, or interlocking structures, thermally or electromagnetically fusible materials, fracturing structures, etc.

Figure 5:
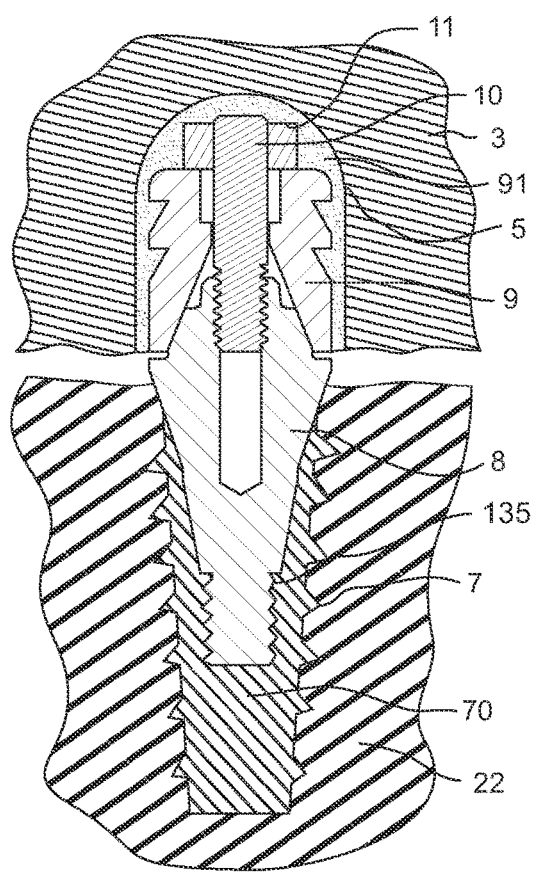
FIG. 5 is a side cross-sectional view of the embodiment of FIG. 4 attached to the jaw and prosthesis prior to the pick-up process.
Figure 6:
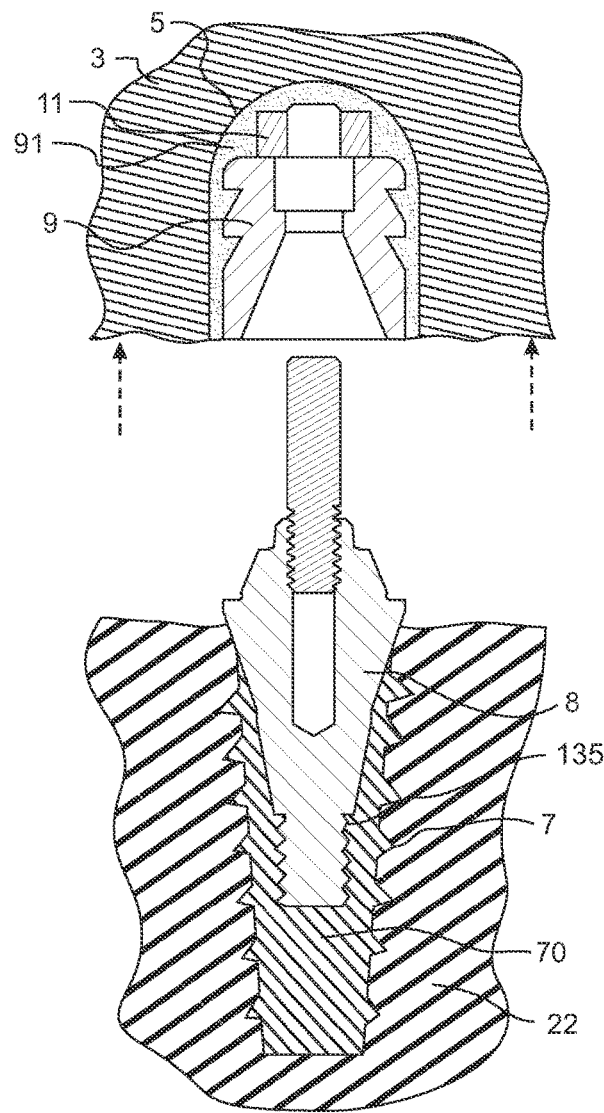
FIG. 6 is a side cross-sectional view of the embodiment of FIG. 5 after the pick-up process.

FIG. 5 through FIG. 9 show example cross-sectional views of some of the different stages of installation of the temporary fastener system into a denture. FIG. 5 shows a cross-sectional view of the assembly of the first embodiment during the initial phase of the coping pick-up process. As illustrated, the implant abutment 8 is attached to a schematic implant 70. The implant 70 has an interface 7 (shown schematically) that is attached to the patient's jawbone 22. The coping 9 is held against the implant abutment 8 through the temporary screw comprising the post 10 and cap 11. A blind clearance hole 5 in the prosthesis 3 is sized to accommodate the coping and temporary screw. Pick-up material 91 is positioned in the clearance hole 5 to capture the coping in proper alignment within the prosthesis. After the pick-up material has set up, the prosthesis 3, coping 9 and temporary screw cap 11 assembly is pulled off the patient's jaw as shown by the arrows in FIG. 6. The coping 9 and cap 11 are released from the implant abutment 8 and post 10, while the threads of the post 10 keep it engaged in the implant abutment 8. The post 10 is subsequently removed to make the implant abutment threads 99 available for holding the prosthesis in proper alignment with a definitive screw.

Figure 7:
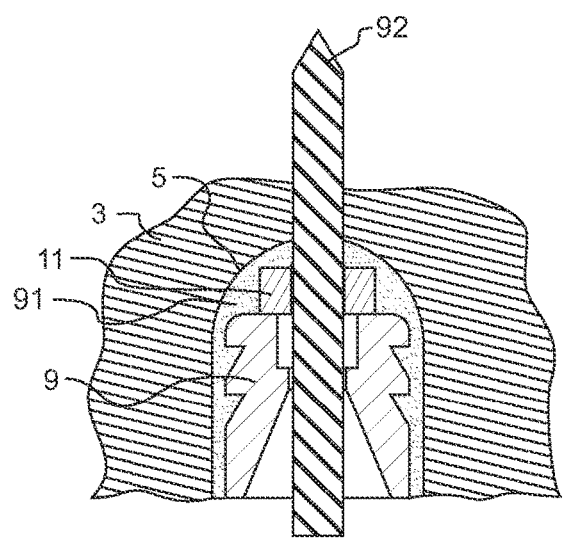
FIG. 7 is a side cross-sectional view of the embodiment of FIG. 6 showing a drill bit creating a pilot hole for a definitive screw.
Figure 8:
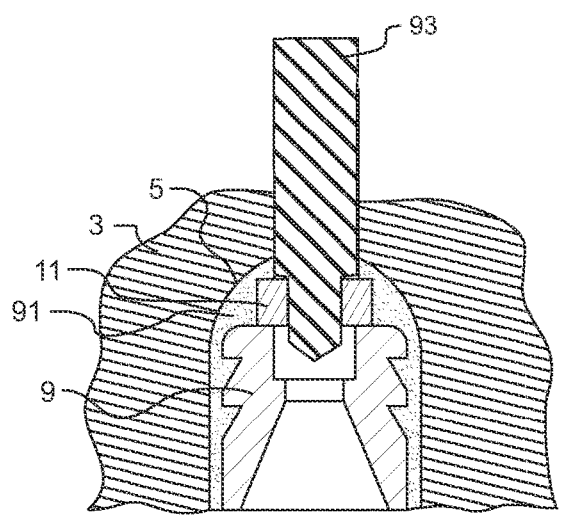
FIG. 8 is a side cross-sectional view of the embodiment of FIG. 7 showing a stepped drill bit creating a clearance for the head and shaft of a definitive screw.

The prosthesis/coping assembly must be processed after the pick-up process for screw attachment. A pilot hole is drilled with bit 92 from the bottom side of the assembly. As shown in FIG. 7, the diameter of the bit may be selected to use the interior bores of the coping and cap to act as guides for hand processing. Alternately, a drill guide that engages a portion of the interior of the coping may be used to align the pilot hole. The pilot hole provides guidance for a tool to provide clearance for the definitive screw shaft and head. FIG. 8 shows a stepped drill 93 that cuts both clearances in a single process. Alternatively, the shaft and head clearance may be drilled with two drills in two process steps. If desired, the cap 11 of the temporary screw can be fabricated of a material that is easier to drill than the coping material to provide feedback on the drill position. It has been found that it is possible to distinguish where the drill is positioned by feel at the interfaces between the pick-up adhesive and the top of the cap (as shown in FIG. 8) and the bottom of the cap and the top of the coping. Since pick-up material was blocked from entering the coping, drilling resistance decreases rapidly upon breaking through the bottom of the cap and entering the interior channel of the coping. Color differences in the materials can also be detected. Alternatively, a tool can be configured to fit within the bore of the coping to limit the depth of the drill.

Figure 9:
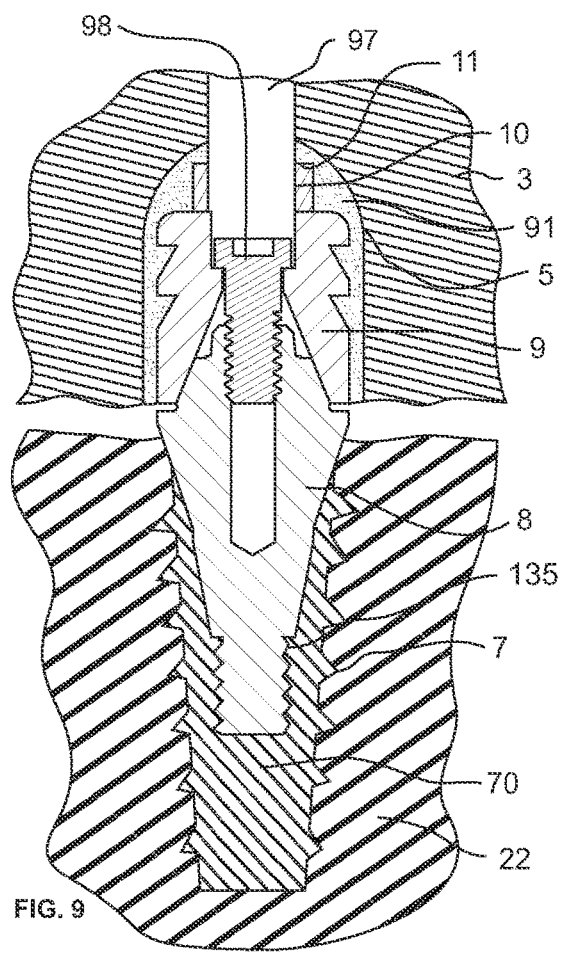
FIG. 9 is side cross-sectional view of the embodiment of FIG. 8 showing the definitive screw holding the prosthesis to the implant.

Once clearance bore 97 for the definitive screw has been made from the top of the prosthesis, the prosthesis is ready for mounting to the implant with definitive screw 98 as shown in FIG. 9. The screw clearance hole in the prosthesis may be filled with Teflon tape and color-matching composite materials for aesthetic purposes. In the illustrated embodiment, the coping bore has a shoulder to engage a flat surface on the underside of head of the screw. Alternate configurations are possible without deviating from the temporary screw system for coping pick-up disclosed.

Figure 10:
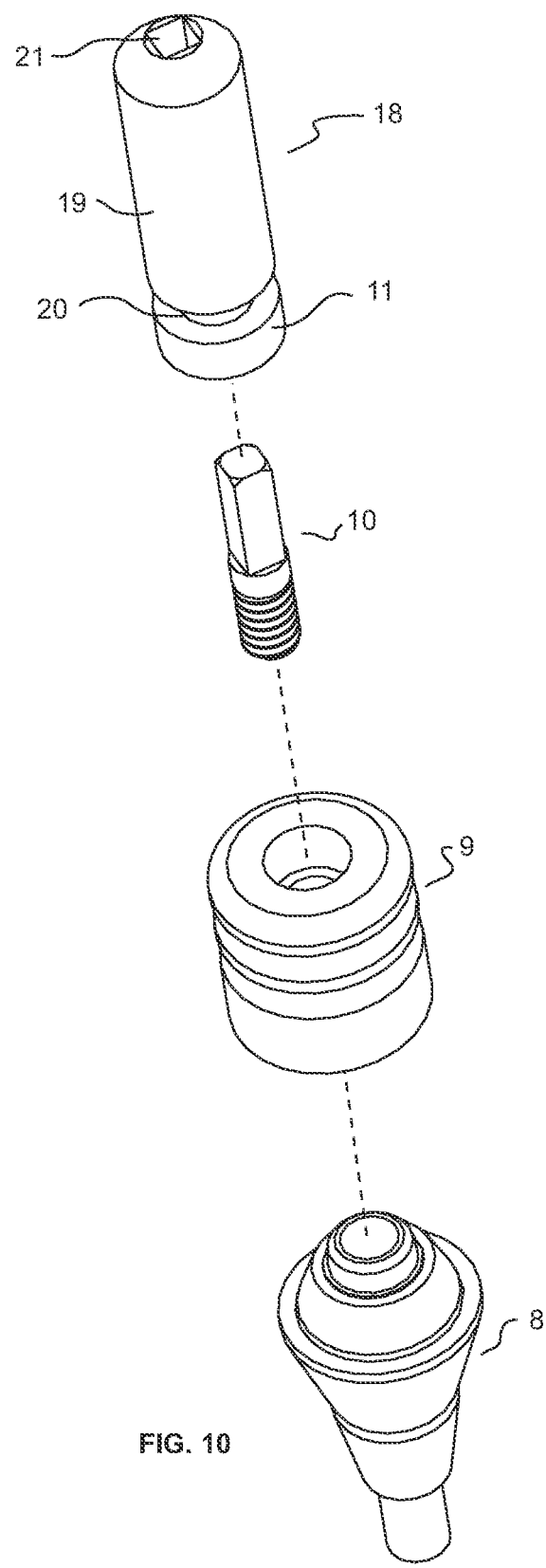
FIG. 10 is an exploded top isometric view of a second embodiment of a system for aligning a dental implant abutment, coping and prothesis for definitive screw-attachment illustrating a single implant abutment and a temporary screw with breakaway tool.

FIG. 10 is another exploded isometric view of parts of an embodiment of the invention. In this example, cap 11 is integrated into a breakaway installation tool 18. The tool portion 19 may be used to install the temporary attachment post 10, and then section 19 broken away at mechanically weak separation feature 20, for example, when the post bottoms out in the implant abutment leaving the cap portion 11 in position. Alternatively, the tool can be designed to increase stress on the separation feature as the top of the post moves axially down relative to the weakened section. As illustrated, after the cap portion 11 breaks away from the tool portion 19, drive feature 21 in the tool portion may be used to remove the post 10 after the pick-up process. One or both ends of the tool may be shaped to subsequently engage and remove the temporary attachment post 10 after installation of coping 9 into the denture.

Figure 11:
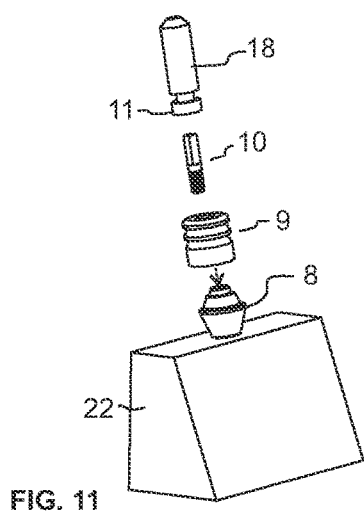
FIG. 11 is an exploded side isometric view of the second embodiment of FIG. 10 prior to installation to the implant abutment.

FIGS. 11-26 provide schematic isometric views of the process steps for using the elements of an exemplary embodiment introduced in FIG. 10 for a single implant system such as a crown. In FIG. 11, a schematic isometric view of a portion of the patient's jaw 22 is shown with an implant 70 (not shown) installed, and implant abutment 8 installed into the implant. The coping 9 is placed onto the implant abutment 8, the top portion of temporary attachment post 10 is assembled onto cap 11. The top portion of temporary attachment post 10 and cap 11 are configured such that there is a means to drive the temporary attachment post into the implant abutment, while allowing axial movement of the cap 11 relative to the temporary attachment post axis, the cap/temporary attachment post interface having sufficient retention force to keep the coping in place on the implant abutment during subsequent installation steps, and the temporary attachment post being removable after picking up the coping into the prosthesis. Cap 11 may be attached to a breakaway installation/removal tool 18.

Figure 12:
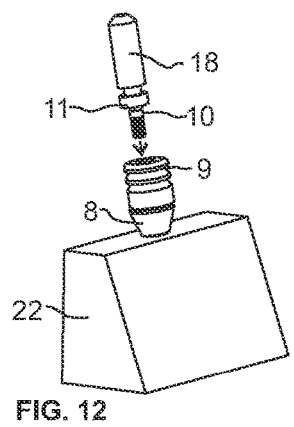
FIG. 12 is an exploded side isometric view of the embodiment of FIG. 10 with the breakaway tool pushed onto the post and the coping placed on the implant abutment.

FIG. 12 shows the coping 9 placed on the implant abutment 8 and the cap/tool 18 installed onto temporary attachment post 10. The coping-implant abutment surfaces may comprise a conical or spherical concave feature on the coping 9 that mates with a complementary feature on the top of the implant abutment 8, as illustrated. Alternatively, keying features may be employed to restrict relative rotational orientation, particularly in the case of single implants.

Figure 13:
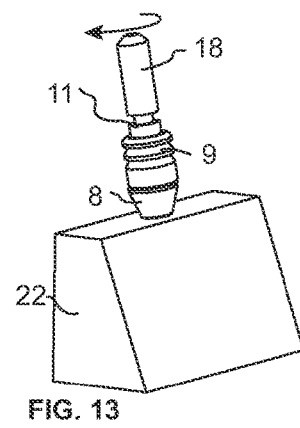
FIG. 13 is an exploded side isometric view of the embodiment of FIG. 10 schematically showing the tool being rotated to screw the post into the implant abutment.

FIG. 13 shows the temporary attachment post being threaded into the implant abutment 8, through a clearance hole in the coping 9. The cap abuts the coping to secure the coping to the implant abutment. The cap 11 is free to move axially along the temporary attachment post 10 with a frictional retaining force of the cap to the temporary attachment post. A known amount of retention force of the coping to implant abutment is provided by the design and materials used in the cap and temporary attachment post.

Figure 14:
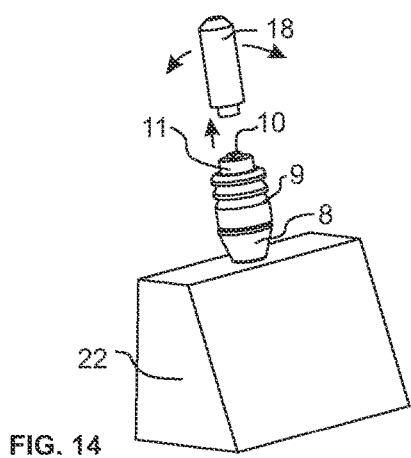
FIG. 14 is an exploded side isometric view of the embodiment of FIG. 10 schematically showing the tool breaking away from the cap after the coping is secured on the implant abutment.

FIG. 14 shows the tool portion of the cap being removed after the cap has broken away; the tool may be used for removal of the temporary attachment post at a later step.

Figure 15:
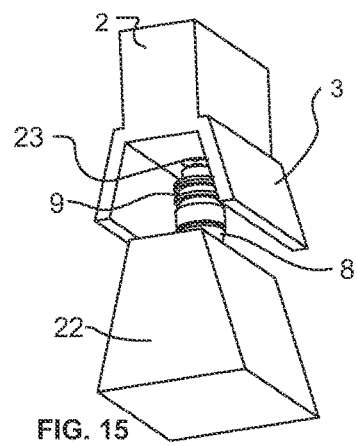
FIG. 15 is an exploded side isometric view of the embodiment of FIG. 10 schematically showing the prosthesis being marked for positioning a clearance hole.

FIG. 15 shows marking of the position of the coping onto the appliance for drilling a recess for the coping in the prosthesis.

Figure 16:
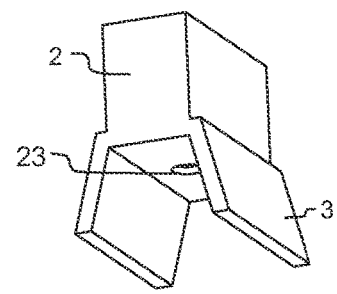
FIG. 16 is a side isometric view of the marked prosthesis from FIG. 15.

FIG. 16 shows the prosthesis with coping drilling location marking 23.

Figure 17:
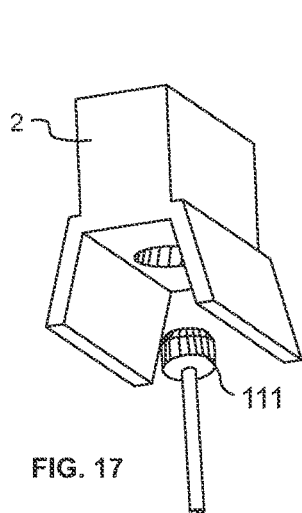
FIG. 17 is a side isometric view of the marked prosthesis from FIG. 16 with blind clearance hole and boring tool.

FIG. 17 shows the prosthesis after boring the cavity for the coping; the cavity for the coping may be accurately drilled slightly larger than the coping, without significant unwanted material removal from the prosthesis.

Figure 18:
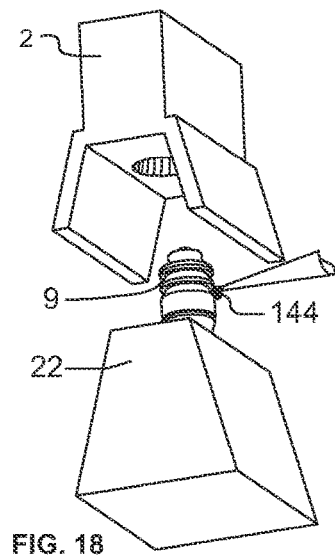
FIG. 18 is an exploded side isometric view of the prepared embodiment of FIG. 17 as adhesive is schematically applied to the coping fixed to the implant abutment with the temporary screw.

FIG. 18 shows pick-up material 144 being applied to the coping and/or prosthesis after confirmation of freedom to provide proper occlusion during dry testing. Although not illustrated, the cavity of the prosthesis or the coping may optionally include features to provide venting of excess pick-up material if desired.

Figure 19:
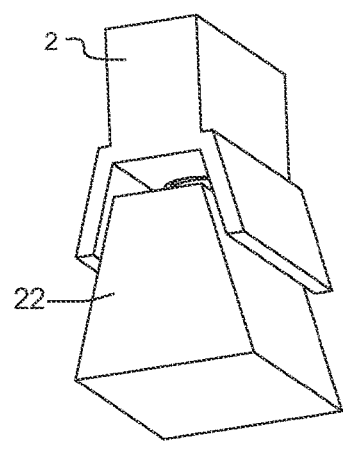
FIG. 19 is a side view of the prosthesis in position for curing of the adhesive applied in FIG. 18.

FIG. 19 shows the bonded coping being picked up into the prosthesis

Figure 20:
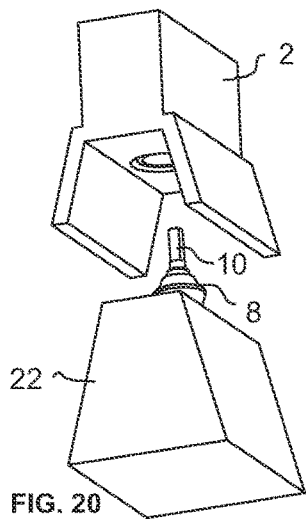
FIG. 20 is a bottom side isometric exploded view of the coping incorporated in FIG. 19 being picked up as the prosthesis is removed from the implant abutment.

FIG. 20 shows the prosthesis removed from the temporary attachment post; the temporary attachment post/cap design allows removal of the prosthesis from the temporary attachment post. The coping is now incorporated into the prosthesis.

Figure 21:
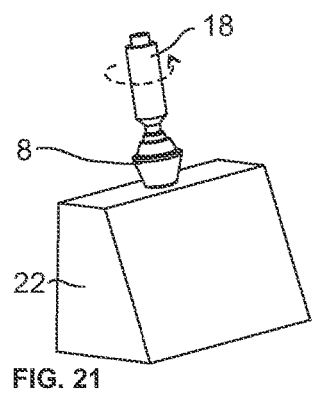
FIG. 21 is a top side isometric view schematically showing the post of the temporary screw being unscrewed from the implant abutment.

FIG. 21 shows the temporary attachment post being removed with the tool portion of the cap.

Figure 22:
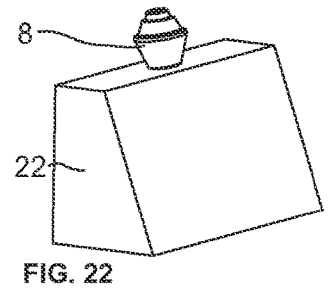
FIG. 22 is a top side isometric view of the implant abutment prepared for attachment of a prosthesis with a definitive screw.

FIG. 22 shows the implant abutment installed in the implant with the temporary attachment post removed.

Figure 23:
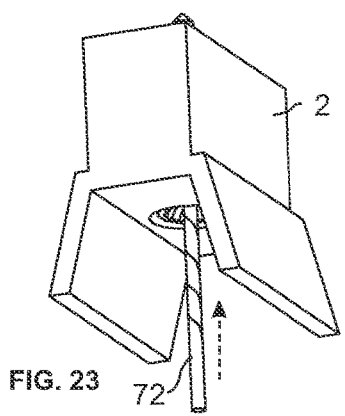
FIG. 23 is a bottom isometric view of the prosthesis with picked-up coping from FIG. 20 being drilled from the bottom to provide clearance for the threaded shaft of a definitive screw following coping pick-up.

FIG. 23 shows drilling a small guide-hole (for example 1-2 mm diameter), through the clearance hole of the coping, into and through the prosthesis. This guide hole provides a small reference hole for enlargement of the hole to accommodate the prosthesis retaining screw.

Figure 24:
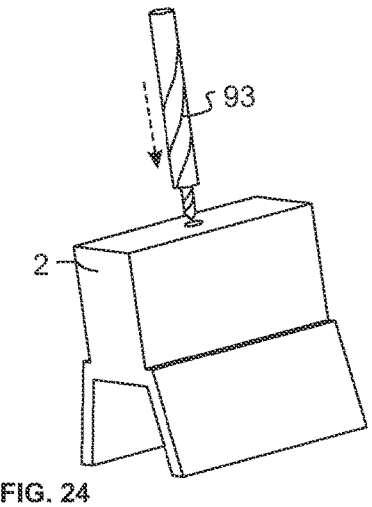
FIG. 24 is a top isometric view of the prosthesis with picked-up coping from FIG. 20 with a drill applied from the top to provide clearance for the definitive screw head.

FIG. 24 shows enlarging the guide hole to a clearance hole for prosthesis retaining screw, approximately the diameter of the head of the retaining screw (e.g. 1.5-2.5 mm). The clearance hole would typically be drilled down to the top surface of the coping.

Figure 25:
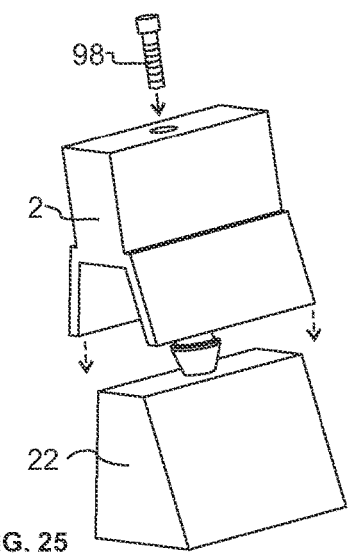
FIG. 25 is top exploded isometric view of the prepared prosthesis from FIG. 24 with the definitive screw.

FIG. 25 shows the prosthesis being installed onto the implant abutment by placing the prosthesis coping onto the implant abutment, and installing the prosthesis retaining screw.

Figure 26:
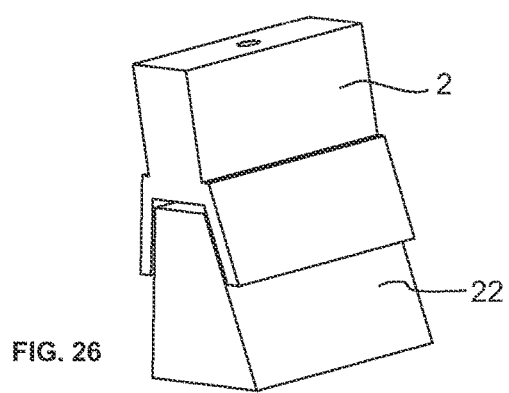
FIG. 26 is a top isometric view of the prepared prosthesis from FIG. 24 after attachment to the implant abutment with the definitive screw.

FIG. 26 shows the assembled prosthesis on the implant.

Figure 27:
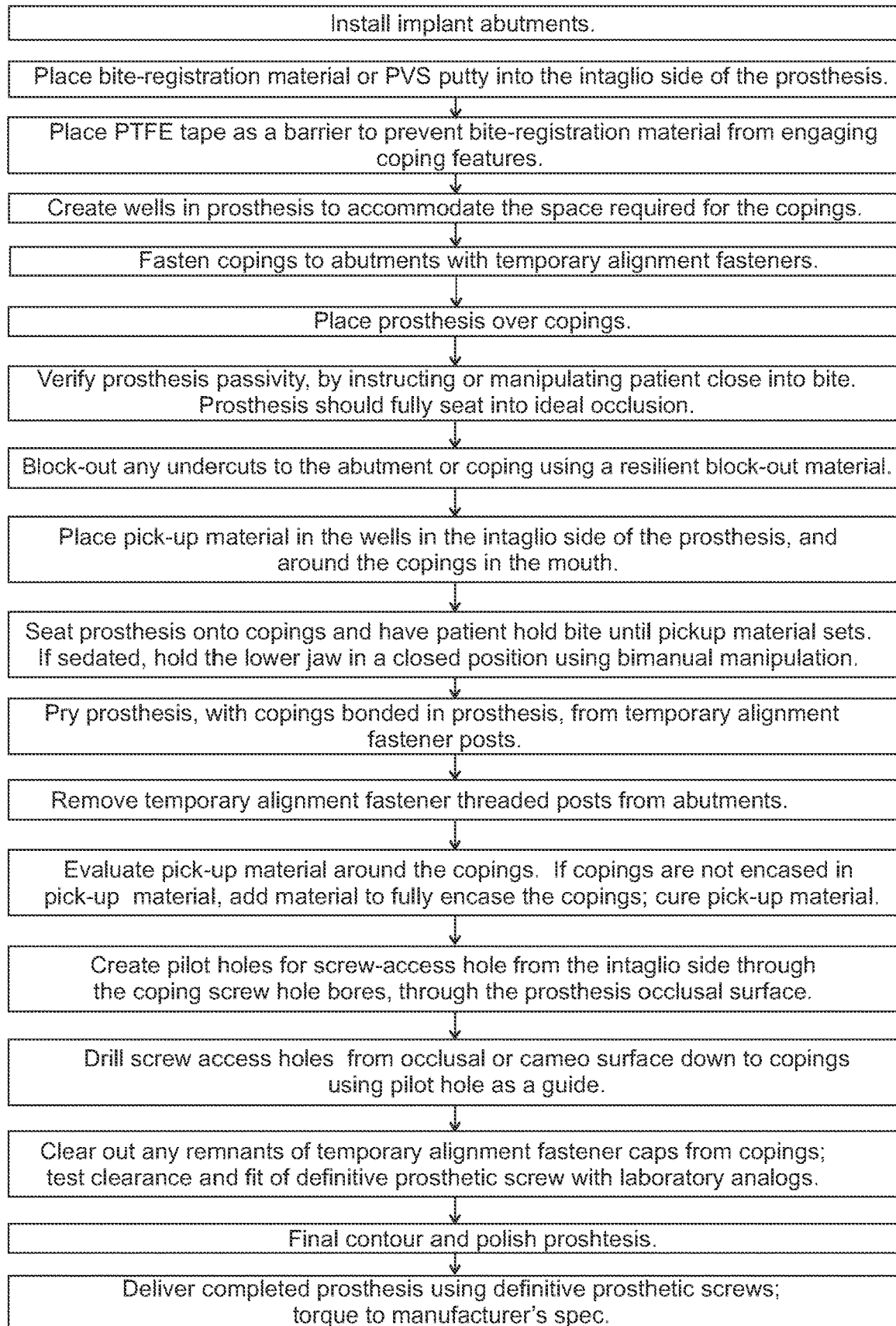
FIG. 27 is a schematic description of a process for aligning dental implant abutments, copings, and a prosthesis for definitive screw-attachment.

FIG. 27 contains a summary of a generalized process extending the basic process described above for a prosthesis attached to multiple implant abutments.

Figure 28:
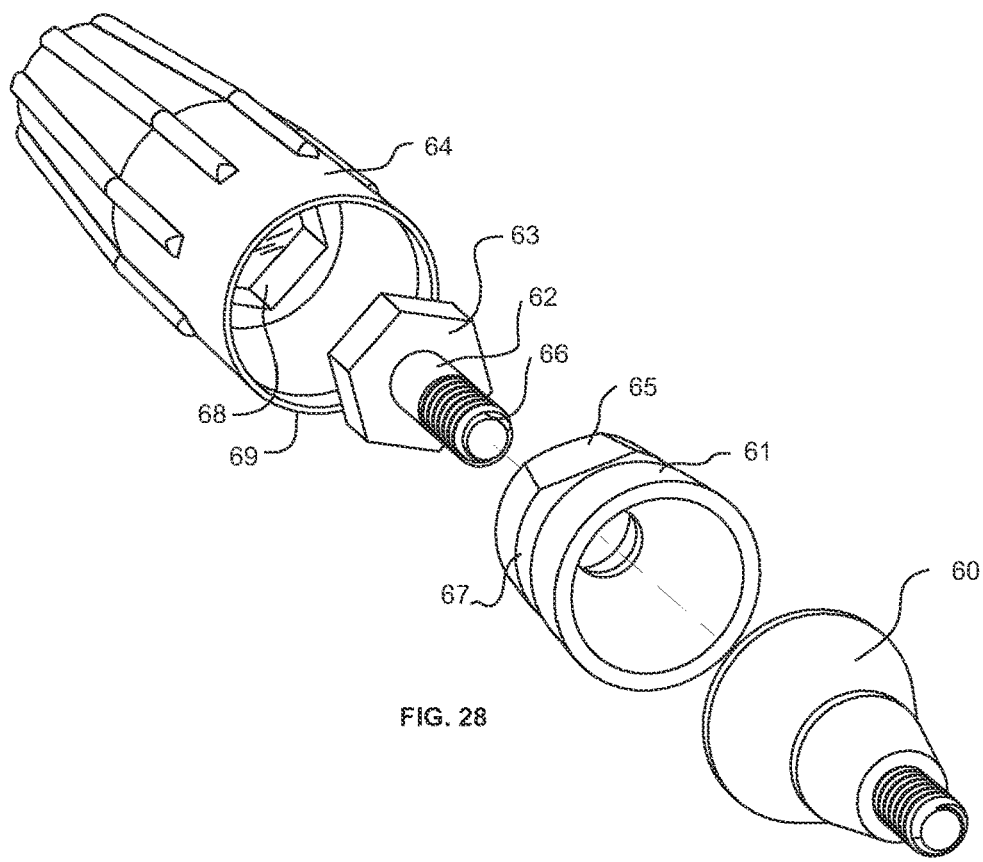
FIG. 28 is an exploded bottom isometric view of a third embodiment of a system for aligning a dental implant abutment, coping and prosthesis for definitive screw-attachment with tool oriented for assembly.
Figure 29:
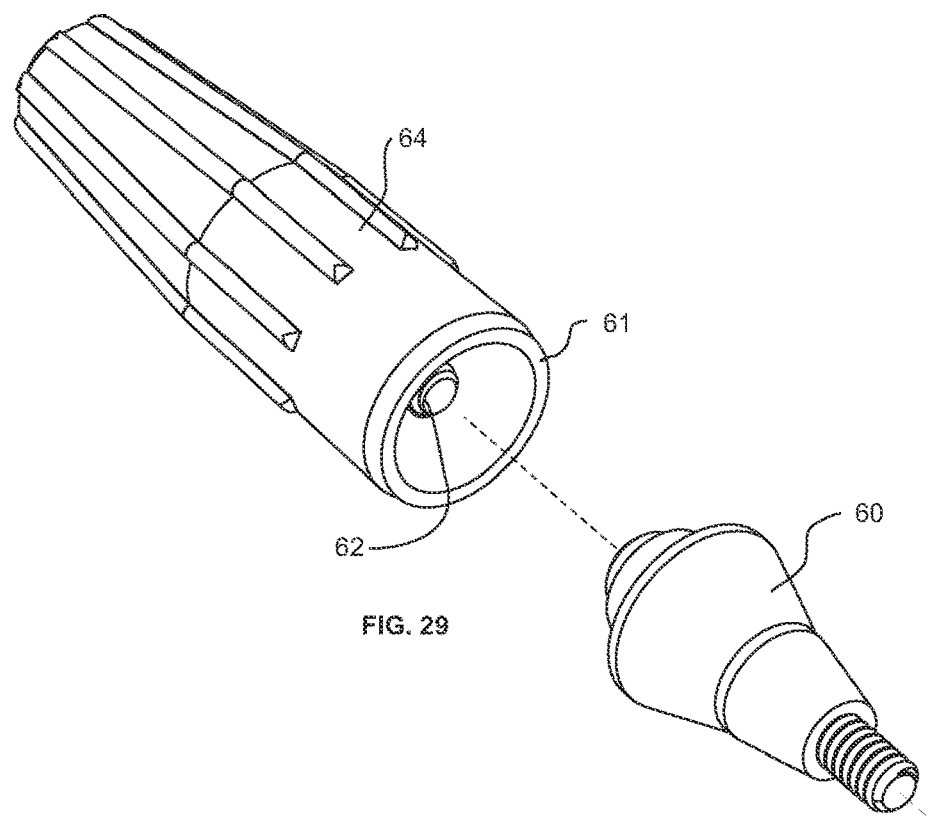
FIG. 29 is an assembled bottom isometric view of the embodiment of FIG. 28 with temporary screw and coping inserted into tool.
Figure 30:
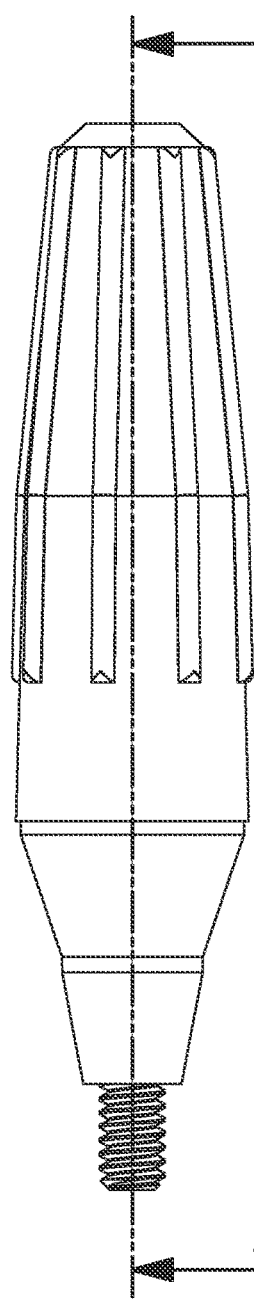
FIG. 30 is a side view of the system of FIG. 29 after assembly with the implant abutment.
Figure 31:
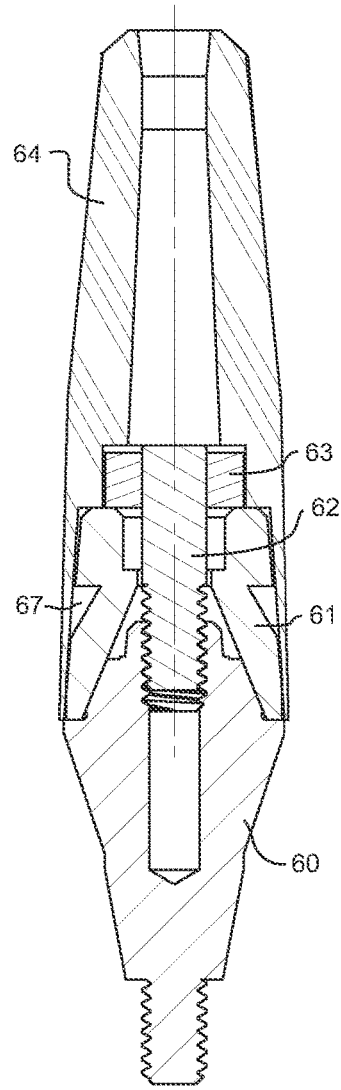
FIG. 31 is a cross-sectional view of the assembly of FIG. 30 along C-C.
Figure 32:
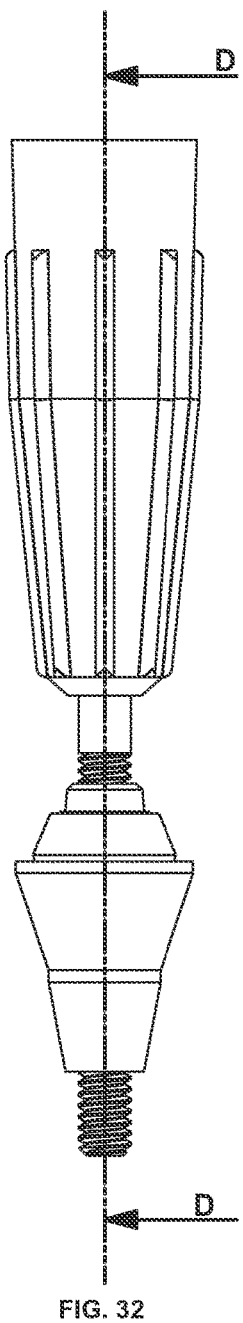
FIG. 32 is a side view of the assembly of FIG. 28 after the pick-up process showing the removal end of the tool engaging the retained temporary screw post.
Figure 33:
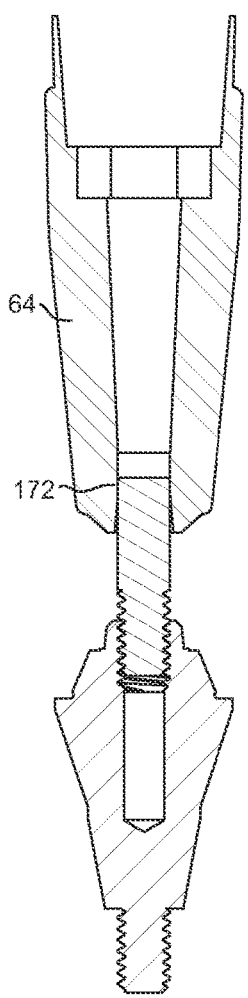
FIG. 33 is a cross-sectional of the assembly of FIG. 32 along D-D.

Another embodiment of a prosthesis and implant alignment system and tool are shown in FIG. 28. In this case, the cap is in the form of a hex nut 63 that is press fit onto alignment post 62 to act as the temporary alignment screw. The drive tool 64 includes a concave hex socket 68 that fits temporary post nut 63, and coping retaining portion 69 that retains coping 61 with a slight interference fit. Thus, as shown in FIG. 29, the temporary screw comprising nut 63 with post 62 is engaged with the socket portion of the tool, and the coping 61 is retained in the tool. The coping is seated onto the implant abutment 60 by using the hex portion of the driver to rotate the nut and engage the threads 66 on the temporary screw post 62. FIGS. 30 and 31 show an exterior and cross-sectional view of the mounting of the coping on the implant abutment with the tool. The tool may also have an integrated feature for removing the post as shown in FIG. 32. For example, FIG. 33 shows a tapering feature 172 on the narrow end of tool 64 which may be used to unscrew the post FIG. 28 illustrates optional undercut 67 for stronger adhesive locking. Optional anti-rotation flat 65 is shown Such an anti-rotation flat may be used on mating surfaces in circumstances in which there is a preferred orientation around the axis of the screw threads.

Figure 35:
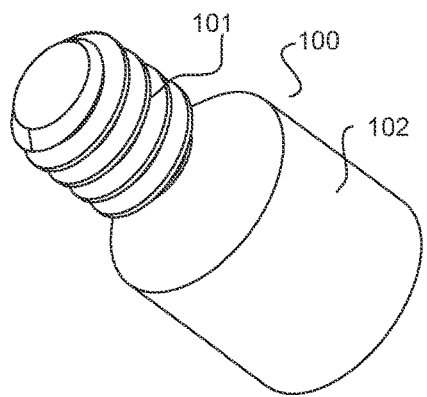
FIG. 35 is an isometric view of the temporary screw of FIG. 34 from the screw thread end.
Figure 36:
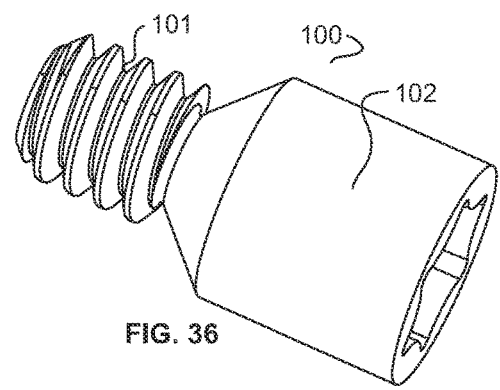
FIG. 36 is an isometric view of the temporary screw of FIG. 34 from the cap end.
Figure 34:
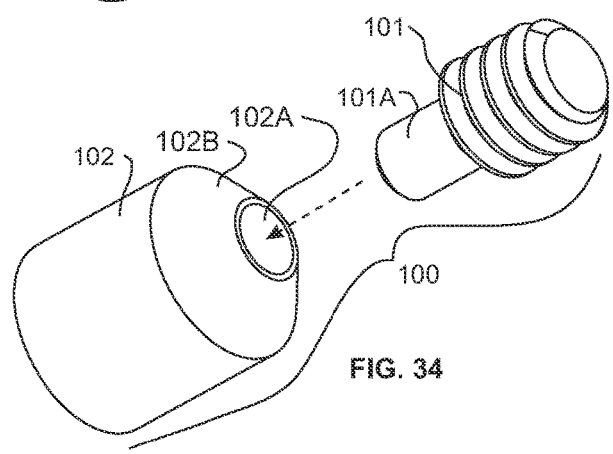
FIG. 34 is an exploded isometric view of another embodiment of a temporary screw of a system for aligning a dental implant abutment, coping and prosthesis for definitive screw-attachment.

Another embodiment of the inventive concepts in which the cap of the temporary screw is shaped to engage the driving tool is shown in FIGS. 34-36. Cap 102 is mechanically attached to alignment post 101 at end portion 101A to form temporary alignment screw 100. This mechanical attachment may result from press-fitting a polymeric cap 102 with interface bore portion 102A onto an alignment post 101 to provide adequate resistance to rotary slip to temporarily attach the coping to the implant abutment while still allowing relative axial movement during the pick-up process. The cap 102 may include a tapered surface 102B shaped to match the mating surface of an associated coping 112. A hexalobular internal (Torx) drive feature is shown in the end of the cap 102, although other bit socket shapes are possible. As previously discussed, other mechanical engagement means besides an interference fit are possible. The post may be made of different materials than these, or even be of unitary construction with weakened sections that fracture or otherwise breakaway under a desired pick-up axial force.

In a preferred embodiment the alignment post 101 is made from stainless-steel or titanium, and the cap of polymer such as PEEK or acetal. The short length of the post and threaded fastener in this embodiment allows separation at high degrees of angularity of the assembled parts in use. This tolerance for off-axial removal has been found to be particularly advantageous when the prosthesis is to be definitively screw mounted to multiple implant abutments. Testing has verified cap axial release forces of up to about 5 pounds and the application of torque to the cap of about 1.6 inch-ounces without slipping.

The general process for converting an existing removable denture for definitive screw attachment onto four implants with this embodiment is illustrated in FIGS. 37-50. This prosthesis may be, for example, a removable denture that was used prior to implant surgery or a duplicate of such an existing denture as described in U.S. Provisional Patent Application 62/774,402 incorporated herein in its entirety.

Figure 37:
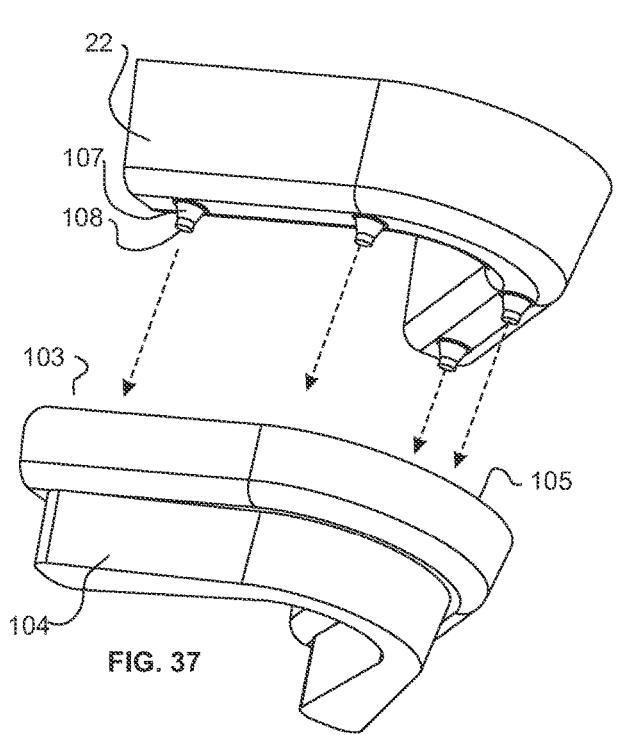
FIG. 37 is a bottom isometric view of a jaw with multiple implant abutments in preparation of marking a prosthesis as part of the process for aligning a dental implant abutment, coping and prosthesis for definitive screw-attachment.
Figure 38:
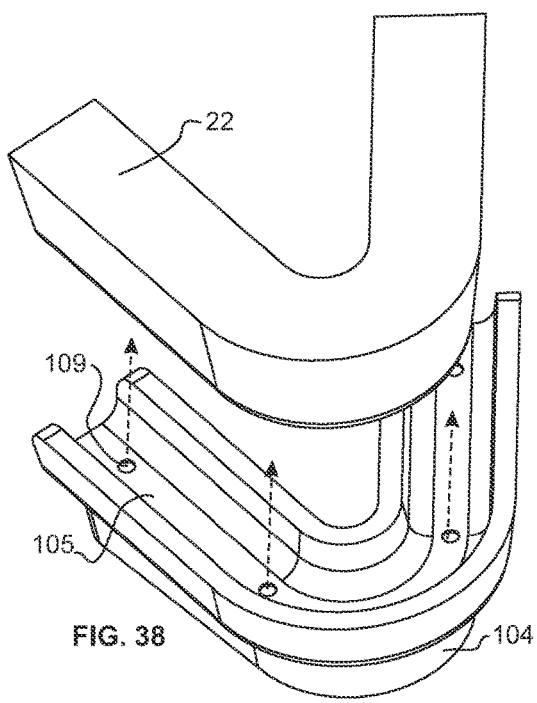
FIG. 38 is a top isometric view of the prosthesis of FIG. 37 showing implant abutment location markings.
Figure 39:
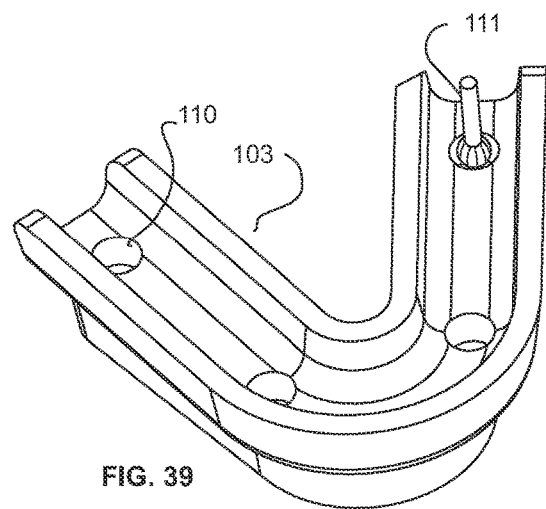
FIG. 39 is a top isometric view of the prosthesis with clearances milled to receive copings for pick-up.

FIG. 37 shows a schematic representation of a human jaw portion 22 with implant abutments 107 installed. It does not matter for this discussion if the implant abutments are separable from the implanted portion of the implant or not. Prosthesis 103 is shown with occlusion side 104 and intaglio side 105. Pickup marking caps 108 are installed onto implant abutments 107. The location of implant abutments 107 is marked onto the prosthesis using customary methods by mating the prosthesis with the implant abutments. FIG. 38 shows the implant abutment positions 109 marked onto prosthesis 103. FIG. 39 shows boring of blind holes 110 slightly larger than copings 112 in marked locations with burr tool 111.

Figure 40:
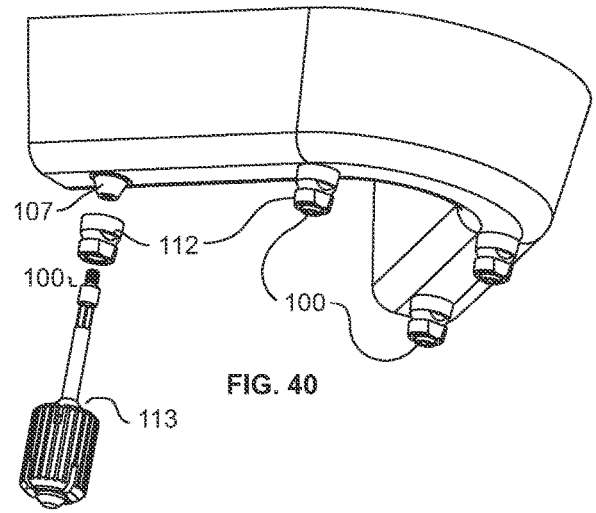
FIG. 40 is a bottom isometric view showing installed copings and the assembly of a coping to an implant abutment with a temporary screw and torque driver.

FIG. 40 shows the installation of copings 112 onto implant abutments 107 using separable fastener assembly 100, and torque driver 113 (described in more detail later). The torque driver 113 prevents over-tightening of temporary screw 100 and possible separation of the cap 102 from the post 101 due to rotary motion. The cap 102 and/or post 101A of each separable fastener 100 may be mechanically captured or adhered to the coping 112, or may be designed to loosely fit into the bore of the coping as illustrated with axial force from tightening the separable fastener holding the copings to the implant abutments 107. The prosthesis is placed over the mounted copings to ensure proper fit.

Figure 41:
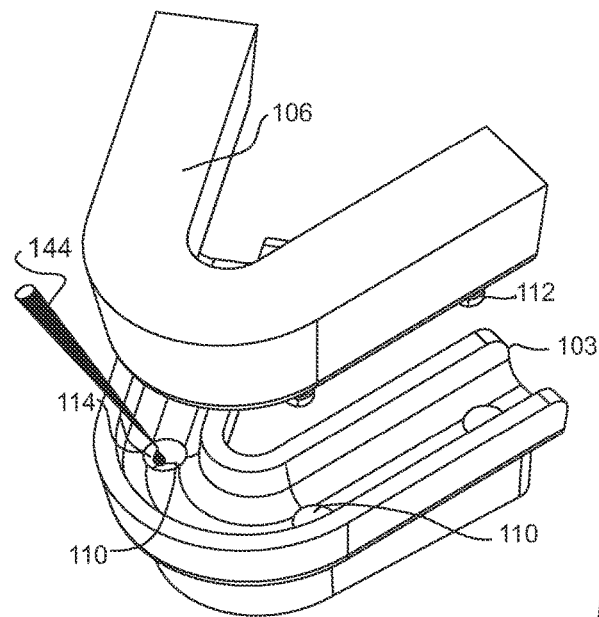
FIG. 41 is a top isometric view showing adhesive being dispensed in recesses of the prosthesis.

FIG. 41 shows application of acrylic or other adhesive 144 into cavities 110 of prosthesis 103, which is subsequently fitted onto copings 112.

Figure 42:
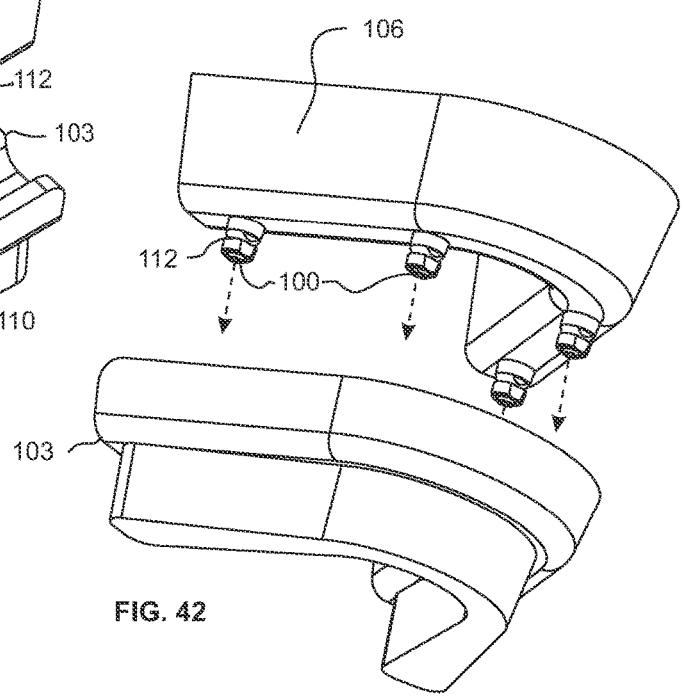
FIG. 42 is a bottom isometric view of the implant abutments with attached copings in the process of being positioned into the recesses of the prothesis after adhesive is dispensed.

FIG. 42 shows prosthesis 103 being mated with copings 112. After the adhesive sets, the separable fasteners allow easy removal of the prosthesis from the implant abutments with the copings incorporated into the prosthesis. The angular tolerance for removing the prosthesis from multiple implant abutments allows applying pick-up forces sequentially around the edge of the prosthesis to work the caps 102 off the posts 101. The caps 102 remain in the prosthesis with the copings 112, while the posts 101 remain in the implant abutments.

Figure 43:
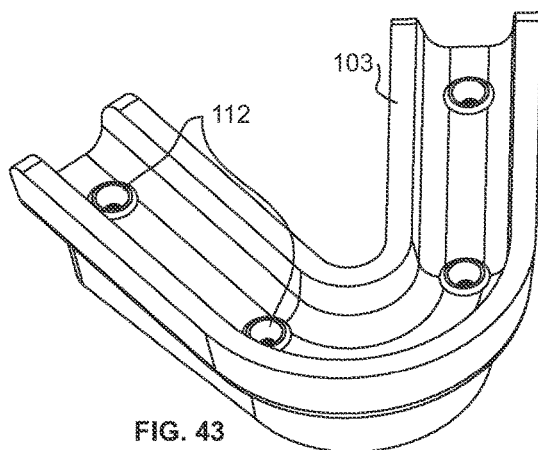
FIG. 43 is a top isometric view of the copings attached to the prosthesis after adhesive curing and pick-up.

FIG. 43 shows the prosthesis with incorporated copings 112 after the pick-up process.

Figure 44:
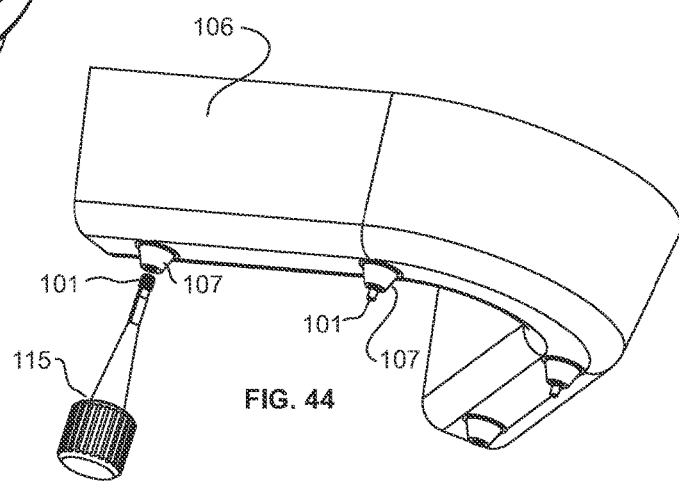
FIG. 44 is a bottom isometric view showing the removal of temporary screw posts from the implant abutments after the pick-up process.

FIG. 44 shows the removal of the threaded post 101 from the implant abutment with removal tool 115. This allows the implant abutment threads to be accessible for subsequent definitive screw attachment.

Figure 45:
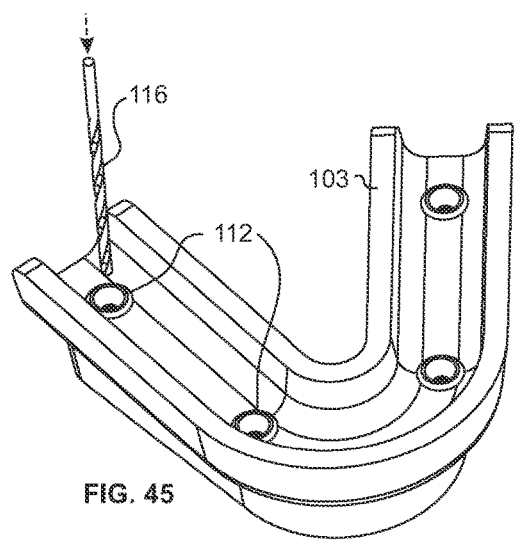
FIG. 45 is a top view of a drill in position to create a pilot hole in the prosthesis of FIG. 43.
Figure 46:
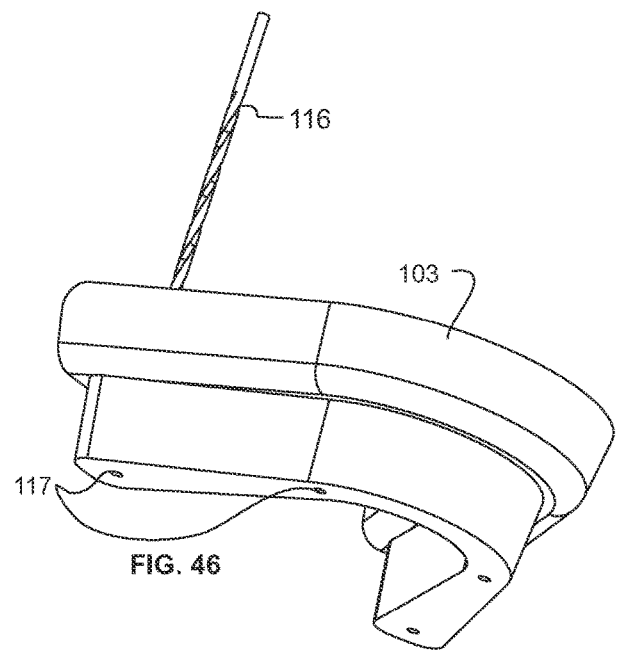
FIG. 46 is bottom view showing the pilot holes from the process of FIG. 45 extending through the prosthesis to exit on the occlusion side.

FIG. 45 shows the drilling of the small pilot hole 117 (e.g. using a drill bit 116 of approximately 1.4 mm diameter), from the intaglio side 105 of the prosthesis out through the occlusion side 104. It has been found that the bore of the coping 112 and the bore of the cap provide adequate guidance for this hole, although a tooling guide could readily be designed to mate with the particular coping used. The pilot hole is drilled completely through the prosthesis to the occlusion side 104 as shown in FIG. 46.

Figure 47:
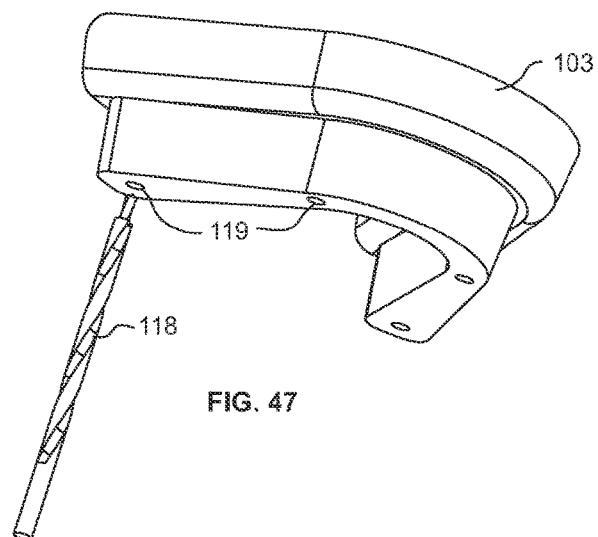
FIG. 47 is a bottom isometric view showing a clearance bore positioned on the occlusion side of the prosthesis to provide clearance for the definitive screw.

FIG. 47 shows enlarging of the pilot hole 117 to allow clearance for a prosthetic mounting screw 121. The clearance holes 119 may be drilled down to the top of the coping using clearance bore drill 118. This requires only a small diameter enlargement (for example, approximately 2.4 mm).

Figure 48:
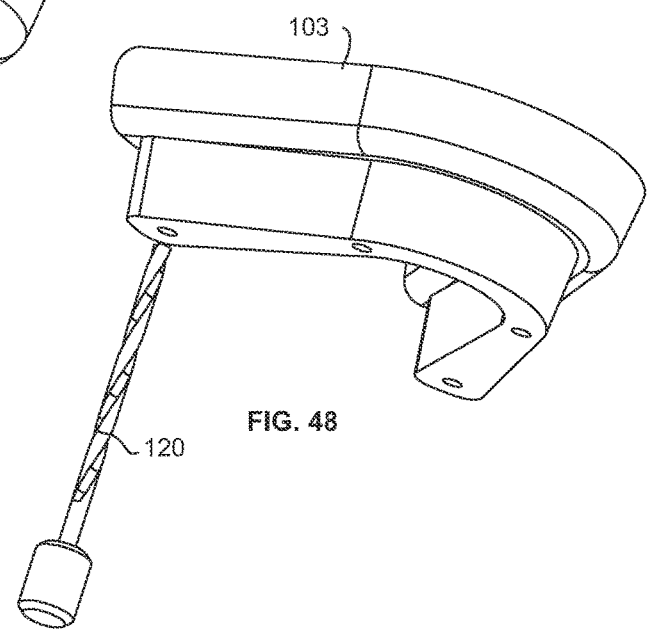
FIG. 48 is a bottom isometric view illustrating a reamer positioned to clean residue from the bore.

FIG. 48 shows a step of a final hand reaming with reamer 120 of the coping bore to clean out any debris or remaining material from the cap that would interfere with the definitive screw. This reamer 120 may simply be a drill of intermediate diameter between the pilot drill 116 and clearance drill 118.

Figure 49:
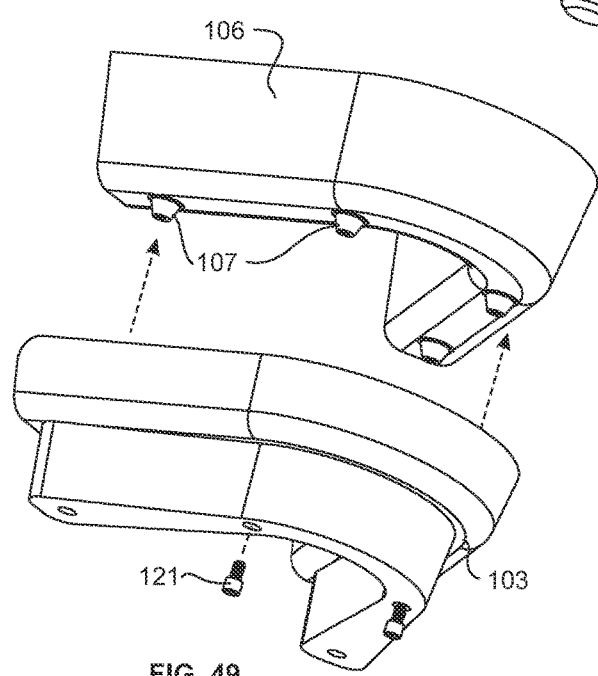
FIG. 49 is a bottom isometric view of the prepared prosthesis with definitive mounting screws prior to fastening to the implant abutments.
Figure 50:
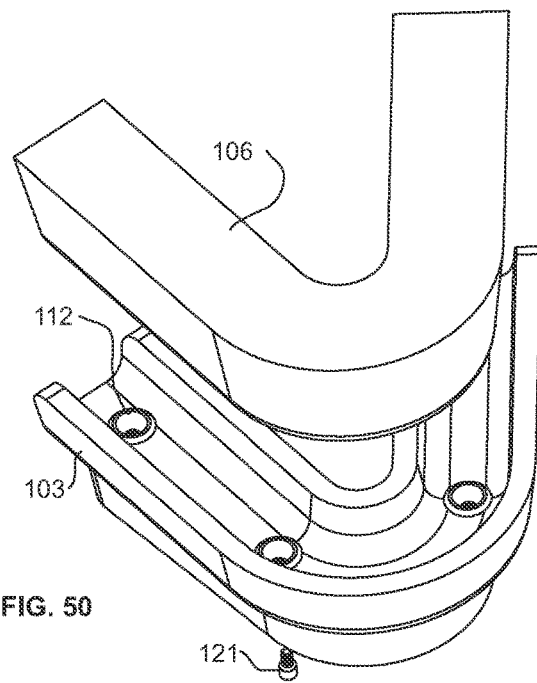
FIG. 50 is a top isometric view corresponding to FIG. 49.

FIGS. 49 and 50 show the final installation of prosthesis 103 onto implant abutments 107 using definitive prosthetic screws 121. The screw holes may be subsequently filled to use the modified prosthesis depending upon the anticipated use as a short-term or more permanent prosthesis. This sequence of process steps essentially follows the material provided in FIG. 27.

Figure 113:
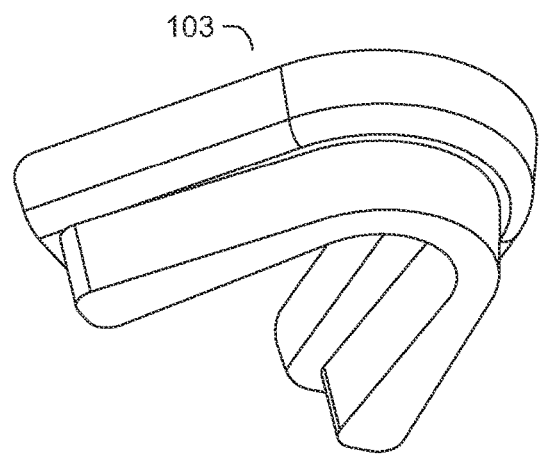
FIG. 113 is a bottom isometric view schematically illustrating the material removed from an existing denture necessary with inventive concepts disclosed in preparation for pick-up.
Figure 114:
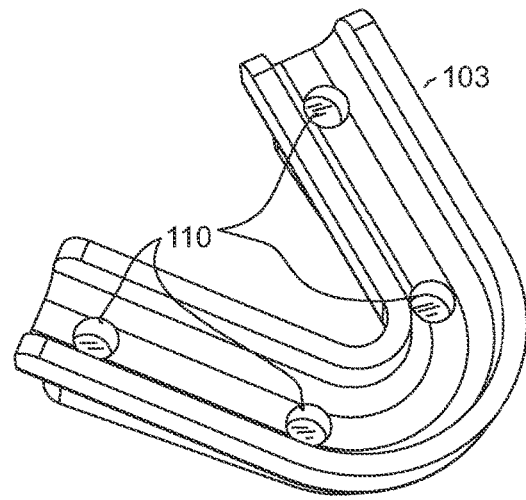
FIG. 114 is a top isometric view schematically illustrating the material removed from an existing denture necessary with inventive concepts disclosed in preparation for pick-up.
Figure 115:
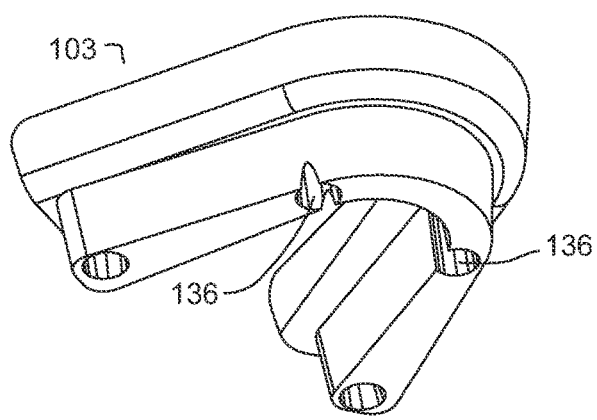
FIG. 115 is a bottom isometric view schematically illustrating the material removed from an existing denture necessary using prior art impression screw systems.
Figure 116:
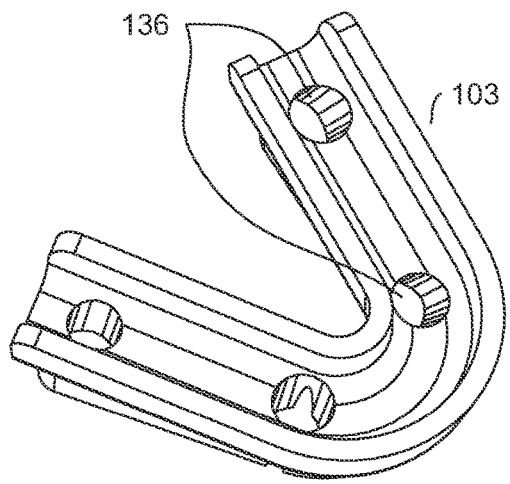
FIG. 116 is a top isometric view schematically illustrating the material removed from an existing denture necessary using prior art impression screw systems.

Note that in the above procedure very little material is removed from the prosthesis during the coping pick-up installation process. The boring process in FIG. 39 need only be sufficient to provide clearance for the coping and temporary screw. Angular variation in the axes of the implant abutments does not appreciably increase the size of the cavity boring required in this closed tray process compared to the additional prosthesis material that must be removed with relatively long impression screws and sleeves in a conventional open tray conversion process for definitive screw attachment. FIGS. 113-114 provide a schematic comparison of the size of the recess borings required using the concepts disclosed compared to the prior art conversion process with larger through holes in FIGS. 115-116.

The converted prosthesis with copings and screw-access channels may also be used as an accurate digital scan model of implant abutment positioning for creating a new prosthesis. In this embodiment, dual purpose scan flag and lab analogs 122 shown in FIGS. 51-52 may be fastened to the provisional or duplicate prosthesis 103, for example, after the clearance hole cleaning shown in FIG. 48. Features that may be present on the scan-flag/analog include a scan-flag reference portion 123 near the top of the analog, reference scan-flag features such as flats 124, axial and radial retention feature 128, screw attachment 125 for scanning fixture and/or reinforcement wire attachment. The implant abutment features 126 are specific to various systems commercially available. The figures show a tapered implant abutment mating surface 126 and female thread 127.

FIGS. 53-54 show scan flag/analogs 122 attached to converted prosthesis 103 with copings 112 using definitive screws 121.

Figure 55:
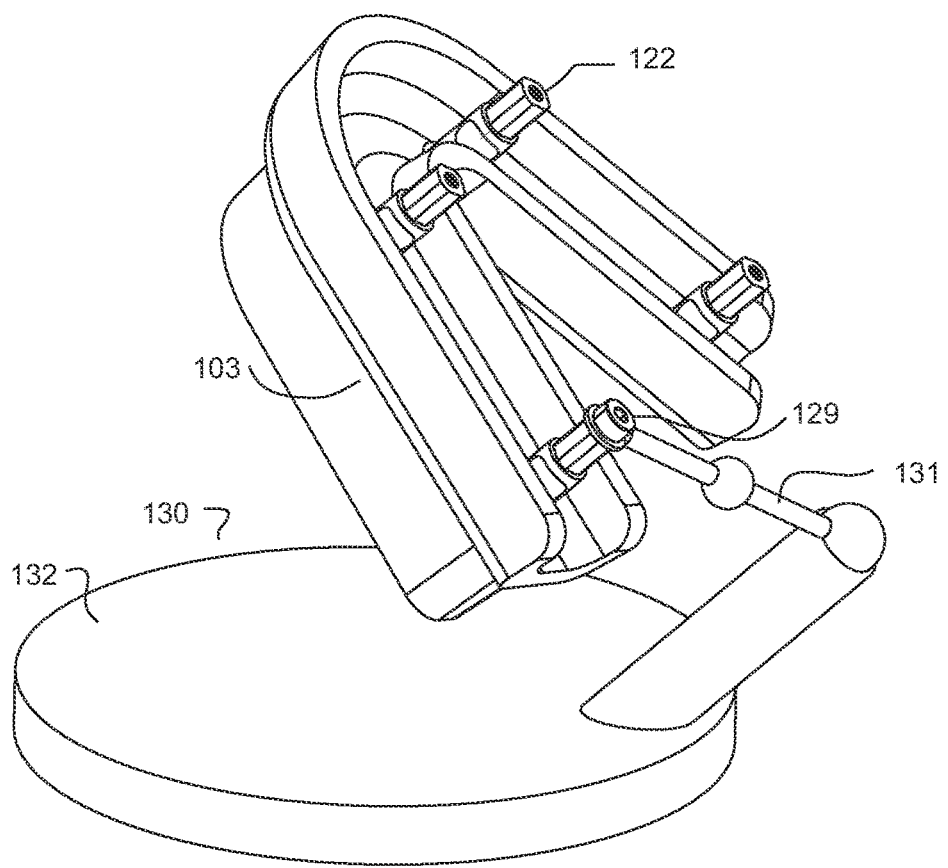
FIG. 55 is a top isometric view showing the assembly of FIG. 54 mounted on a stand in preparation for scanning.
Figure 56:
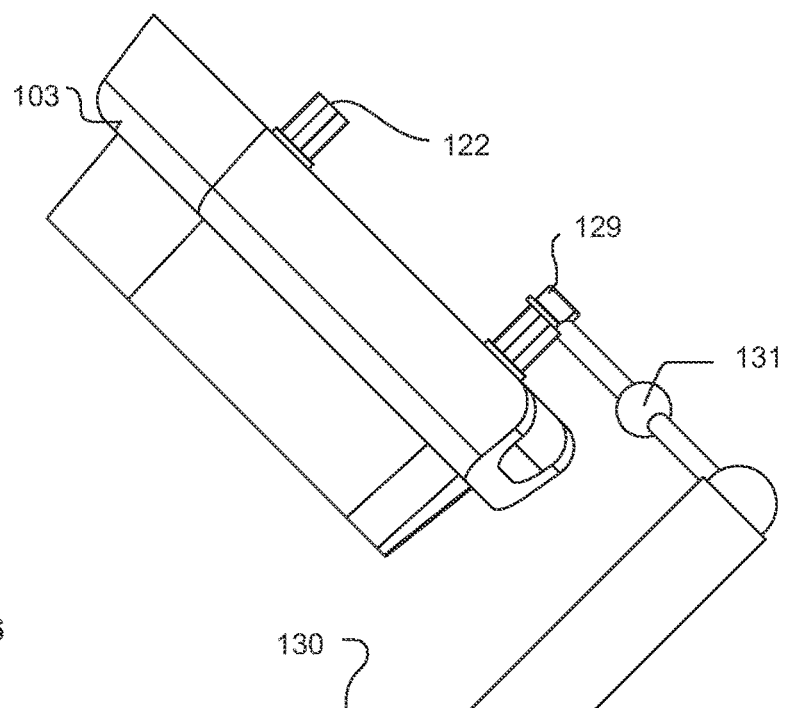
FIG. 56 is a side view of FIG. 55.

FIGS. 55-56 show converted prosthesis 103 with scan flags/analogs 122 mounted to fixture 130 by attaching one or more scan flags 122 to the base with adjustable means to orient the prosthesis properly for scanning. For illustration, an approximate mounting angle of 45 degrees is shown. In this example, the converted prosthesis 103 is mounted to articulated arm 131 with screw 129 that fits into the threaded hole of scan-flag/analog 122. Base 132 is mounted onto the base of the scanning machine.

The provisional or duplicate prosthesis with attached scan flags/lab analogs is scanned into the design software. This process captures the accurate position of the implant multi-unit implant abutment relative to the soft tissues and it also captures the tested prosthetic contours to aid in the design of the definitive prosthesis. After the prosthesis has been scanned in, a physical model may optionally be created by creating a soft tissue moulage and pouring dental stone into the provisional or duplicate prosthetic utilizing the scan flags as the laboratory analogs.

Figure 57:
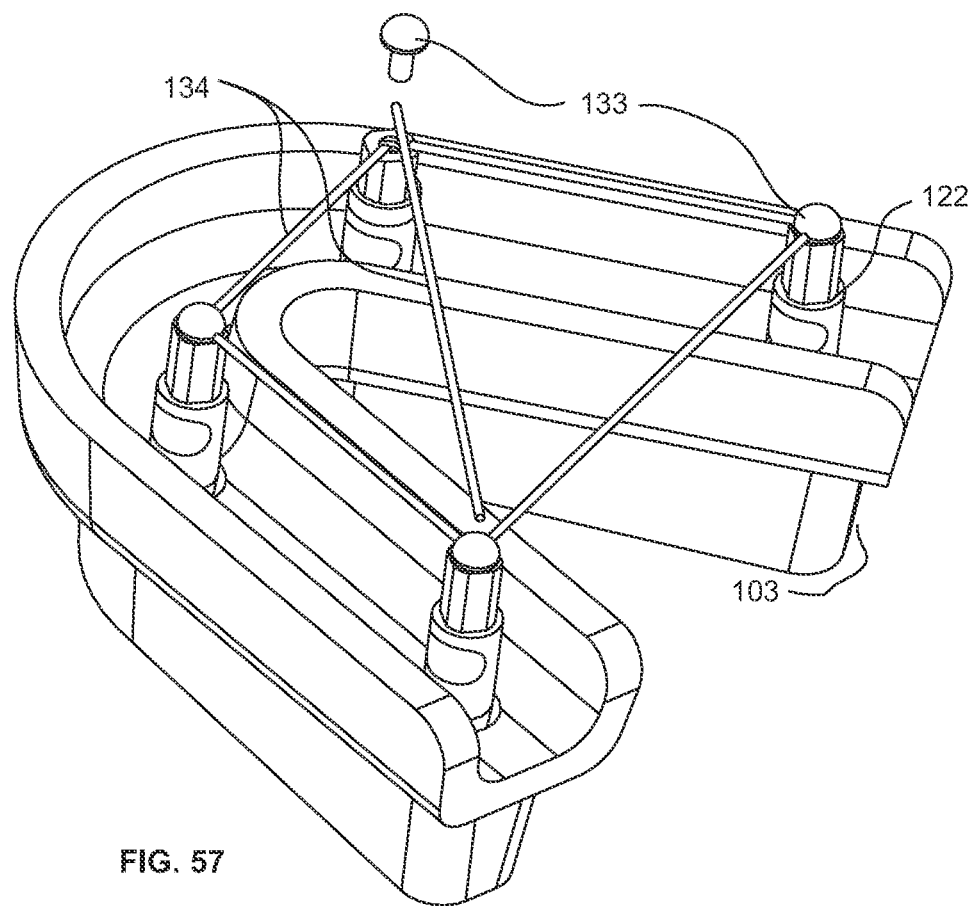
FIG. 57 is an isometric view of the assembly of FIG. 54 with reinforcing bars mounted prior to pouring of dental stone.

FIG. 57 schematically shows the application of solder or brazing preforms 133 to attach reinforcement bars 134 prior to pouring dental stone. Preforms 133 may be inserted into holes in the scan-flag/analogs and heated to attach bars 134. Low-temperature solders, brazing compounds, and hot-melt or other adhesives may be utilized in a preform or dispensed method to increase the rigidity of the analog assembly prior to casting.

This method ensures a fast and efficient means of transferring all pertinent and relevant information from a converted denture required for designing a definitive prosthesis from digital scanning and creating the most accurate and precise physical model that can be mounted in an articulator with the aid of a bite registration in preparation for post-processing of the machined prosthesis, for example to verify passivity of fit, occlusion, etc.

In addition to the screw attachment of the scan flags to the modified prosthesis, scan flags may be attached to the prosthesis with incorporated copings of FIG. 43 prior to the drilling operations shown in FIGS. 45-47. In this case, another embodiment of the scan flag (not shown) with a post feature equivalent to post feature 101A of separable screw would be inserted into copings 112 of the modified prosthesis and retained by the embedded cap 102. If the separable fastener uses a snap-fit feature to retain the cap to the post, drilling may not be required through the prosthesis to mount the scan flags or lab analogs to the prosthesis or to attach the modified prosthesis to the implant abutments after lab use. For example, U.S. Provisional Patent Application 62/774, 402 describes the use of spring fingers and O-rings for separable fastening of the coping to the implant abutment for lift-off, and the use of films to prevent adhesive from entering interior portions of the separable fastener. Scan flags and lab analogs may also be engaged with transferred copings using similar mounting features as the post used in the transfer pick-up process. The referenced patent application also includes separable systems in which the post attaches directly to the coping without a cap which may be applied for mounting scan flags or lab analogs as variations of the methods described above. Since the dimensions of the coping and its engagement with the implant abutment is precisely controlled, having snap-in scan flags engage with a cavity between the top of the coping and the separable cap or an internal groove or other feature of the coping may be desirable.

Figure 58:
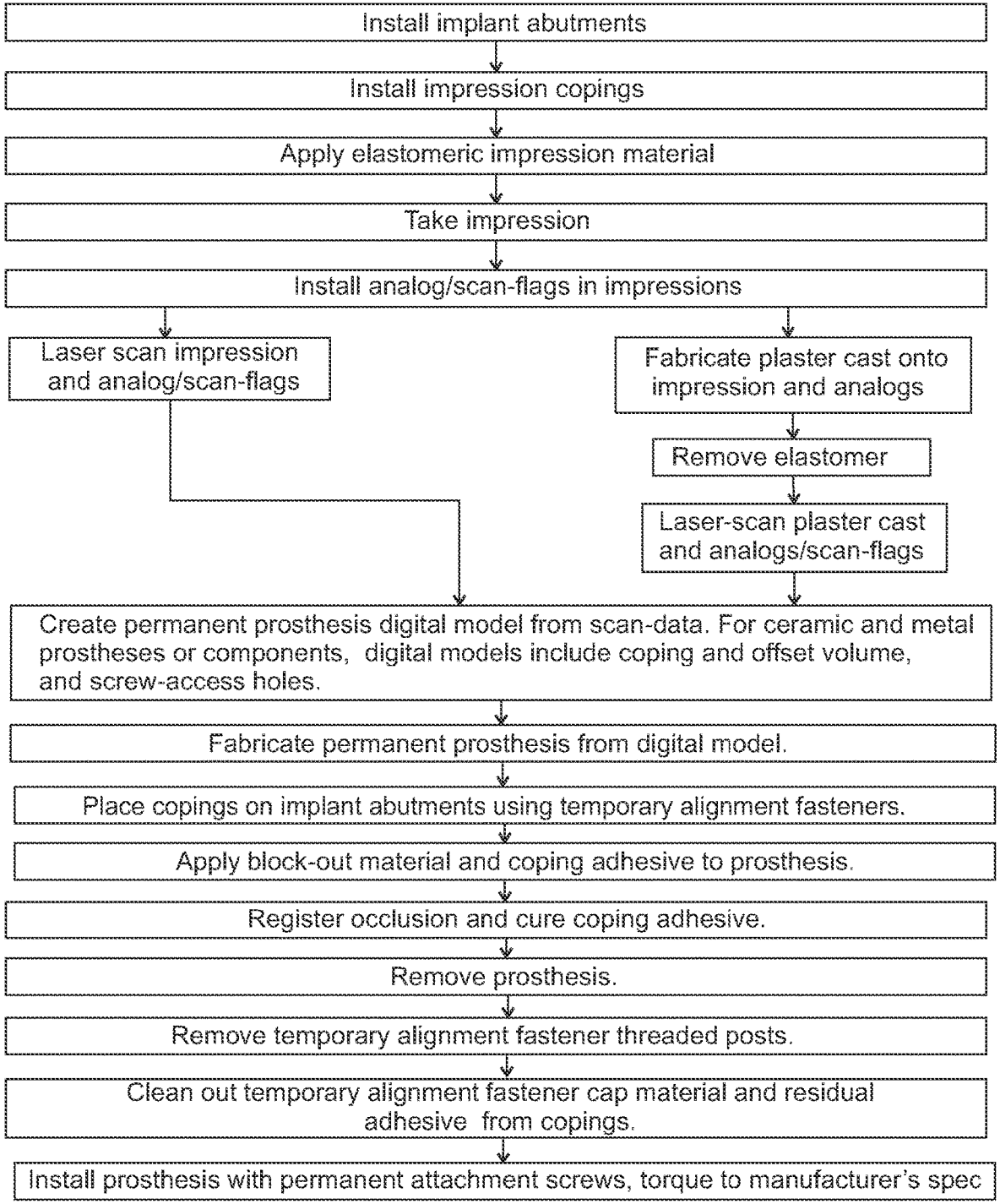
FIG. 58 is a schematic flow chart illustrating options for creating and attaching a permanent prosthesis.

Variations of using the modified prosthesis as a digital scan model, or using the inventive concepts disclosed to create a permanent prosthesis will be recognized as possible to dental practitioners. For example, instead of using a dual-purpose scan flag and lab analog, single purpose scan flags can be mounted into the provisional prosthesis for scanning, and subsequently replaced with lab analogs prior to casting. In addition to the attachment of scan flags to a modified prosthesis for digitization, the separable fastener may be used to transfer a coping and cap to a new impression after implant surgery. A scan flag or lab analog may be attached and held to the impression with transferred coping for digitization or casting by substituting the new impression for the modified prosthesis in any of the processes above. FIG. 58 describes a work-flow for using the temporary alignment fasteners with a permanent prosthesis fabricated from a digital model based on an impression.

Figure 59:
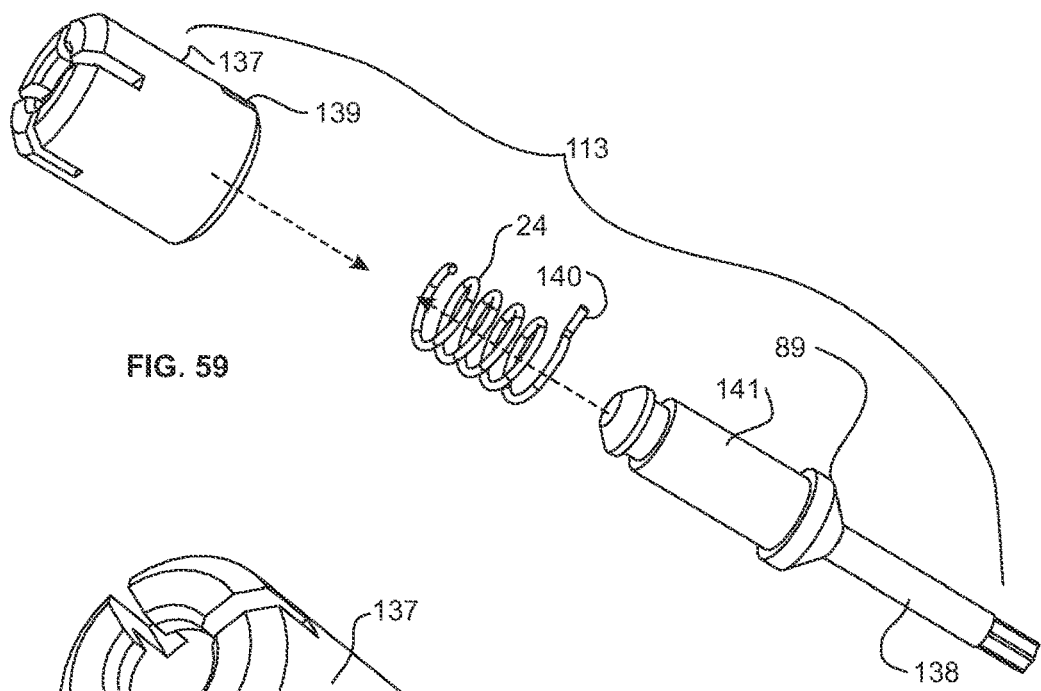
FIG. 59 is an exploded isometric view of the torque driver shown in FIG. 40.
Figure 60:
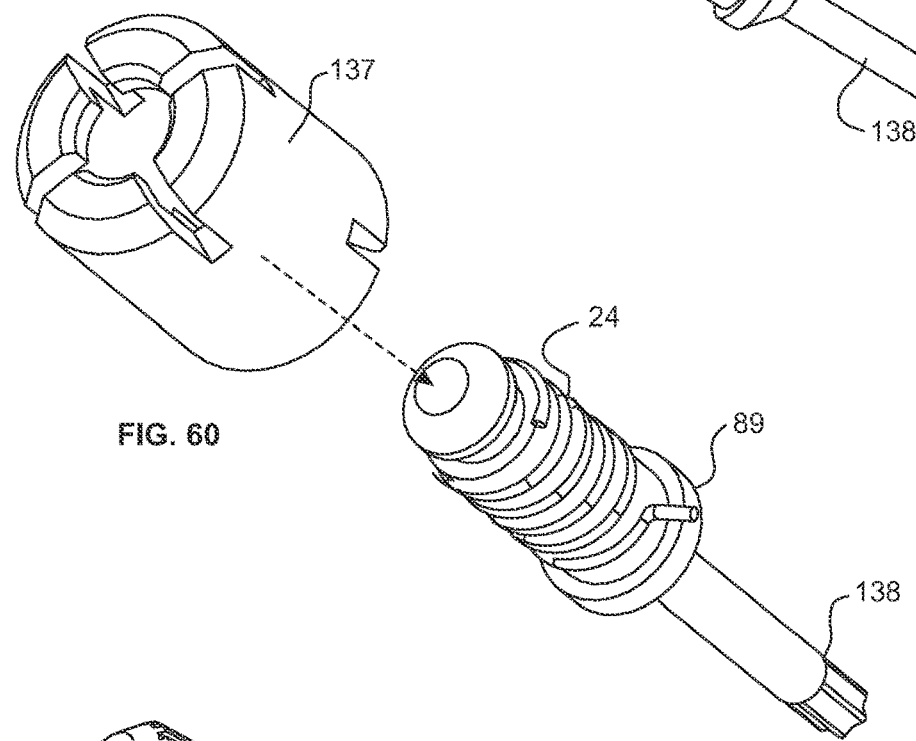
FIG. 60 is top isometric view of the torque driver of FIG. 59 partially assembled.

FIGS. 59-60 show an embodiment of a simple torque-driver 113 that can be used for the temporary coping attachment process discussed in reference to FIG. 40. Shaft assembly 89 contains a spring friction cylinder portion 141 and drive portion 138 designed to engage the temporary screw 100. Spring 24 has an interference fit with cylinder 141, and thus when spring 24 is rotated in the "unwind" direction of the spring, a designed amount of slip torque is present between the spring and cylinder. In the "wind" direction, the spring binds on the cylinder. This provides unequal drive torque capability in the two rotation directions. Slot 139 in drive cap 137 engages spring end 140, and snaps onto the end of the shaft assembly, thus when the cap is rotated in the clockwise direction, the cylinder and drive slip at a known torque. When the cap is rotated in the counterclockwise direction, the spring binds on the shaft to provide a higher screw removal torque before slipping.

Figure 61:
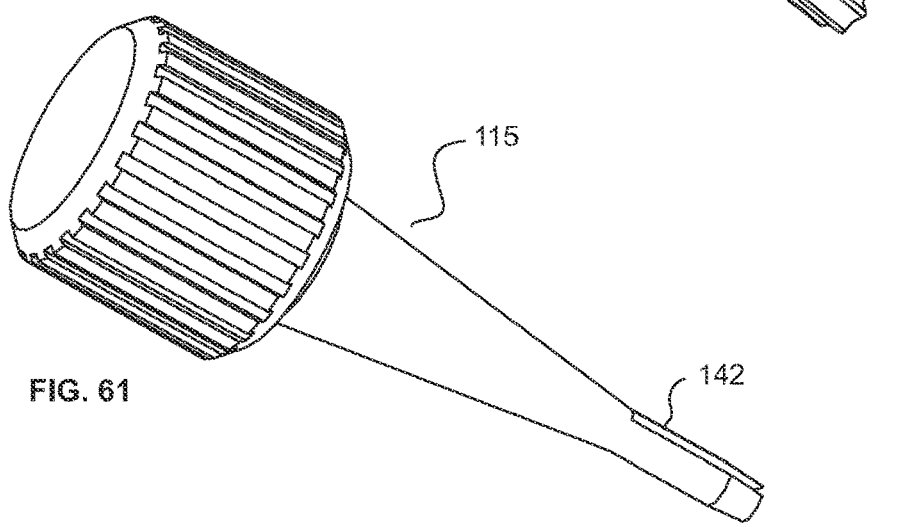
FIG. 61 is a top isometric view of the post removal tool shown in FIG. 44.

FIG. 61 shows an embodiment of a temporary screw post extractor 115 which may be used to remove post 101 after the pick-up process as shown in FIG. 44. The extractor utilizes a hollow metal tubular split-cylinder end portion 142 that deflects to grip the end of the temporary screw post 101, allowing removal of the separable fastener posts or other types of fasteners. FIG. 61 illustrates a hand-operated knurled end, but other torque tool systems known in the dental industry such as 3/32" friction and latch designs may be used.

Figures 62, 63:
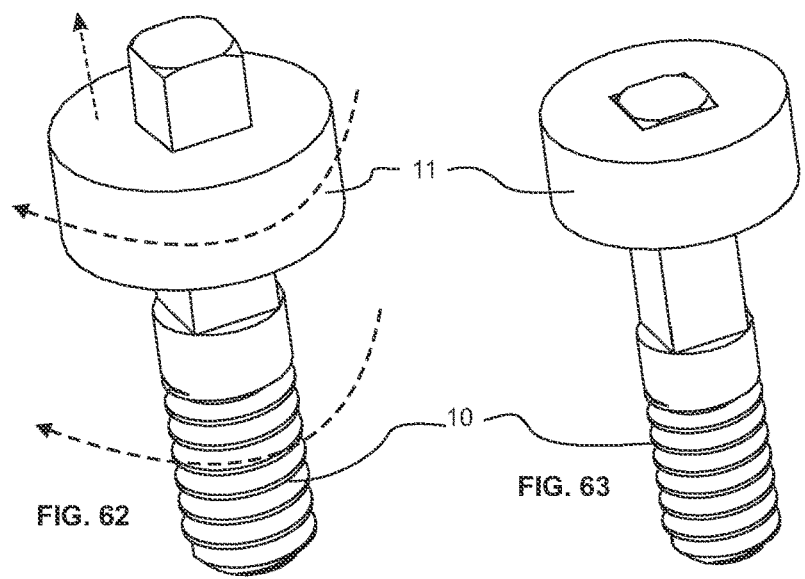
FIG. 62 is a top isometric view of an embodiment of a temporary screw similar to FIG. 1 schematically illustrating axial motion of the cap away from the post threads from screwing after the coping contacts the implant abutment.
FIG. 63 is a top isometric view of the embodiment of FIG. 62 in which the temporary screw post end has become flush with the top of the cap.

FIGS. 62-63 schematically illustrate how the position of the temporary screw post 10 of the first embodiment relative to the implant abutment can be determined. As the temporary screw is rotated clockwise, the cap 11 will be pushed axially away from the screw threads of the post by the coping. The depth of threaded engagement and the length of the temporary screw post 10 and cap 11 can be designed to have the top of the post 10 coincide with the top of the cap 11 as shown in FIG. 63 when the temporary screw is properly positioned. At this point, a drive tool with a square socket cavity (not illustrated) would disengage from the temporary screw assembly since the post 10 would no longer extend into the tool socket cavity.

Figures 64, 65, 66:
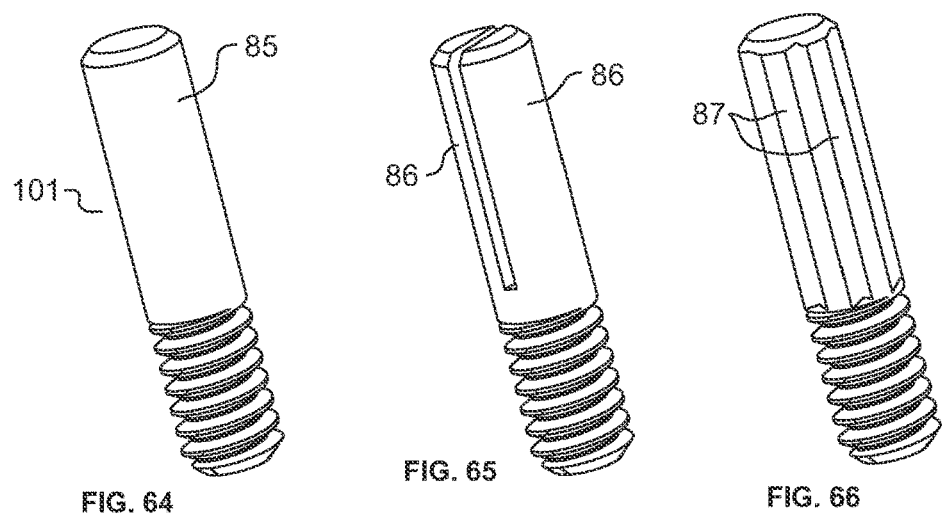
FIG. 64 is a top isometric view of a temporary screw post embodiment having a cylindrical stem.
FIG. 65 is a top isometric view of a split temporary screw post embodiment having deflecting sections.
FIG. 66 is an isometric view of a temporary screw post embodiment having symmetric axial splines.

FIGS. 64-66 illustrate different embodiments of the end of the temporary screw post that engages the cap. FIG. 64 shows a modified version of the cylindrical post 101 designed for frictional engagement on cylindrical portion 85 with a cap having a circular bore similar to that shown in FIG. 34. In FIG. 65, the cylindrical post is slotted, and the resulting beam portions 86 sprung open to provide additional frictional retention of a cap through spring action with the deflecting beams. Various features such as symmetric axial splines 87 (FIG. 66), asymmetric splines or grooves, and textures may also be used to tailor driving torque and axial retention force of the cap to the temporary attachment post. Non-symmetric features may also be utilized to tailor different installation torque and extraction forces. Surface finish and coefficients of friction of the mating materials may also be used to control the driving and retention properties. Temporary attachment posts and caps may be made from metal and polymer materials such as titanium, stainless steels, nylon and PEEK and other non-corrosive biocompatible materials.

Figure 67:
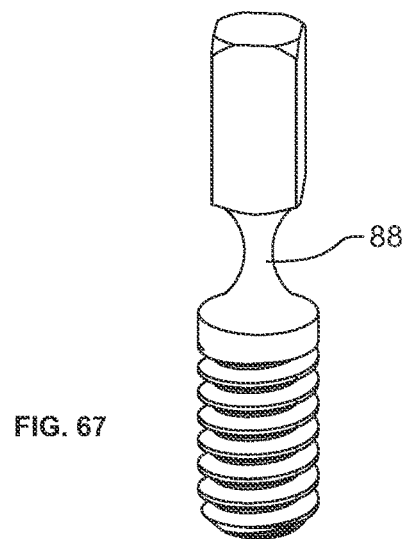
FIG. 67 is an isometric view of a temporary screw post embodiment having a weakened portion facilitating lateral movement during pick-up.

If additional off-axis accommodation is desired when extracting the temporary attachment post from the coping after pick-up, some flexibility may be incorporated into the temporary attachment post, such as the necked down portion 88 of the temporary attachment post shown in FIG. 67, which allows the temporary attachment post to flex slightly off-axis during the pick-up process. Under tension, the alignment of the temporary screw axis with this necked-down portion 88 can be designed to align the axis of the implant abutment threads with the coping threads but allow some bending when the tension is released. Note that this alignment flexibility will generally not be required during the final screw attachment process. The final attachment process is more accommodating of axial misalignment of multiple implant abutments than the coping pick-up process. During pick-up, the prosthesis with copings incorporated must be removed from all implant abutments simultaneously. For final attachment, each definitive screw is attached individually after the copings of the prosthesis are positioned on the implant abutments.

Figure 68:
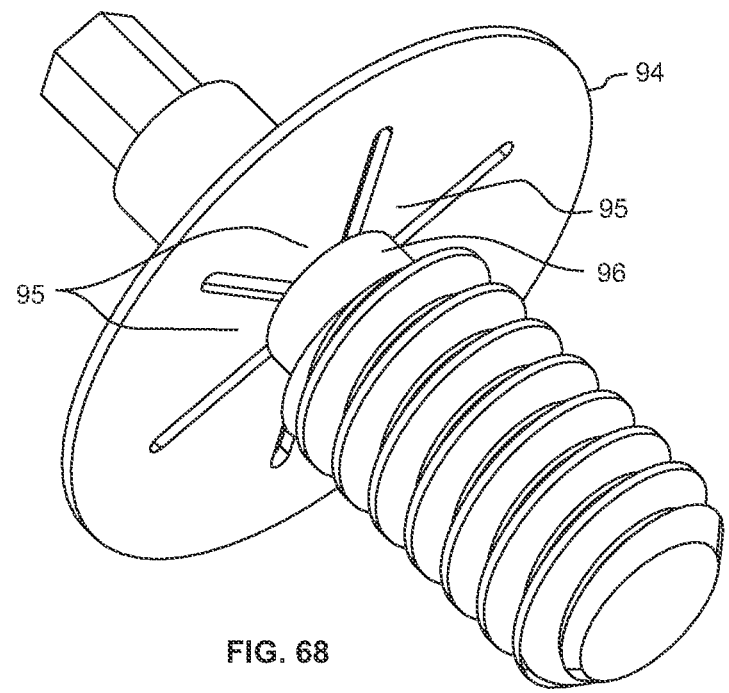
FIG. 68 is a bottom isometric view of a temporary screw embodiment having a spring cap.

FIG. 68 shows an embodiment of a temporary screw cap 94 that includes spring features 95 that engage the outer diameter 96 of the temporary post. If desired, the portion of the temporary screw cap with the spring features may be made of a different material than the remainder of the cap.

Figure 69:
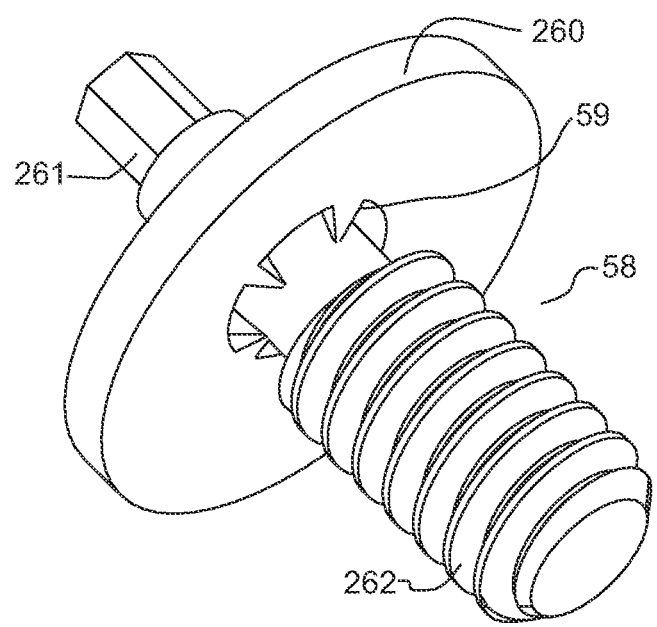
FIG. 69 is a bottom isometric view of a one-piece temporary screw embodiment designed to fracture under axial loading.

Although the temporary screw of FIG. 69 has a similar appearance to that shown in FIG. 68, it has distinct functionality. FIG. 69 shows an embodiment of a temporary alignment screw 58 having threaded portion 262, breakaway flange 260 and hex drive portion 261. The flange 260 pushes down on the top of the coping as the temporary alignment screw threads 262 are rotated into the implant abutment. The flange portion may be molded onto a temporary attachment post with threaded portion 262 and drive portion 261 by insert molding if different materials are desired. Preferably, all portions of the alignment screw are molded integrally of a single material. The cap and post do not slide axially relative to one another. Instead, small breakaway tabs 59 in the flange portion are designed to yield under axial force during the prosthesis and coping assembly removal after the bonding step. The breakaway portions are designed to fracture at an axial force exceeding the force applied to align the coping to the implant abutment for pick-up.

Figures 70, 71, 72:
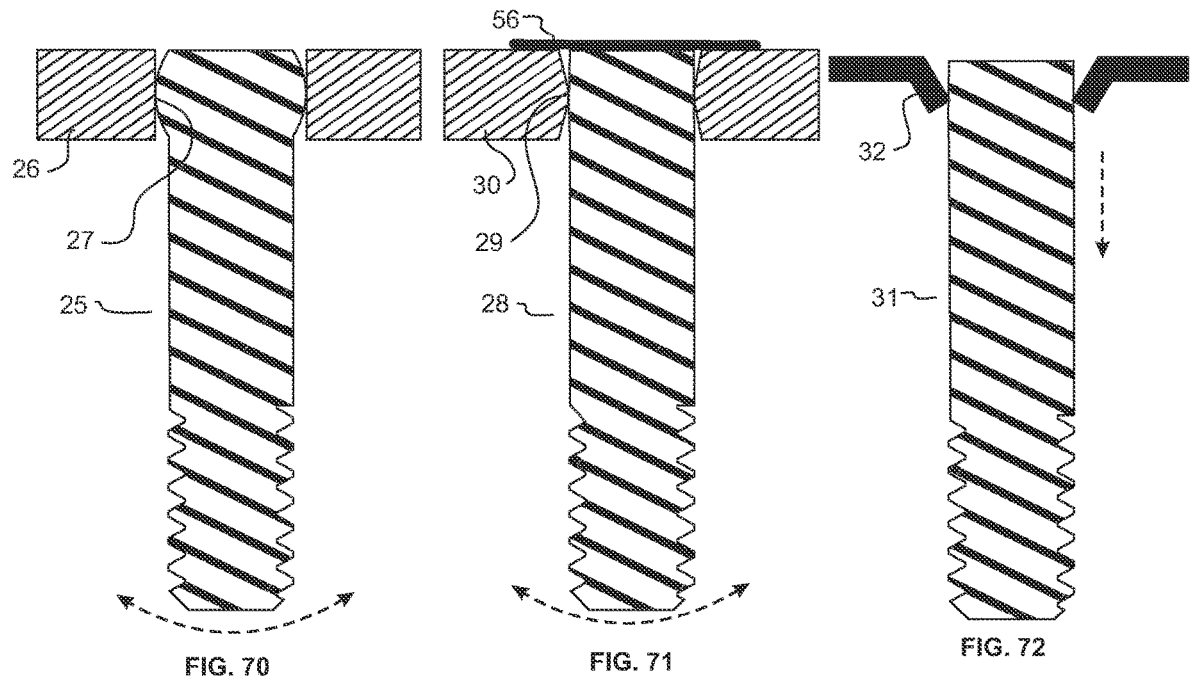
FIG. 70 is a cross-sectional view of a temporary screw embodiment incorporating a rounded interface between cap and post facilitating pivotal movement as illustrated.
FIG. 71 is a cross-sectional view of a temporary screw embodiment incorporating a restricted interface between cap and post facilitating pivotal movement and protective film.
FIG. 72 is a cross-sectional view of a temporary screw embodiment incorporating a spring cap with preferential axial movement in the pick-up direction.

FIG. 67 employed a temporary alignment screw post with a waist that can bend during prosthesis removal in the pick-up process. It is also possible to provide additional off-axis accommodation during coping pick-up with temporary screws that do not bend. For example, in FIG. 70, a temporary alignment screw post 25 includes a rounded portion 27 that bears against the central straight bore of cap 26. FIG. 71 shows a tapered profile 29 on cap 30 which engages a straight cylindrical portion of post 28. It is preferable to prevent the incursion of adhesive in the gaps between the post and cap that allow the post to pivot. FIG. 71 includes a thin protective film 56 for this purpose. This film should be chosen to deform easily when the post is pivoted.

FIG. 72 shows a thin retaining ring 32 that engages temporary attachment post 31. The retaining ring 32 also provides a one-way insertion direction of temporary attachment post 31.

This preferential insertion direction also corresponds to the relative motion of the post and retaining ring for release in the pick-up process.

Figures 73, 74, 75:
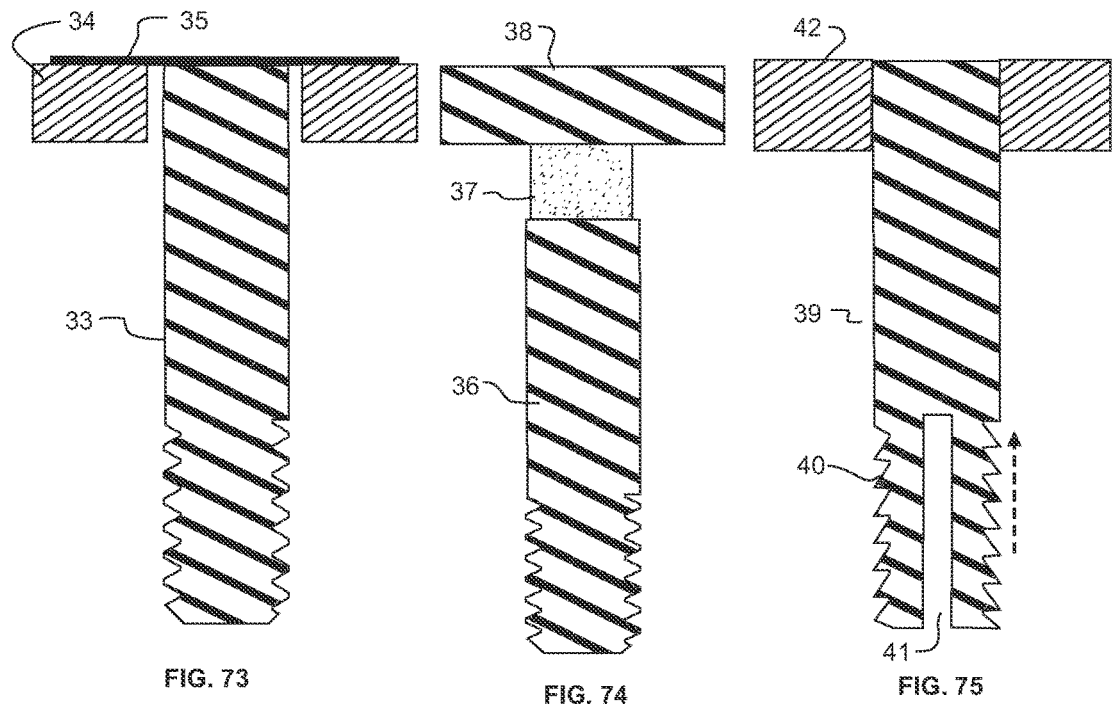
FIG. 73 is a cross-sectional view of a temporary screw embodiment incorporating a laminar cap fixed to the end of the post.
FIG. 74 is a cross-sectional view of a temporary screw embodiment incorporating a compliant interface between the cap and post.
FIG. 75 is a cross-sectional view of a temporary screw embodiment incorporating a split post that has deflecting sections with screw threads shaped to facilitate axial separation without unscrewing the post threads.

FIG. 73 shows another embodiment of a temporary alignment screw that does not have relative axial sliding between the post and cap. In this embodiment a thin retainer 35 that may be comprised of a metallic or polymer sheet is attached to the top portion of temporary attachment post 33 and optional cap 34. The sheet 35 may be attached to temporary attachment post 33 using adhesives, plastic or metal welding, etc. After the adhesive has cured holding the coping to the implant abutment, the mechanical connection between the post and cap is overcome by axial force in the pick-up process. The mechanical connection can be designed to fail by adhesive failure or by fracture of the joint or the sheet 35.

FIG. 74 shows another embodiment of a temporary alignment screw without relative sliding between the cap portion and the post portion. In this embodiment, a compliant or frangible portion of the post 37 is used to attach a cap 38 to the post 36. Under tension, the cap portion 38 holds the coping in position against the implant abutment for pick-up into a prosthesis. Compliant portion 37 may be for example an elastomeric material to provide some angular motion during prosthesis removal after the pick-up material sets. The compliant portion 37 itself or one of its interfaces with the cap or post may provide a separable interface with controlled axial breakaway force. Other methods of separating a compliant portion may include exposure of compliant portion 37 made from a material easily affected by heat, any wavelength of electromagnetic energy, or a chemical reaction that may be applied externally or as part of the pick-up process.

The inventive concepts disclosed are not meant to be restricted to a temporary attachment post with standard screw threads that both engage and disengage the threads in the implant abutment through rotations. For example, alternate separable temporary attachment posts embodiments are possible providing features that allow the post to removably hold the coping to the implant abutment by other means than a separable cap. For example, as shown in FIG. 75, an alignment fastener 39 may contain a separable threaded or serrated portion 40 that engages the screw threads in the implant abutment for pick-up, but that will release with axial force after.

FIG. 75 shows a temporary attachment post 39 having a slot 41 and asymmetric threads or serrations 40 that allow the temporary attachment post to be inserted through rotation for alignment for coping pick-up but may be subsequently extracted with a separation force in the axial direction. Although the threads could be designed to provide engagement with the implant abutment threads through axial motion in the opposite direction to the arrow shown in FIG. 75, rotation to a design torque on engagement is generally preferred. If the post 39 is designed to be pulled out of the implant abutment during the coping pick-up process, it will subsequently need to be removed from flange 42 and the prosthesis assembly. Since there is no processing impact on patient comfort, higher mechanical forces or a broader range of energy or chemical processing may be employed to remove the post from the prosthesis after coping pick-up.

Figure 76:
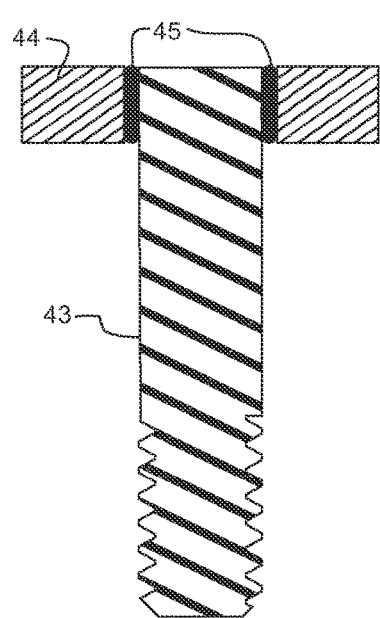
FIG. 76 is a cross-sectional view of a temporary screw embodiment incorporating an interface material between the cap and post.
Figure 77:
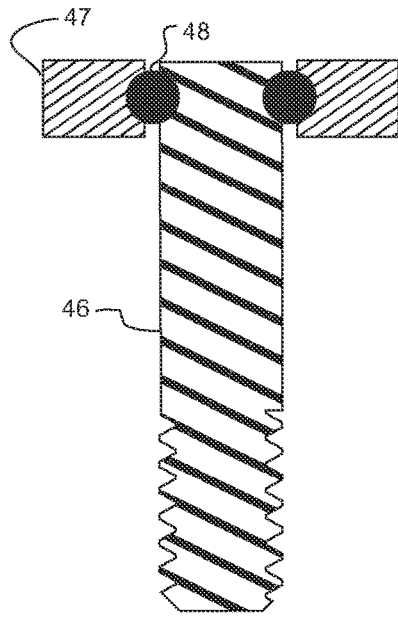
FIG. 77 is a cross-sectional view of a temporary screw embodiment incorporating an O-ring interface between the cap and post.
Figure 78:
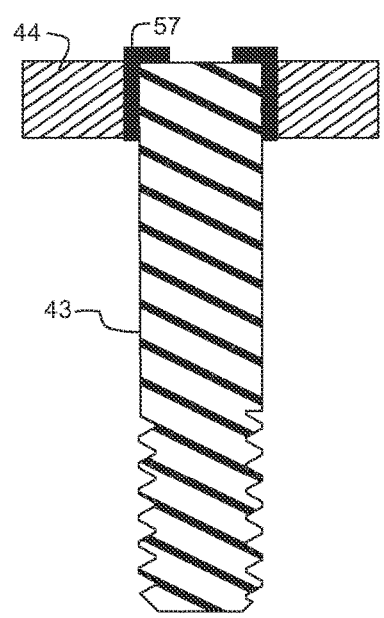
FIG. 78 is a cross-sectional view of a temporary screw embodiment incorporating a cup-shaped interface material between the cap and post.
Figure 79:
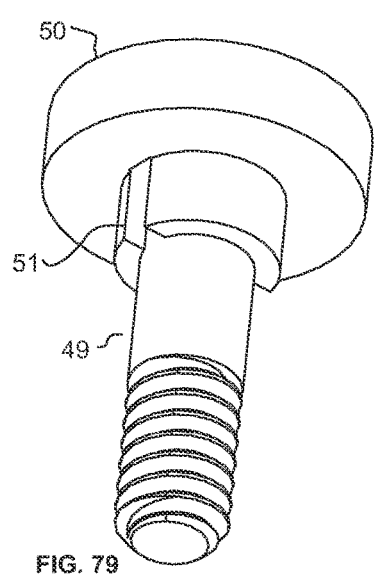
FIG. 79 is a bottom isometric view of a temporary screw embodiment incorporating a split collar cap.
Figure 80:
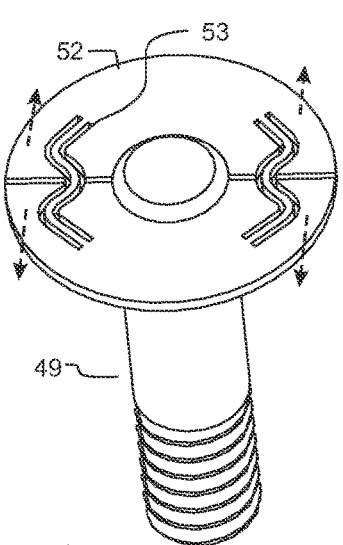
FIG. 80 is a top isometric view of a temporary screw embodiment incorporating a planar spring that flexes when pulled perpendicular to the diameter indicated.
Figure 81:
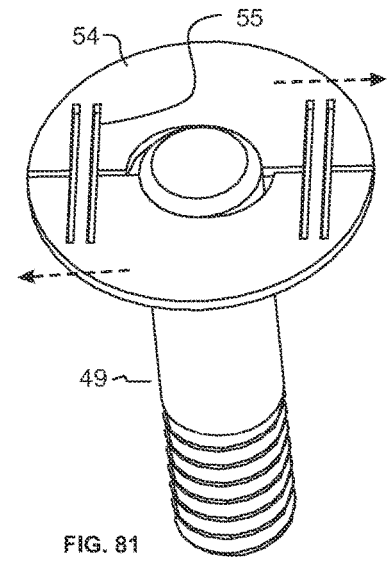
FIG. 81 is a top isometric view of a temporary screw embodiment incorporating a planar spring that flexes when pulled parallel perpendicular to the diameter indicated.

Further permutations of the separable alignment screw features disclosed above are possible. FIG. 76 shows an embodiment where axial flexibility and/or controlled retention between cap 44 and temporary attachment post 43 is provided by an interface material 45 such as adhesives, silicones, and elastomeric materials contained in the space between the bore of the cap 44 and the post 43. FIG. 77 shows cap 47 retained with an O-ring 48 held in grooves in the cap 47 and temporary attachment post 46. FIG. 78 shows a cup-shaped interface material 57 located within the bore of the cap 44 and extending over a portion of the end of the post 43. FIG. 79 shows a split-collar feature 51 on cap 50 which presses onto the temporary attachment post 49. FIGS. 80 and 81 show alternate designs of flexure beam features 53 and 55 in caps 52 and 54 gripping a post. In FIG. 80, the pressure on the post 49 is reduced by pulling the cap 52 perpendicular to a diagonal of the cap as indicated by the arrows. In FIG. 81, the pressure on the post 49 is reduced by pulling in opposite directions with moment arms as shown to open the spring.

It is understood that the concept of the temporary attachment of the coping with the implant abutment with an axially separable temporary post is not dependent upon having a separate cap 11 or nut 63 on the post. If desired the cap or nut can be eliminated and the coping may be directly fixed and axially separable from the temporary attachment post. That is, the coping can be designed to have an equivalent mechanical interface to the post as the caps in the embodiments above. The mechanical interface between the coping and post may be tailored to provide equivalent rotational engagement and relative axial movement above a designed minimum axial force.

Figure 82:
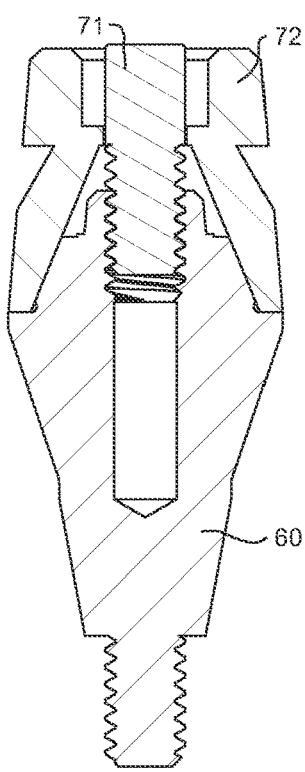
FIG. 82 is a cross-sectional view of an embodiment of a system for aligning a dental implant abutment, coping and prosthesis for semi-permanent screw-attachment in which the coping is held by mechanical interference to the proximal end of the threaded post.

Example embodiments of the coping and post being the separable components include the following:

FIG. 82 shows temporary attachment post 71, engaging an interference fit of coping 72 at a position above the threaded portion. Metal, metal-reinforced, ceramic, and polymer copings, posts and fasteners may be included in this and other embodiments. Any of the parts may have surface treatments to control friction or adhesion.

Figure 83:
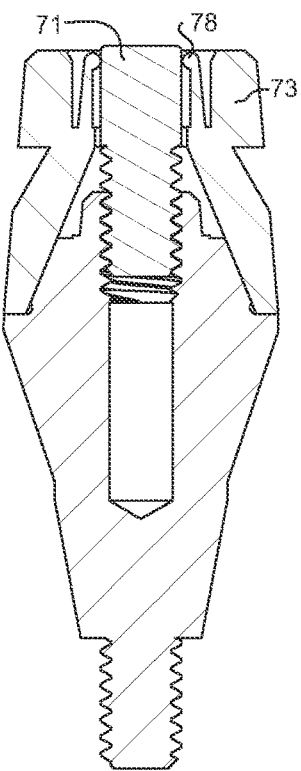
FIG. 83 is a cross-sectional view of an embodiment of a system for aligning a dental implant abutment, coping and prosthesis for semi-permanent screw-attachment in which the coping has spring fingers holding the proximal end of the threaded post.

FIG. 83 shows temporary attachment post 71 engaging integral spring-finger features 78 of coping 73.

Figure 84A:
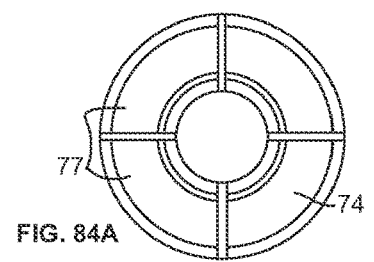
FIG. 84A is a top view of the embodiment of FIG. 84.
Figure 84:
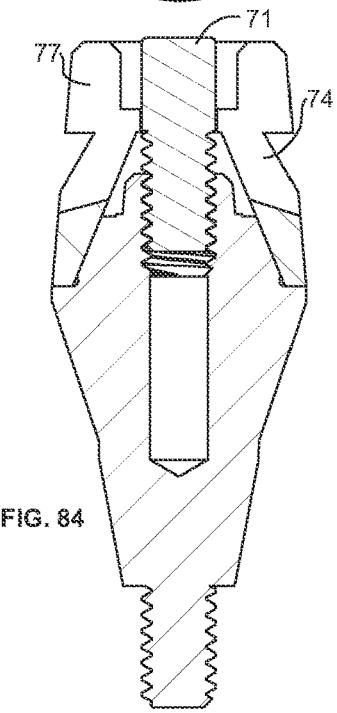
FIG. 84 is a cross-sectional view of an embodiment of a system for aligning a dental implant abutment, coping and prosthesis for semi-permanent screw-attachment in which the coping has collet-type spring fingers holding the proximal end of the threaded post.

FIG. 84 shows a temporary attachment post 71 engaging collet-type spring fingers 77 of coping 74, these collet-type features may be formed using slots in the coping 74 as shown in FIG. 84A.

Figure 85:
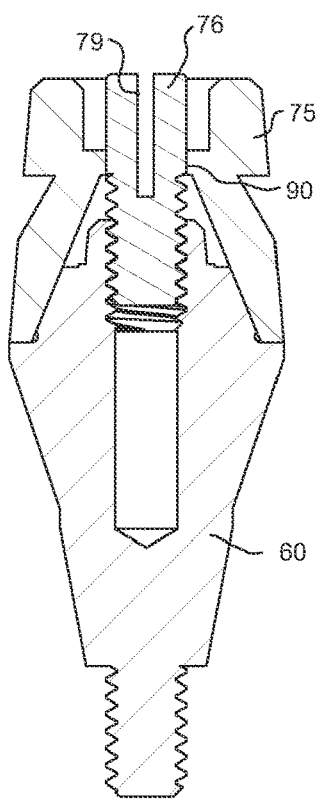
FIG. 85 is a cross-sectional view of an embodiment of a system for aligning a dental implant abutment, coping and prosthesis for semi-permanent screw-attachment in which the proximal end of threaded post has a slotted spring section holding the coping.

FIG. 85 shows a slotted spring feature 79 formed in the temporary attachment post 76. The spring-features engage a smaller bore portion 90 of the coping 75. Such features may be of varied shapes including slots, eyelets, swaged portions, tubular swaged parts, etc. A film 56 (not shown) may be used to prevent the ingress of pick-up material into any voids at the top of the post/coping assembly similar to that shown in FIG. 71.

Figure 86:
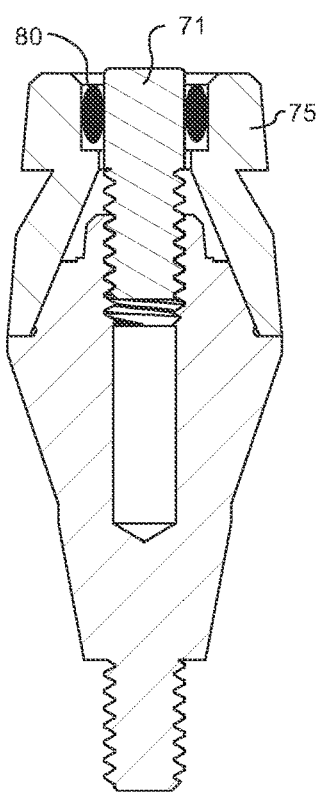
FIG. 86 is a cross-sectional view of an embodiment of a system for aligning a dental implant abutment, coping and prosthesis for semi-permanent screw-attachment in which a compressed ring holds the coping to the proximal end of the threaded post.
Figure 87:
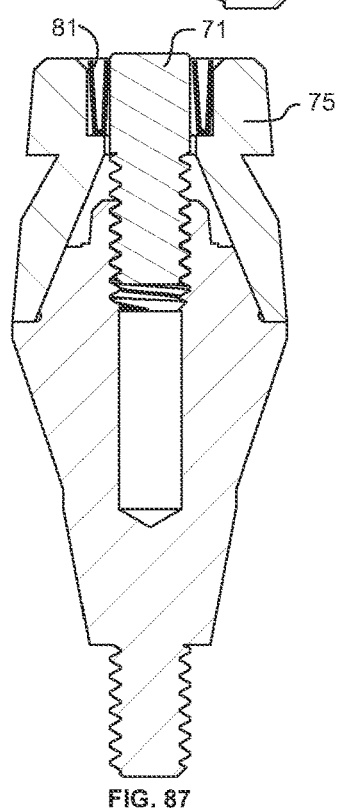
FIG. 87 is a cross-sectional view of an embodiment of a system for aligning a dental implant abutment, coping and prosthesis for semi-permanent screw-attachment in which a compressed ring with a u-shaped cross-section holds the coping to the proximal end of the threaded post.

FIG. 86 shows temporary attachment post 71 and coping 75 engaged using an O-ring or washer 80. Such washers may be elastomers, polymers, metals, etc. and may be formed in various shapes, such as the u-shaped retainer 81 of FIG. 87.

Figure 88:
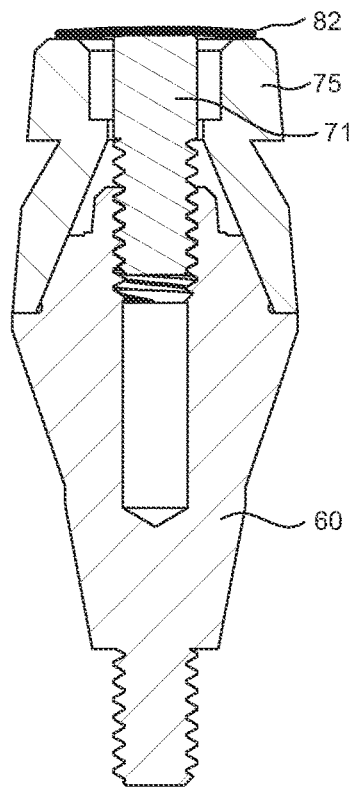
FIG. 88 is a cross-sectional view of an embodiment of a system for aligning a dental implant abutment, coping and prosthesis for semi-permanent screw-attachment in which a thin cap fixes the coping to the proximal end of the threaded post.

FIG. 88 shows temporary attachment post 71 retained to coping 75 using a sheet cap 82. Sheet cap 82 may be a tape, or other polymers or metals joined using adhesives, thermal and ultrasonic bonding, welding, and brazing, etc. This is similar to the embodiment shown in FIG. 73, except the sheet cap 82 does not have thicker cap element 34.

Figure 89:
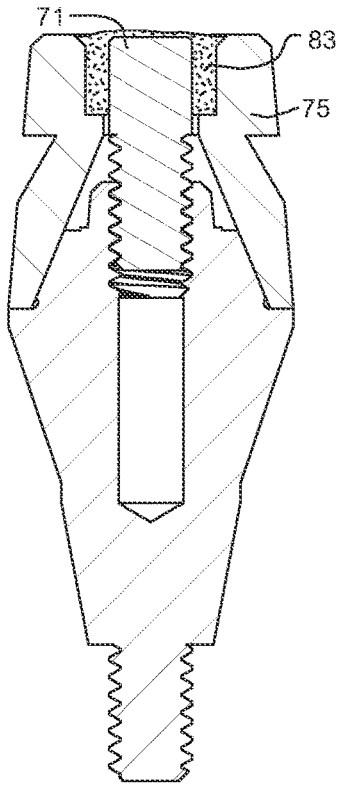
FIG. 89 is a cross-sectional view of an embodiment of a system for aligning a dental implant abutment, coping and prosthesis for semi-permanent screw-attachment in which a filler material is placed in the bore of the coping at the proximal end of the threaded post.

FIG. 89 shows temporary attachment post 71 retained using a filler material 83 in the clearance bore of coping 75. Fillers may include a variety of polymer adhesives or fillers, such as silicones, acrylics, epoxies, and/or soft metallic materials. Since the coping 75 in this embodiment is fixed to the post 71, the mating surfaces of the coping 75 and implant abutment must allow relative rotational motion until the predetermined torque is achieved.

Figure 90:
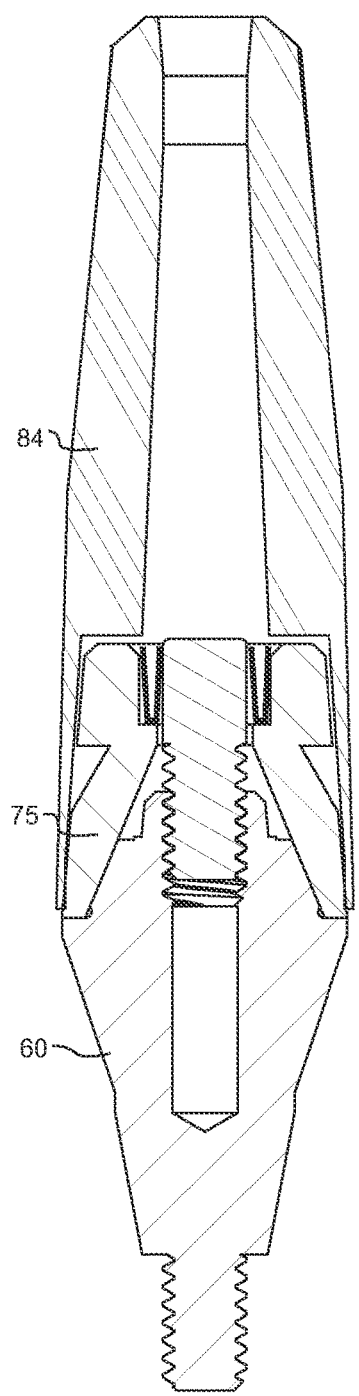
FIG. 90 is a cross-sectional view of an embodiment of a system for aligning a dental implant abutment, coping and prosthesis for semi-permanent screw-attachment showing a tool engaging features of the coping to screw in the threaded portion of the post.

Installation of these embodiments may also be accomplished with simple polymer or metal tools 84, for example, as shown in FIG. 90 that engage the flats or other features of the coping 75, and/or of features on top of the threaded post 71.

Various embodiments of a temporary alignment and fastening system have been described above. From experience in clinical and laboratory settings using a two-piece separable fastener to convert existing dentures or prepare new prostheses, maintaining the design of one or more interface features has provided considerable flexibility in customization. This customization may be desirable to provide compatibility with different commercially-available component systems or to meet different functional requirements, for example, from variation in the geometry of a patient's anatomy. The embodiment of the separable fastener illustrated in FIGS. 34-36 will be used as a non-limiting example of methods to retain some common functional interfaces.

The temporary screw 100 of FIG. 34 comprises a cap 102 affixed to a post 101, for example, through a press-fit. By maintaining the material construction and geometries of the press-fit interface of the end portion 101A of the post 101 and the interface bore portion 102A of the cap, functional characteristics such as resistance to rotary slip and axial separation force magnitude and directional force characteristics can be essentially maintained. The size, pitch, or length of threading on the opposite end of the post 101 will have only secondary impact on the slip and separation force characteristics. Similarly, the end of the cap 102 away from the interface bore portion 102A can have a different size, shape or drive tool interface with only a secondary impact on the slip and separation force from the press-fit of post portion 101A into interface bore portion 102A of the cap. In this manner, the design, testing and production efficiencies for the customization of separable fasteners to be compatible with different implant abutment and coping systems may be improved.

This standardization of selected interface characteristics can be extended to other elements. FIG. 91 illustrates a cross-sectional exploded view of temporary screw 100, coping 112 and implant abutment 107. In this cross-section, the drive tool interface on the upper end of the cap 102 and the threaded portion of the post at the bottom end are spatially separated from the overlap of post end portion 101A and cap bore portion 102A. As shown in the cross-sectional assembly view in FIG. 92, an outer tapered section 102B of the cap 102 contacts a tapered interior bore 112B of the coping 112. This tapered interface region includes a portion that is at the same axial position as a portion of the press-fit region of the separable screw. It is preferable to maintain the geometry of this interface between the coping taper 112B and cap taper 102B to minimize the rotary slip and range of axial separation vectors. Although the lower section of the coping 112 also has a tapered interface with the upper portion of the implant abutment 107, this is spatially removed from the press-fit portion of the temporary screw. As long as there is minimal non-axial force transmission to the press-fit interface, for example, through lateral motion or non-axial symmetry, the characteristics of this interface would typically only apply axial forces on the press-fit region of the separable screw. The implant abutment 107 may include a contact surface 107A to control the relative vertical positioning of the coping 112 on the implant abutment 107. Sealing features may be included in the vicinity of contact surface 107A to retain antibacterial gels or gaskets to protect the interior of the implant abutment 107 and coping 112 assembly.

FIG. 93 shows a cross-sectional view of the system of FIG. 91 after a coping pick-up process through the process step of "Pry prosthesis, with copings bonded in prosthesis, from temporary alignment fastener posts" of FIG. 27. This is equivalent to the status of prosthesis 103 illustrated in FIG. 43 and the implant abutments 107 with attached posts 101 in FIG. 44. The separated post portion 101A and the separated cap interface bore portion 102A are exposed and can optionally be used individually to provide additional functionality in dental restoration procedures. In particular, these interfaces may be used to align and hold accessory parts for subsequent processing steps. Since the desirable retention characteristics for using these accessories may be different from the pick-up process, the interface geometry and attachment technique of accessories to the separated fastener interfaces may be intentionally designed to be different than the separation characteristics of the separable screw 100. In general, the alignment and retention of accessories is less demanding.

FIGS. 94-96 illustrate an exclusion cap 150 that may be attached to the post portion 101A to prevent tissue overlap around or onto the implant abutment during surgical and lab procedures. This may be made from a polymer such as acetal or PEEK. FIG. 95 shows an assembled perspective view of the exclusion cap 150 mounted onto implant abutment 107. The exclusion cap 150 has an interior bore sized to engage post portion 101A as shown in the cross-section of FIG. 96. For example, this cap may be useful to keep gum tissue from the patient's jaw 22 away from the implant abutment 107 area immediately after the implant is positioned through a flap or flapless surgical procedure. After a pick-up process to align copings in a prosthesis with implant abutments, exclusion cap 150 may be pressed onto post portion 101A. The threaded post 101 remains present in the implant abutment after the pick-up procedure removes coping 112 and cap 102 as shown in FIG. 93. Exclusion cap 150 may contain drive engagement features 151 to aid in installation/removal of the cap through rotary or axial motion. Although the exclusion cap 150 will generally be applied to a post 101 already attached to the implant, an exclusion cap 150 and threaded post 101 assembly may be screwed into a threaded implant abutment in a similar manner as the separable fastener assembly 100 previously described.

Exclusion cap 150 may also be designed to remove the threaded post 101 by rotating the exclusion cap 150 through the resistance to rotational slippage characteristics of the press-fit of the exclusion cap 150 on the post portion 101A. In the embodiment shown in FIG. 96, exclusion cap 150 is axially inserted on the post portion 101A until the bottom surface of the exclusion cap 150 contacts the implant abutment and held in position through the press-fit engagement with the post portion 101A. This positioning helps seal off the interior to prevent contamination of the implant abutment 107. Although this cross-section shows the same outer diameter in this area, the exclusion cap may be sized or shaped differently than the implant abutment 107 where they contact. As discussed in relation to FIG. 91, there may be antibacterial treatments or gaskets applied in the vicinity of implant abutment contact surface 107A. Since the exclusion cap 150 would generally be made of a single piece of deformable polymer, it may include deformable features to engage a groove or other feature to sealing proximate implant abutment contact surface 107A.

Alternate designs which include additional engagement such as a snap-fit or press-fit directly with the implant abutment may be useful if the exclusion cap 150 is used for longer term applications such as tissue healing or if higher retention is desirable. The exclusion cap 150 does not have to be made from the same polymer as the cap 102 that was previously attached to the post portion 101A. Depending upon the period of time that the exclusion cap 150 is retained in the patient's mouth, it may be desirable to have the exclusion cap 150 include silver or copper particle inclusions or coatings or incorporate other materials with known anti-bacterial properties to assist healing. Even if the exclusion cap 150 is made of the same material as the separable screw cap 102, the bore of the exclusion cap that engages the post portion 101A may be sized and shaped to have higher or lower axial retention force as desired.

Figure 97:
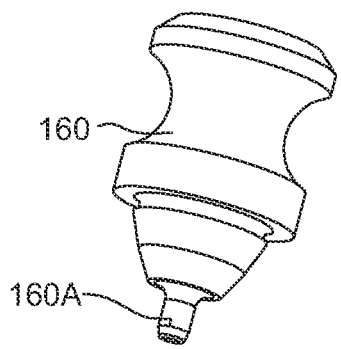
FIG. 97 is an exploded perspective view of an embodiment of a coping and separable fastener cap and a masking plug.
Figure 98:
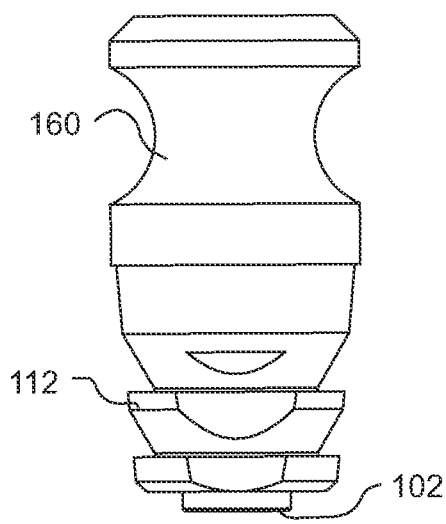
FIG. 98 is an assembled perspective view of the embodiment of FIG. 97.
Figure 99:
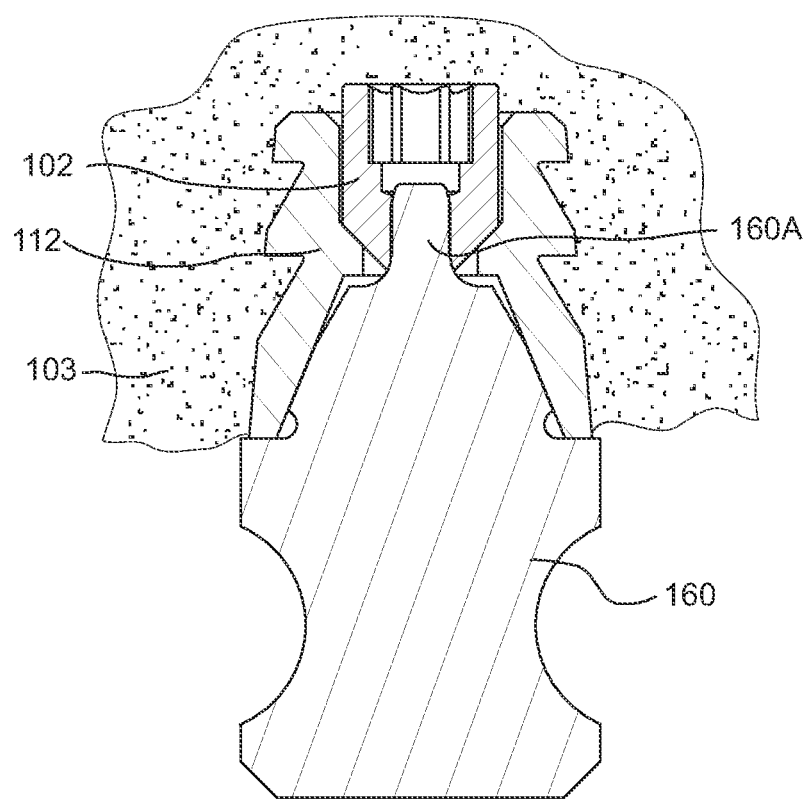
FIG. 99 is a cross-sectional view of the assembly of FIG. 98.

FIGS. 97-99 illustrate an embodiment of a masking plug 160 that may be used to protect a pick-up coping 112 after the separation of the prosthesis 103 from the implant abutment 107. This masking plug 160 could be used before adding material to fully encase the copings in the process flow found in FIG. 27. FIG. 97 is an exploded view of masking plug 160 and coping 112 with separable fastener cap 102. FIG. 98 shows a perspective of the assembled components of FIG. 97. FIG. 99 shows a cross-sectional view of this assembly positioned in the prosthesis 103 from FIG. 93.

The masking plug 160 may include a plug post portion 160A having substantially the same diameter and shape as the separable fastener post portion 101A. Masking plugs 160 may be used during lab procedures such as filling and contouring the prosthesis after coping incorporation in order to prevent contamination or damage to the coping 112. After a pick-up process such as those illustrated in FIG. 7 and FIG. 93, separable fastener cap 102 and coping 112 are retained in the prosthesis 103. Subsequently, masking plug 160 may be simply pressed into the bore 102A of the retained separable fastener cap 102 to retain the masking plug 160 by the press-fit between post plug portion 160A and the bore of separable fastener 102A. In general, the press-fit retention of the masking plug 160 with the cap 102 will not need to be as high to protect the coping surface as the press-fit retention of the post 101 to the cap 102 for alignment prior to pick-up. Controlling this retention to be higher or lower may be accomplished through geometry and material choices.

Although it is preferable to employ the original bore 102A in the cap 102 before the bore is used for drilling definitive screw clearance bores through the prosthesis as shown in FIG. 45, the masking plug post portion 160A could be designed to work with the enlarged clearance bore 117. In this case, it may be desirable to extend the length of the plug post portion 160A to help protect a greater portion of the clearance bore through the prosthesis. Alternate retention methods for holding the masking plug 160 using the separable fastener cap 102 besides press-fit are possible. For example, the post portion 160A may also include spring features, barbs, or self-tapping screw threads (not illustrated) or adhesives for temporary engagement with exposed portions of the cap 102. The material composition and relative geometry of the plug post portion 160A will depend upon the desired retention force, geometry and material composition of the cap bore 102A and whether the plug is designed to be disposable or reused.

Not all of the temporary fasteners described previously provide a post that remains in the implant abutment after a pick-up process. In particular, the temporary fastener 39 of FIG. 75 is designed to screw into the threads 99 of the implant abutment 107, but release with the coping by axial force during pick-up. The entire fastener 39 is transferred to the prosthesis with the coping for this embodiment of the temporary screw. A coping masking plug with a bore (not illustrated) could be designed to either screw onto or be pushed onto the threaded or serrated portion 40 of alignment fastener 39. However, since no part of the temporary fastener 39 remains attached to the implant abutment, the threads 99 of the implant abutment 107 could be used to retain an exclusion cap in this embodiment of a temporary screw. The exclusion cap in this case could incorporate similar screw in, pull out functionality of temporary fastener 39 or simply be screwed in and screwed out with an integral threaded shaft or a separate screw.

There may be situations in which a prosthesis is fabricated for screw attachment that has a well for a coping and a through hole for the definitive screw thread. This may be done in the case of a custom additive digital fabrication through 3-D printing or secondary CNC machining of mass-produced prostheses. Due to tolerancing issues, for the best fit it may be desirable in this case to provide an oversize well for each coping and use adhesive to fix the copings to the prosthesis in position for proper occlusion in situ or in a lab setting with a model of the implants. Before complete curing, a viscous adhesive allows some movement of each coping in its well to allow accurate placement of multiple copings.

FIGS. 100-102 illustrate the use of a separable fastener extension 170 in conjunction with a masking plug 160 to aid in installation of titanium bases 112 into a prosthesis 203. The lower portion of the separable fastener extension 170A may be shaped to conform to the lower portion of the separable cap 102. The separable fastener extension 170 can be used to temporarily hold the titanium base 112 to the masking plug 160 while adhesive 171 is added between the titanium base 112 and the associated well 114 in the prosthesis 203. The titanium base can be roughly positioned using the longer separable fastener extension 170 and masking plug 160 in place from opposite sides of the prosthesis without allowing adhesive 171 on the inner surface of the titanium base 112 that interfaces with the implant abutment 107. Once excess adhesive is removed around the masking plug, the separable fastener extension is pulled out of the screw channel and the masking plug is released. The coping 112 is held in the well 114 by the viscosity of the uncured adhesive 171. The prosthesis 203 may then be placed on the implant abutments 107 or analogs and screwed or otherwise pressed down onto the implant abutments to ensure the alignment of the copings 112 is totally passive. The bore 219 through the prosthesis through which the extension 170 passes may include a larger diameter portion (not shown) to engage a screw head to hold the prosthesis 203 and coping 112 in position while the adhesive completely cures. This bore 219 may be subsequently extended to contact the top portion of the coping if desired for installation in the mouth as illustrated schematically in FIG. 47. The copings 112 may also be held down by using a complementary prosthesis held in proper occlusion with the prosthesis having copings aligned and adhered. The separable fastener extension 170 and mask plug 160 are preferably held together by a press-fit between the bore 170A in the separable fastener extension 170 and post portion 160A of mask plug 160.

Figure 103:
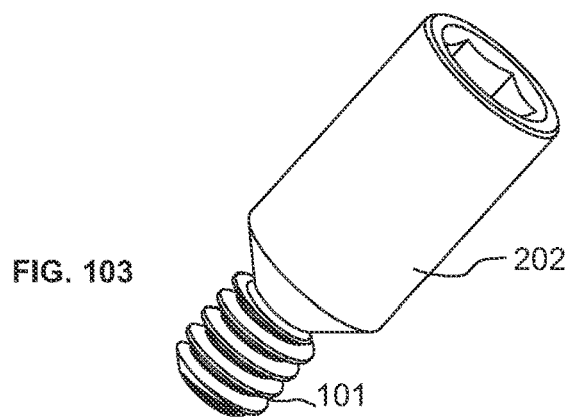
FIG. 103 is a perspective view of an embodiment of a temporary fastener comprising an extended separable fastener cap attached to a separable fastener post.
Figure 104:
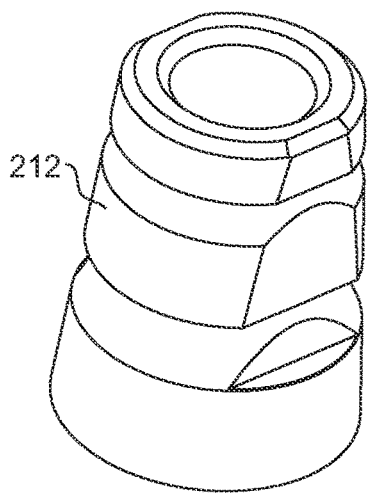
FIG. 104 is a top perspective view of an embodiment of an extended coping compatible with the extended separable fastener cap of FIG. 103.
Figure 105:
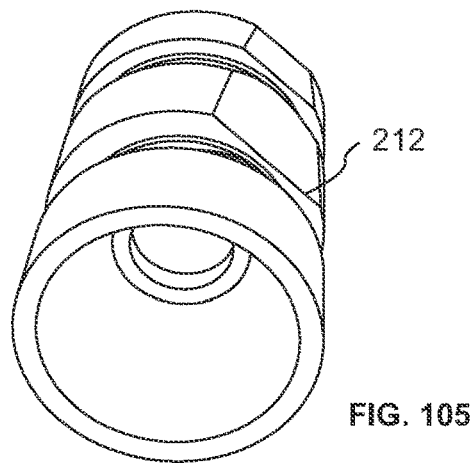
FIG. 105 is a bottom perspective view of an embodiment of an extended coping compatible with the extended separable fastener cap of FIG. 103.

FIG. 103 illustrates an extended separable fastener cap 202 attached to post 101 in the same manner as separable fastener cap 102 described earlier. Cap 202 is longer in the end away from the interface with the post portion 101A to work with extended titanium bases 212 shown in FIG. 104 and FIG. 105. These longer titanium bases 212 may be used in patient cases where shorter titanium bases 112 are not optimal. This alternate embodiment of a separable fastener illustrates how the design of the separable fastener 100 can be readily modified for different applications without changing the separation characteristics. Compared to the embodiment of FIGS. 34-36 and FIGS. 91-93, only a portion of the cap 202 needs to be changed to work with the longer coping 212. It is not necessary, and may not be desirable, to change the mating interface characteristics between the post end portion 101A and the bore of the separable caps 102 and 202. Maintaining common designs and material selection in the interface region may provide more predictable and consistent performance when adapting separable fasteners to different coping and implant abutment systems.

Figure 106:
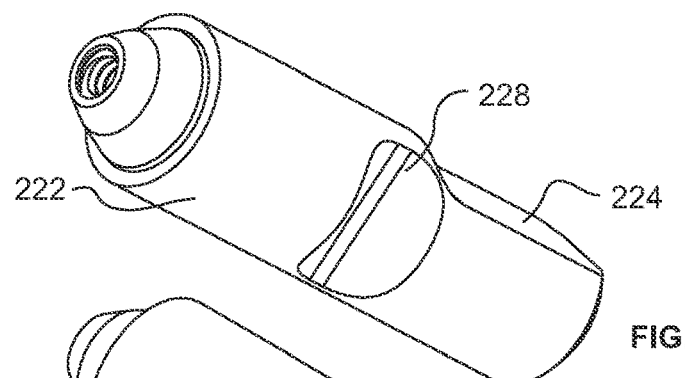
FIG. 106 is a top perspective view of an embodiment of a standard lab analog that may be used as a scan flag.
Figure 107:
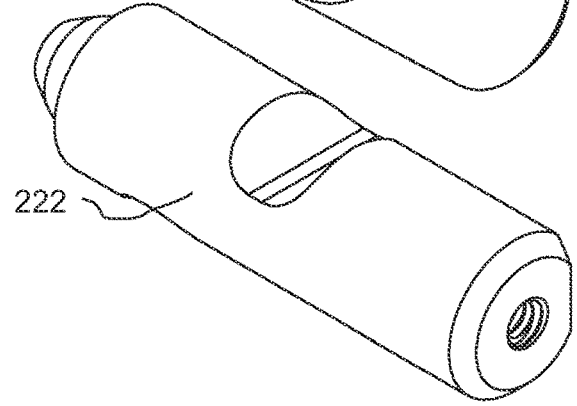
FIG. 107 is a bottom perspective view of an embodiment of a standard lab analog that may be used as a scan flag.
Figure 108:
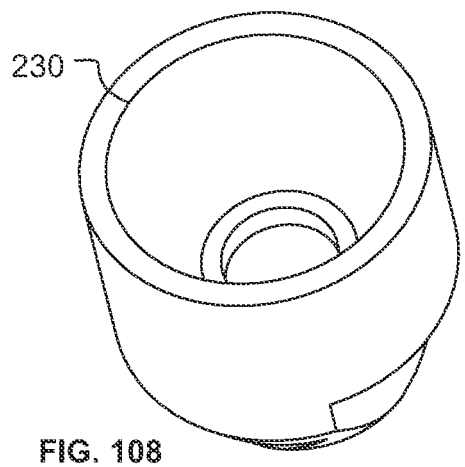
FIG. 108 is a top perspective view of an embodiment of a low-profile scan flag.
Figure 109:
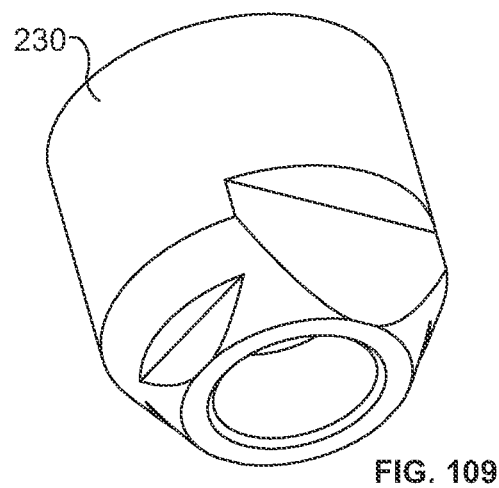
FIG. 109 is a bottom perspective view of an embodiment of low-profile scan flag.

Flexibility in using interchangeable interface designs with the embodiments described above can also be extended to the use of digital scanning for lab processing of prosthesis. For example, FIGS. 106-107 illustrate a standard lab analog 222 with axial and radial retention feature 228 and flat 224 that may also be used as a scan flag. A low-profile scan flag 230 that may be screw-attached to an implant abutment similar to the coping 112 for intraoral scanning or to reduce scan volume is shown in FIGS. 108-109.

Figure 110:
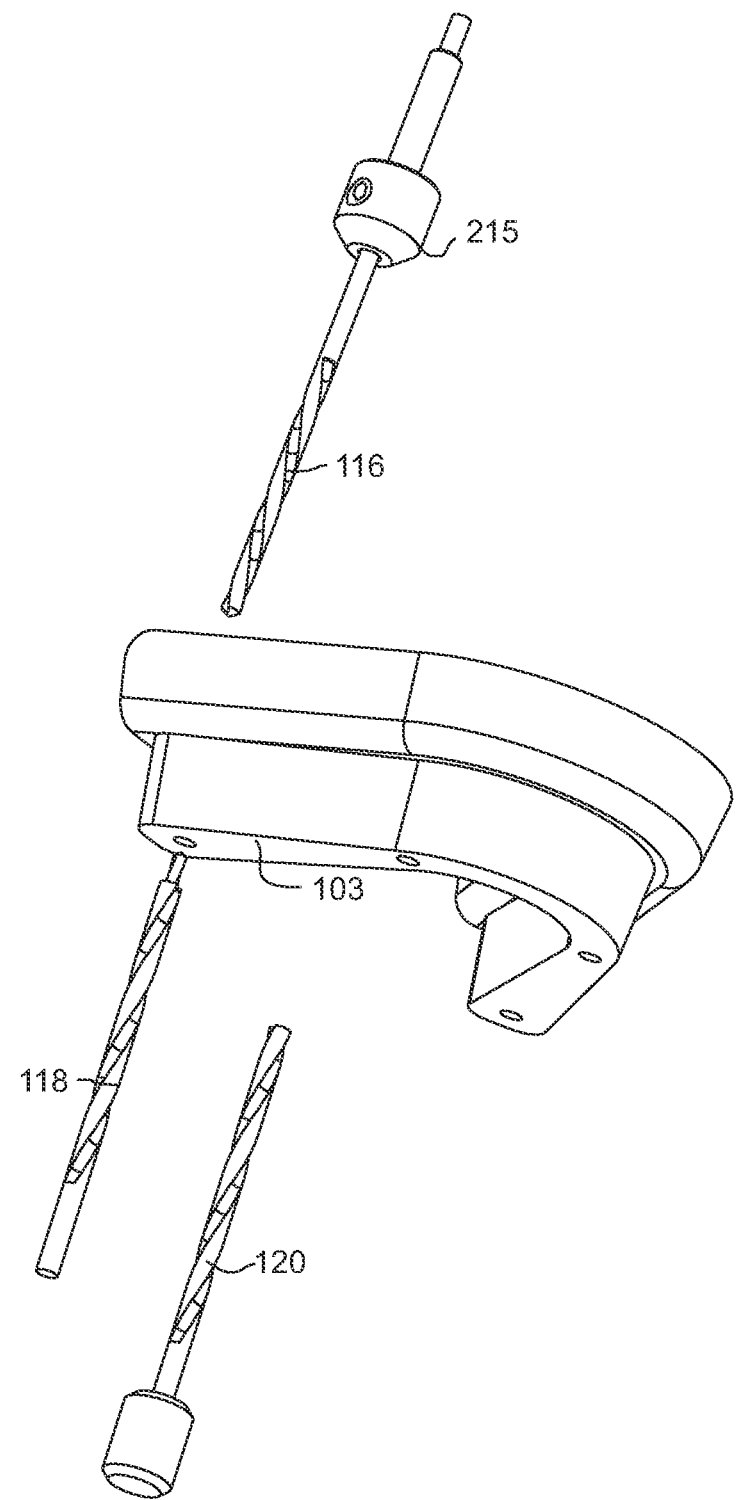
FIG. 110 is an exploded perspective view of an embodiment of a drill holder with pilot drill, clearance bore drill, reamer, and prosthesis.

In a similar manner, tool interfaces used during the processing of prostheses with the disclosed separable fasteners may be readily customized with little engineering investment. For example, FIG. 110 illustrates a drill holder 215 holding a drill such as pilot drill 116 found in FIGS. 45-46. This drill holder may also be used to hold stepped clearance bore drill 118. Although reamer 120 in FIG. 110 is illustrated with a dedicated mount for hand use, a common drill holder 215 may provide efficiencies during prosthesis processing and for tool manufacturing and distribution.

Figure 111:
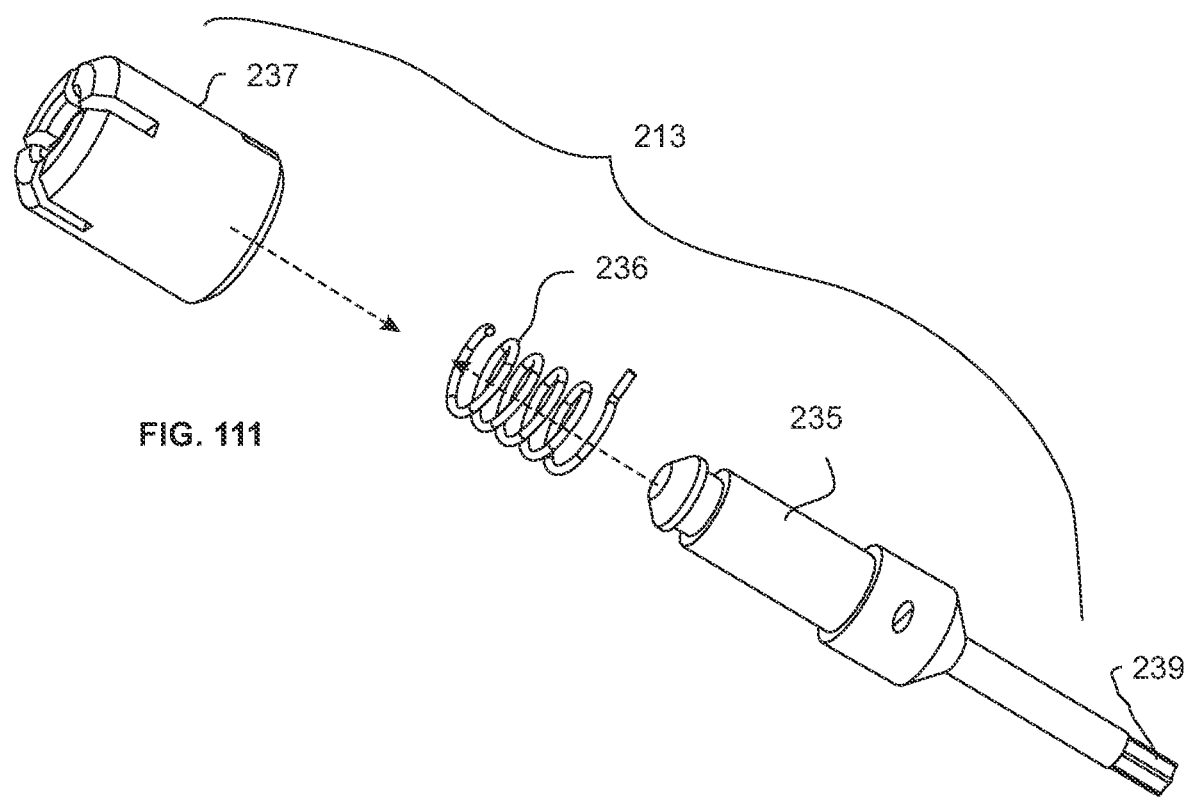
FIG. 111 is an exploded perspective view of an embodiment of a torque driver with interchangeable shaft capability including clutch/torque spring and drive cap with shank having a male hexalobular internal (Torx) drive feature.

The handheld torque driver 113 shown in FIGS. 59-60 for screwing in the separable fasteners may also be modified to provide interchangeable bits to match the desired driving configuration of the separable fastener cap 102 or exclusion cap 150 while retaining the same internal torque limiting design characteristics of FIGS. 59-60. For example, FIG. 111 shows torque driver 213 with interchangeable shaft capability including clutch/torque spring 236 and drive cap 237 with shank 235 having a male hexalobular internal (Torx) drive feature 239. Shank 235 snaps into the drive cap 237. As shown in FIG. 112, replacing shank 235 with shank 240 having post extractor end portion 242 allows the same tool to be used to remove post 101 from an implant abutment. The interface of the extractor shank 240 with the cap may include features to prevent slippage when rotated to extract the post if the spring binding discussed previously is insufficient for a particular configuration.

Although the descriptions above use rotational engagement of the bottom of the post with internal threads 99 of the implant abutment 107 as a preferred approach, this is not meant to be limiting. Alternate approaches for engaging a temporary attachment post with implant abutment threads through axial insertion without rotation are considered to be part of this disclosure. For example, the split post bottom structure shown in FIG. 75 which allows axial extraction can also be used for axial insertion. Similarly, an interference fit between the bottom of the post with the threads may also be designed to provide sufficient engagement to provide adequate alignment and fixing of the coping for the pick-up bonding process described earlier. For non-rotary extraction of the post, it is not necessary to have the extraction force of the post-implant abutment thread interface greater than the force required for relative movement of the coping or cap with the upper end of the post. That is, if the temporary attachment post remains fixed to the coping during the pick-up step, the post can be removed from the dental appliance after removal from the patient's mouth. The flexibility in designing different attachment and release forces afforded with the temporary alignment fasteners described above extends the possibility for matching these requirements for different prosthesis processing and fitting steps. As a result, ease of use for the dental practitioner and minimization of patient discomfort can be considered for different process requirements.

Although axially symmetric interfaces between coping and implant abutment have been described for most embodiments, the inventive concepts may also be applied to asymmetric implant abutments and copings as long as the coping doesn't need to rotate on the implant abutment as noted, for example, with the embodiment of FIG. 89.

Various embodiments have been described to illustrate the disclosed inventive concepts, not to limit the invention. Combining inventive elements of one or more of the embodiments with known materials, components, and techniques in dental science to create further embodiments using the inventive concepts is considered to be part of this disclosure.

Any of the embodiments may contain a film or deposited material on top of the cap and temporary attachment post to prevent adhesion to the temporary attachment post of materials used for pick-up, as shown in the film 56 of FIG. 71.

Temporary attachment posts may be rotationally driven into the implant abutment threads using either the cap, coping or the temporary attachment post itself. Temporary attachment posts and caps may have varied drive features such as male or female knurls, hex, spines, spanner notches/holes. These design alternatives are driven by functional requirements of a particular implementation.

Other means of attaching/joining a secondary separable portion include insert-molding, use of adhesives, waxes, solders or other metallic materials, heat-staking, and ultrasonic bonding.

Breakaway portions may also be formed by two-shot molding, dispensing, or otherwise placing a secondary mechanically, thermally, or electromagnetically fusible material on a portion of the fastener to provide the breakaway function.

Thin-film or thick-film metallic and polymer coatings may be applied to portions of the fastener to tailor friction and insertion and extraction forces, enhance adhesion of pick-up materials, and other properties such as corrosion-resistance.

What is claimed is:

1. A system for incorporating a coping into a prosthesis for definitive screw attachment to a threaded implant abutment through pick-up processing using a separable fastener, where the system comprising a cylindrical post portion with threading on the distal end and an axially-separable cap portion comprising a cylindrical bore that holds a coping against a threaded abutment for bonding of the coping into a prosthesis and disengages the coping from the implant abutment after bonding by separating the cap portion from the post portion through an axial pick-up force, the improvement comprising:
an accessory, wherein the accessory includes an interface for attachment to the post portion, wherein the accessory is an exclusion cap, and wherein the exclusion cap is attached to the post portion of the separable fastener, and wherein the exclusion cap is in contact with a portion of the implant abutment.

2. The system of claim 1 wherein the exclusion cap is attached to the post portion of the separable fastener with an axial force.

3. The system of claim 2 wherein the exclusion cap is attached to the post with an interference fit and wherein the interference fit is sufficient to disengage the threaded portion of the post from the implant abutment through rotation of the exclusion cap.

* * * * *